United States Patent [19]
Watts et al.

[11] Patent Number: 5,581,600
[45] Date of Patent: Dec. 3, 1996

[54] SERVICE PLATFORM

[76] Inventors: Martin O. Watts, Dunelm, Main Road, Ashbocking, Ipswich, Suffolk, England, IP6 9JX; Dave M. Elliston, 15 Stoke Bridge Maltings, Dock Street, Ipswich, Suffolk, England, IP2 8EU; Patrick M. Hughes, 19 Bath Road, Felixstowe, Ipswich, Suffolk, England, IP11 7JN; Nicholas J. A. Forse, 10 Arkle Court, Kesgrave, Ipswich, Suffolk, England, IP5 7AD

[21] Appl. No.: 211,161
[22] PCT Filed: Jun. 15, 1993
[86] PCT No.: PCT/GB93/01273
§ 371 Date: Mar. 21, 1994
§ 102(e) Date: Mar. 21, 1994
[87] PCT Pub. No.: WO93/26113
PCT Pub. Date: Dec. 23, 1993

[30] Foreign Application Priority Data

Jun. 15, 1992 [GB] United Kingdom .................... 9212669
Jun. 15, 1992 [GB] United Kingdom .................... 9212699

[51] Int. Cl.$^6$ ..................................................... H04M 3/50
[52] U.S. Cl. ................................................. 379/67; 379/88
[58] Field of Search ................................. 379/67, 88, 89, 379/100, 94

[56] References Cited

U.S. PATENT DOCUMENTS

| | | | |
|---|---|---|---|
| 4,949,374 | 8/1990 | Ishii | 379/88 |
| 5,125,024 | 6/1992 | Gokcen | 379/88 |
| 5,165,095 | 11/1992 | Borcherding | 379/88 |
| 5,185,781 | 2/1993 | Dowden | 379/67 |
| 5,193,110 | 3/1993 | Jones | 379/94 |

FOREIGN PATENT DOCUMENTS

| | | | |
|---|---|---|---|
| 0138536 | 4/1985 | European Pat. Off. | H04Q 11/04 |
| 0185445 | 6/1986 | European Pat. Off. | H04Q 11/04 |
| 0283120 | 9/1988 | European Pat. Off. | |

OTHER PUBLICATIONS

Rosenberg, "Sprint Expands Testing of Voice–Activated Card", Kansas City Star Business Section Apr. 7, 1992.

Enhanced Information Services, Technical Report, Texas Instruments Telecom Systems, pp. 1–20.

Texas Instruments Multiserve™ Media Server.

Texas Instruments Multimedia Processor.

"Tandem Computers and Texas Instruments Announce Cooperative Marketing and Development Agreement", Media Information, pp. 1–3.

"Sprint Announces Expanded Voice–Activated Fonacrd (am) Pilot Based on Impressive Test Results", pp. 1–7.

"TI Announces Multiserve™ Telecommunications Platform", Texas Instruments, News Release ITG–005, pp. 1–5.

Texas Instruments Voice Dialing Services, pp. 1–6.

Enhanced Information Services A Strategic Approach, Texas Instruments Telecom Systems, pp. 1–14.

The NVP 1000, Voice Processing System, Newbridge, pp. 1–6.

"NVP 1060, Technical Supplement", Draft, Newbridge.

Mulla et al, "Application of Speech Recognition and Synthesis to PABX Services", published May 6, 1995, pp. 273–280.

Conversant I Voice System: Architecture and Applications AT&T Journal, R. J. Perdue E. L. Rissanen pp. 34–47.

Primary Examiner—Krista M. Zele
Assistant Examiner—Thomas F. Presson

[57] ABSTRACT

A service platform for the provision of automated speech based services over a telephone network comprises a speech processor including associated memory, to provide at least one of speech recognition, speaker recognition, speaker verification, speech synthesis; line interface means for terminating a number of telephony channels of the network; a speech bus to carry speech signals between the line interface means and the speech processor; a control processor to control the routing of speech signals over the speech bus; a control bus connecting the control means with the speech processor and the line interface; a separate memory holding speech processing software; and a data link connecting the memory means with the speech processing means and operable to load programs into the speech processor during rum time in the event that the appropriate software does not exist on the speech processor in a free state.

14 Claims, 25 Drawing Sheets

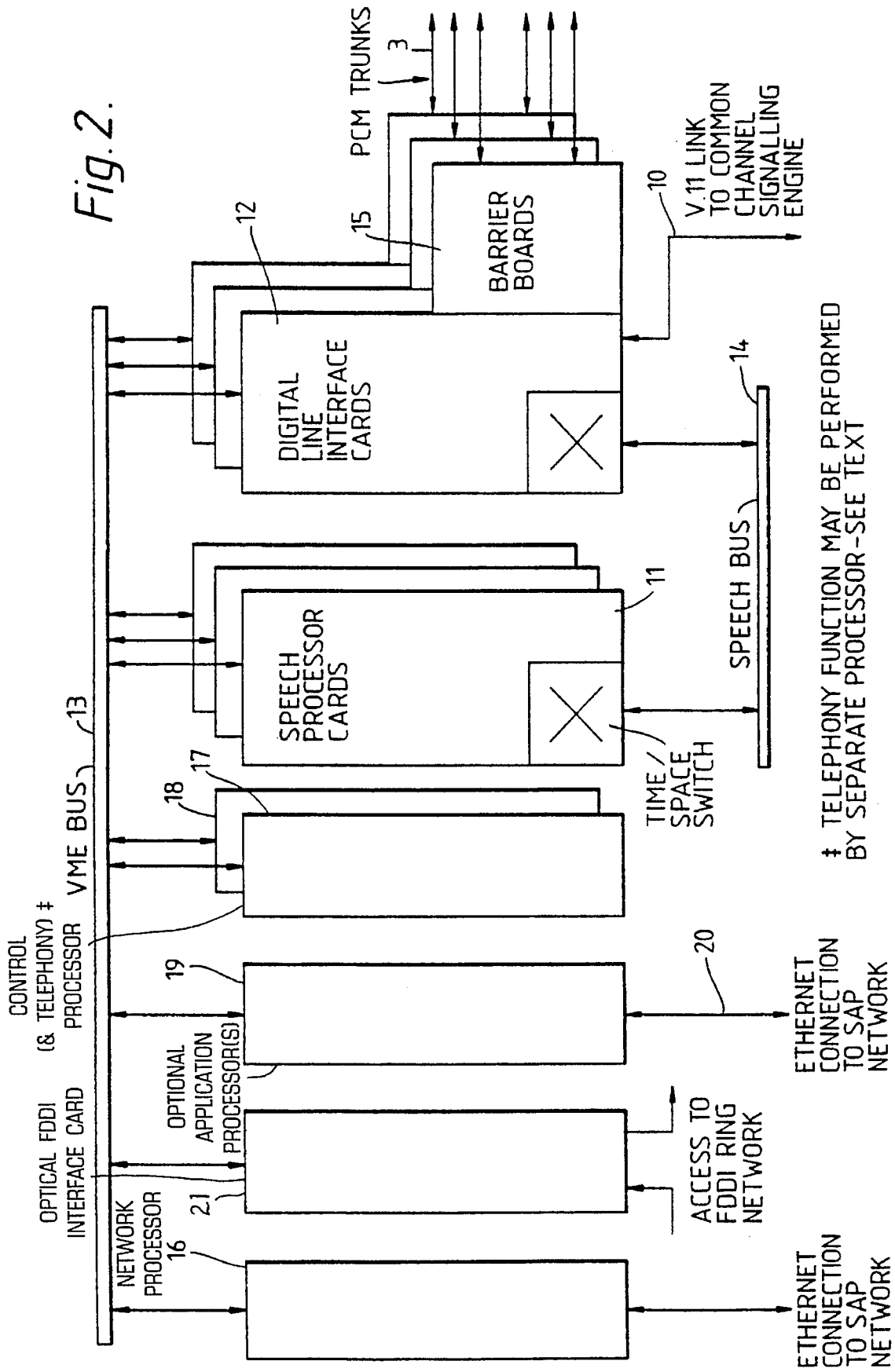

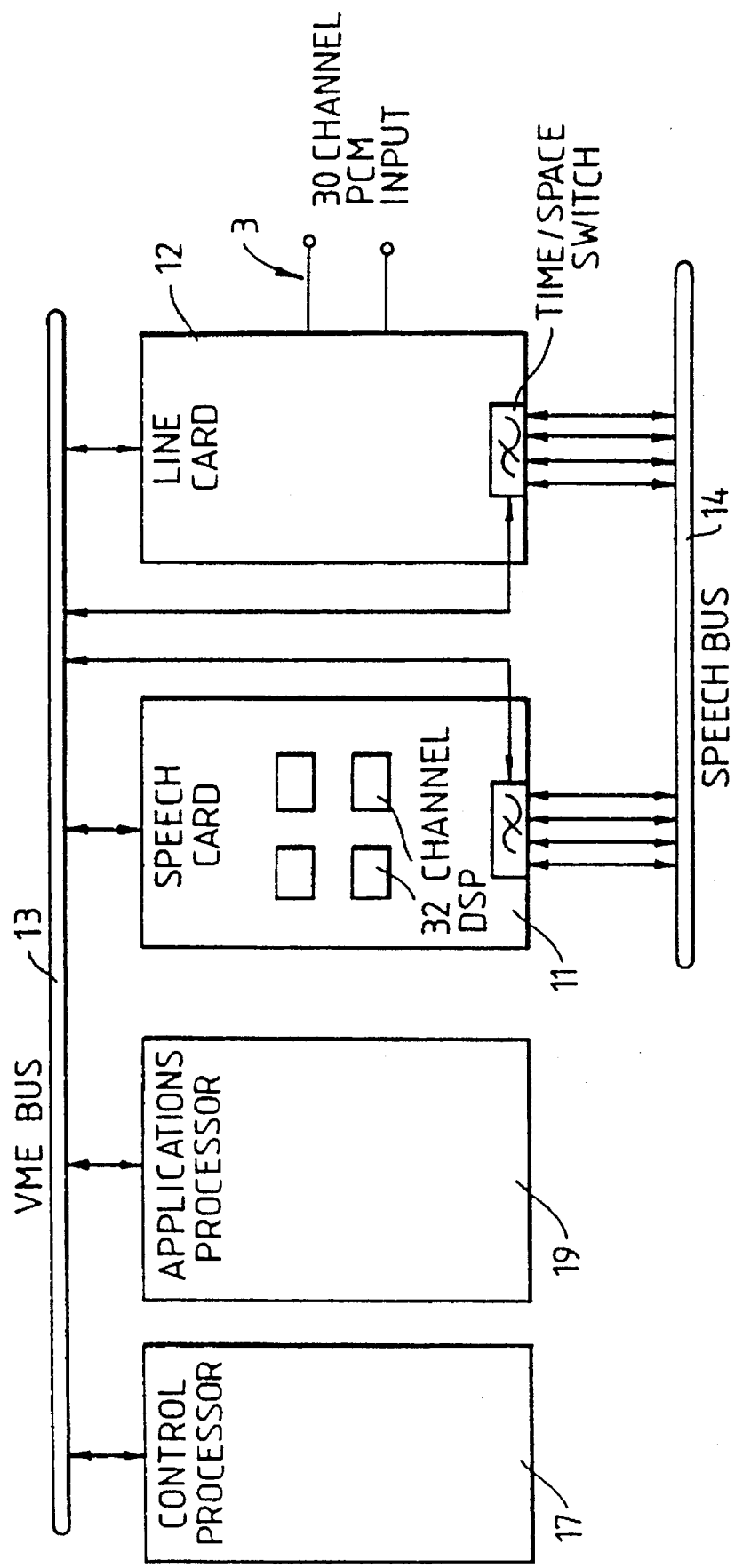

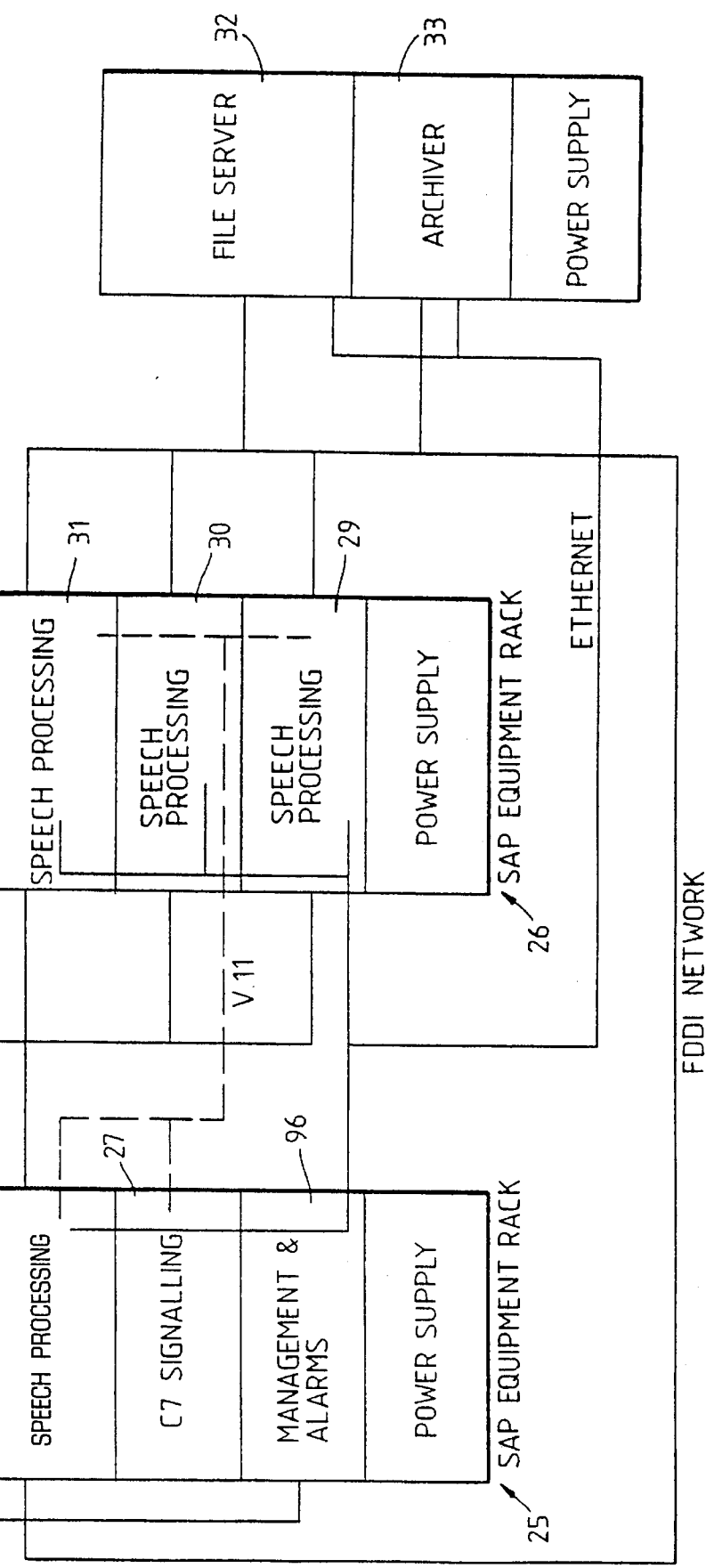

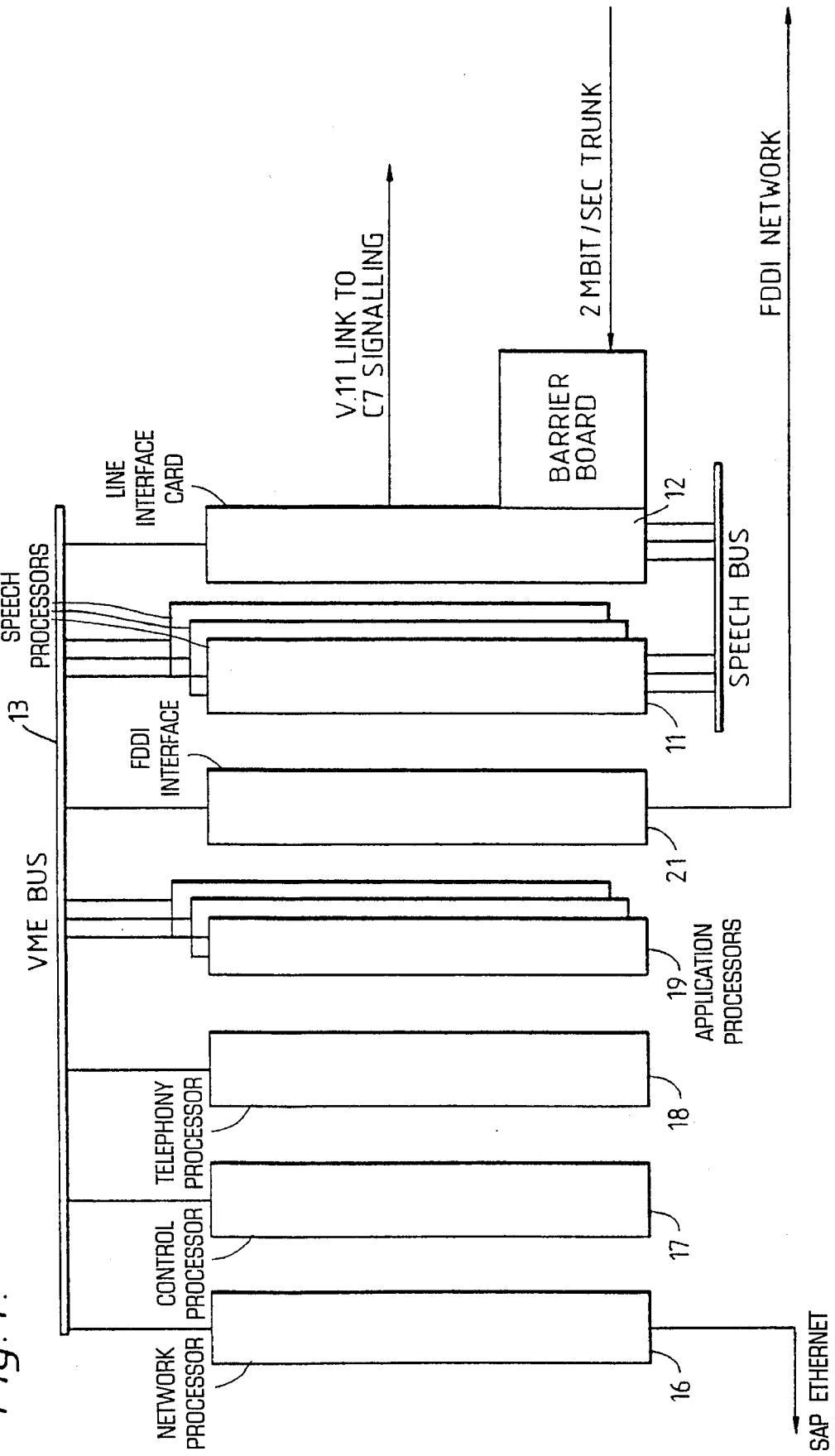

Fig. 28.    SAP SOFTWARE OVERVIEW

SERVICE PLATFORM

BACKGROUND OF THE INVENTION

1. Field of the Invention

The present invention relates to a service platform, in particular to a platform for the provision of voice services which use speech technology. Typically such services will be interactive services, such as home banking, but the invention also finds application with non-interactive services.

2. Related Art

There is increasing pressure on the telecommunications industry to provide enhanced telephone services, to adapt more quickly to changing demands, and to provide increased value for money. One of the areas of technology which is key to achieving these goals is "speech technology", that is the technology of speech recognition, speaker recognition, speaker verification, speech synthesis, text-to-speech conversion, speech compression, etc. This technology can be used to provide improved customer service, replacing or assisting human operators, and or providing completely new services to customers. Typically, the various aspects of this technology are provided separately, often by different items of equipment. For some applications the equipment to provide the speech recognition, etc., will be associated with a main exchange in a telephone network (PSTN), while other applications equipment will be provided in, or in association with, customer's premises. Particularly for network-based equipment, there exists a need for equipment which can handle many calls simultaneously, preferably with the ability to provide multiple services simultaneously.

To some extent, this need has been met by equipment which provides interactive voice services and in which processors, typically digital signal processors (DSP)s are programmed to provide a particular service, the recognition or synthesis algorithms necessary for the provision of the particular service also being stored on or in close association with the programmed DSP. Such known apparatus is typically dedicated to the provision of one service, with the DSP of DSPs needed to provide the service being allocated as a whole to each incoming call as and when it is answered. This dedicated arrangement is simple and convenient, but it does mean that if any part of the service offering is very processor hungry, for example using a complex, speaker-independent recognition algorithm with a large vocabulary, the level of processor provisioning required to run that part of the service needs to be provided throughout the entire length of each call to that service, and this is clearly inefficient. While this inefficiency is supportable in small systems, systems which need to handle many calls are handicapped by the need to over provide processing resource. It would be desirable, therefore, if some means could be found to provide processing resource on an "as-needed" basis, while at the same time providing a reliable, quick and user-friendly service platform.

BRIEF SUMMARY OF THE INVENTION

At least one aspect of the present invention addresses the problem of the allocation of processing resource (hereinafter "resource allocation").

According to a first aspect, the present invention provides an interactive voice platform for the provision of automated speech based services over a telephone network, the platform comprising:

first processing means with associated memory, to provide at lease one of the following functions: speech recognition, speaker recognition, speaker verification, speech synthesis;

line interface means (to terminate a plurality of telephone lines or telephony channels of the network;

a speech bus to carry speech signals between the line interface means and said first processing means;

a control processor to control the routing of speech signals over the speech bus;

a control bus connecting the control means with the first processing means and the line interface means;

memory means distinct from the associated memory of said first processing means and holding one or more of the following: a program including a speech recognition algorithm, a program including a speech synthesis algorithm, a program including a speaker recognition or verification algorithm, templates to be used in conjunction with any one of the foregoing programs;

a data link connecting said memory means with said first processing means and operable to effect the transfer of an instance of one or more of the programs or templates held in said memory means to said first processing means for use therein in the provision of the appropriate function during the answering of a call.

BRIEF DESCRIPTION OF THE DRAWINGS

Preferred embodiments of the present invention will now be described, by way of example only, with reference to the accompanying drawings, in which:

FIG. 2 is a schematic diagram showing aspects of the arrangement of a speech bus suitable for use in the platform shown in FIG. 1;

FIG. 2a is a schematic diagram of key elements of a speech bus in somewhat greater detail;

FIG. 3 shows schematically an example of a typical hardware configuration of a speech platform installation according to the invention;

FIG. 4 has a schematic diagram of a typical speech processing shelf of a speech platform according to the present invention;

FIG. 26—there is no FIG. 26;

DETAILED DESCRIPTION OF PREFERRED EMBODIMENTS

Figure 1:
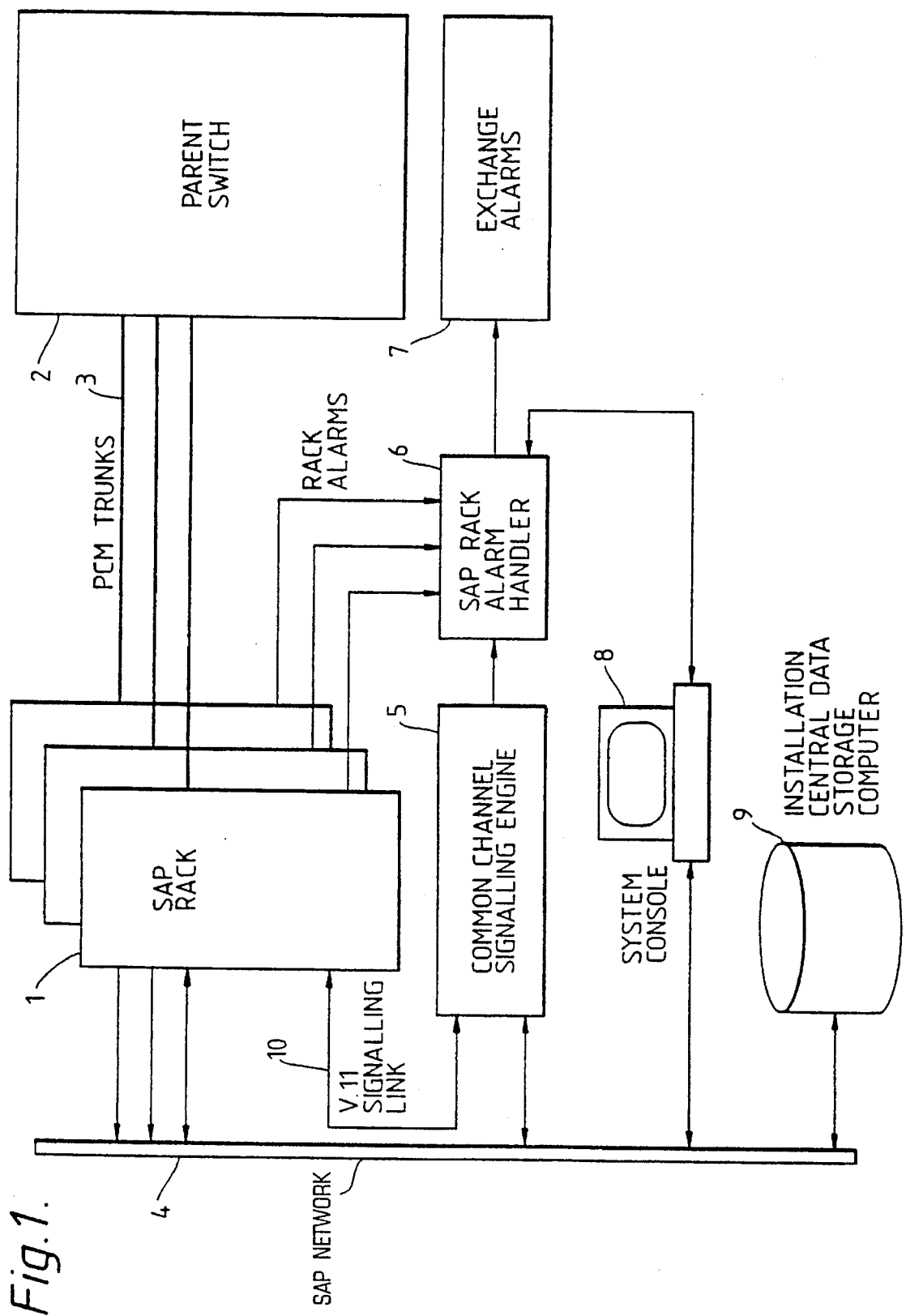
FIG. 1 is a schematic diagram showing an architectural overview of a speech platform according to the present invention.

Referring now to FIG. 1, there is shown a typical architecture in which the speech platform (1) (hereinafter SAP) operates in association with a parent switch (2) to which it is connected by PCM trunks (3). Connecting various elements of the SAP is a network bus (4) which feeds, inter alia, a common channel signalling engine (5) which itself feeds the SAP alarm handler (6), alarms from which are fed to the exchange alarm system (7) which is typically associated with the parent switch (2). The SAP alarm handler (6) is connected to the SAP system console (8) which is also connected to the network bus (4). The SAP system also includes a central data storage system (9) which is connected to the network (4). Also shown is the V11 signaling link (10) which provides an additional connection between the SAP rack system (1) and the common channel signalling engine (5). The SAP network (4) is a data network which connects the different shelves of the SAP rack system, which shelves may all be in a common rack or may be an plural racks. The data network is typically in the form of an Ethernet, but it could be an FDDI network or the like.

Referring now to FIG. 2, this shows schematically the architecture of a shelf of the SAP. The expression shelf is used here because in a preferred embodiment the SAP is based on a racking system the smallest operational unit of which is based on one shelf and includes one or more speech processor cards (11), one or more line interface cards (12), and a combination of general purpose processor cards. The general purpose processor cards run the system control software and application software. All cards are connected via a VME bus backplane (13). The speech processor card (s)(11) and line interface card (s)(12) are additionally connected via a speech bus (14). The PCM trunks (3) are connected to the line interface cards via respective barrier boards (15). One of the general purpose processor cards serves as a network processor (16) and this acts as the backplane network anchor of the shelf and performs all speech processor data transfers. The network processor (16) also acts as the gateway between the shelf backplane network and the SAP data network (4). In addition, the network processor (16) functions as the VME bus system controller for the shelf. The network processor can be a standard Motorola 68030 based single board computer with an Ethernet (where the bus network (4) is Ethernet) port. The network processor (16) may, in some applications, require a higher performance processor than a 68030 if the overall system data throughput is not to be constrained.

Another of the general purpose processor cards serves as the control and telephony processor (17) which runs the main system control software and the telephony functions. Where the telephony functions are complex, it may be necessary to provide a separate telephony processor (18), leaving the processor card (17) to function merely as the control processor. Where a separate telephony processor card is used the requirements of it will be similar to those of the control processor. In the following description it will be assumed that a common control and telephony processor card (17) is used. The card (17) is required to:

interface to the shelf backplane network, including the VME bus (13);

initialise all the speech processors (11) and line interfaces (12) when the system is reset;

control the switching and allocation of time slots on the speech bus (14);

collect and distribute system alarms (but not rack alarms);

and process simple telephony functions.

The relatively simple functionality required of the control and telephony processor means that a low cost processor can typically be used.

Optionally, but preferably an applications processor card (19) can be used, whose function is to run the actual speech applications that drive the SAP. Typically, application programmes will run under the UNIX operating system, typically communicating with the SAP via TCP/IP protocols. Thus, the applications processor (19) must interface to the SAP network, and typically through an Ethernet connection (20). While the applications processor may be installed internally as a processor card within the shelf, it could alternatively be "installed" externally as a stand alone computer. If installed externally to a SAP shelf, the applications processor must be connected to the SAP via the SAP network (4). If installed within a shelf, the applications processor may connect to the SAP network (4) via Ethernet or via the backplane network (13) of the shelf it is installed in. Where an applications processor (19) is installed within a shelf it is only permitted to run applications for that shelf. Conversely, an external applications processor can run applications for many shelves. It is typically this requirement which determines whether it is appropriate to use an internal or external applications processor. Obviously, the use of an internal applications processor on each shelf of a SAP leads to greater flexibility although the applications processor card will limit the space available in the shelf for speech processor cards. Where the applications processor is shelf-based the processor must of course be able to interface with the bus (13) and hence when the VME bus is used the processor must be a VME processor and must, when the application programmes are run under the UNIX operating system, itself runs the UNIX operating system. If the processor is not able to interface directly to the shelf backplane VME network it should offer an Ethernet port (which would typically be on the front panel). The applications processor should also offer a serial-terminal port on the front panel to enable the processor to be configured on installation and for maintenance. If the applications processor is to attach to the SAP network (4) via Ethernet (or FDDI or whatever provides network 4), no access to the VME bus (13) should be permitted. If, however, the applications processor is to attach to the SAP network (4) via the backplane network the backplane processor number, i.e. the processor address on the backplane should be set to an unused number. The gateway to the SAP network (4) is then the network processor (16). In this case, the version of UNIX on the card must support the SAP backplane network (4). The applications processor must be configured to swap memory over the SAP network (4).

A further optional card (but which is not a general purpose card) may serve as an FDDI interface card (21). The function of the FDDI interface is to provide the SAP shelf with access to an FDDI data network. FDDI offers greater guaranteed performance than Ethernet, and a degree of circuit redundancy if a dual-attach (see FDDI token ring media access control, American National Standard ANS 139-1987) interface is used.

Each speech processor card (11) contains several DSPs with associated memory, together with a CPU and a switch for interfacing with the bus. Further details of the speech processor cards appear later in the description.

The operation of the speech bus (14) which carries the speech and telephony traffic between the speech processor cards (11) and the line interface cards (12) will also be described more fully below. A suitable system software architecture for the SAP could employ Vx works, together with a UNIX-like real time operating system to handle telephony, recognition, DTMF detect and record/playback events, while the applications could run under a general purpose UNIX-like operating system, such as SunOs. Typically the central data storage (9) would act as a file server system containing SAP system software together with applications and data files. File transfers to/from the file server could be through NFS (network file storage—a mechanism for file transfer in a UNIX environment) over an FDDI link to provide the necessary speed, possibly with provision for Ethernet to provide management control. Ideally the common channel signal which is used for telephony signalling would be CCITT C 7.

FIG. 3 illustrates an example layout of a speech application configuration. Two standard SAP racks (25, 26) are shown. Of the total of six equipment shelves, one (24) provides the management an alarm functions to collect and service alarms and to provide a terminal interface to manage the SAP installation. Included in the shelf is a management processor which is a general purpose SPARC computer which will collect and filter SAP alarms and interface to external services such as NOMS1 (Network Operations Maintenance System, which is an exchange alarm reporting system) and the operations and maintenance centre (OMC) or its equivalent which is the system controlling digital exchanges in the UK PSTN. This management processor card also runs system management software, the system console interface and the network management alarm handler. One management processor card is required per SAP installation within the PSTN. The shelf also includes alarm cards which collect the "metallic" alarms from the power supply in the phones, and provide any necessary "hardwire" communication to the local exchange alarms collection unit as well as converting these alarms, through suitable software to inter-process communications (IPC) mess ages to be handled by the Network Management Alarm Handler Software running on the management processor card. In addition to the system software which provides and controls the speech services, there are additional processes and interfaces which provide for remote monitoring and diagnostics of SAP activity and for resetting processes and hardware in the event of failure. Alarms are collected from hardware and software, converted to a common format, and assessed. The SAP may initiate alarms for local action automatically such as resetting a speech processing shelf, or, alternatively, alarms will be forwarded to a remote management system, typically OMC and NOMS1, where human intervention is required. This intervention will typically be via an OMC terminal connecting to the SAP installation via, for example, an X25 link on the management and alarms shelf. Remote test and diagnostics can be initiated over this link. X25 communications hardware is required for connection to the remote control systems such as the OMC, or at least some equivalent communications hardware if some other data communications link is used in place of the X25. Also mounted in the management and alarm shelf is provision for terminal access to enable the SAP installation to be managed by a remote or locally connected terminal. The system console software running on the management processor card provides a command line interface to execute a range of commands to control SAP operations and applications execution. If a local terminal is used, it would typically be a DEC VT100 type directly connected to SAP, while if the terminal were remote it would typically be a standard network management work station.

Shelf (27) in equipment rack (25) contains a common channel signalling front end processor, again preferably CCITT C7 signalling.

Information is fed via a V11 link from the digital line interface cards. A measure of redundancy is provided by arranging the C7 front end processor as 2 halves operating as "worker" and "standby".

The remaining shelf, (28), in rack 25 and the three processing shelves (29, 30 and 31) in rack 26 contain the standard SAP control and speech components as described earlier with reference to FIG. 2.

An external file server (32) contains customer details, prompts, recordings, templates etc. and SAP software, while an associated archiver (33) logs dialogue recognition events. The server and archiver are shown here as a common unit, which is the preferred arrangement, which is connected to the SAP speech processing shelves via a high speed FDDI network. The server/archiver is also connected to the SAP installation via Ethernet to carry non-speech data (alarms, etc) and this connection could also provide a degree of redundancy should the FDDI network fail completely.

FIG. 4 shows schematically a typical speech processing shelf containing multiple speech processor cards (11) and line interface cards (12). The remaining cards, that is the FDDI interface (21), the applications processor (19), the telephony processor (18), the control processor (17) and the network processor (16) are all generally one per shelf. All cards except the applications processors are connected via the VME bus (13) for power and communications, while the speech processor and line interface cards are also connected by a separate speech bus (14). The application processor use the VME backplane for power but communication is via the SAP Ethernet (4). The network processor handles communications from its shelf to the Ethernet network (4) and data to/from the FDDI network.

The Speech Application Platform (SAP) is a platform to provide network based speech services within a telecommunications network, which would typically be a PSTN, but could equally well be a private virtual private network. These services are provided on SAPs which are connected at certain network nodes. SAPs provide a flexible platform which can be scaled to suit applications, and application software can be added to provide new services within the network.

SAP is designed to provide network based advanced telephony services, using multi-sourced "off the shelf components" conforming to industry standards. The SAP can provide complete solutions to a range of services because it is designed to provide a general purpose platform and not a point solution for the provision of these services. This means that the SAP is a modular, flexible and scalable system which is not locked into a particular supplier. This approach leads to flexibility at the system architecture level, system build level and for resource allocation. As a result SAPs can be tailored to provide a cost effective solution over a wide range of system builds and architectures.

The core of the SAP is a signal processing capability which can be tailored by the application software to provide a multitude of services. The functionality which the SAP supports is:

Network telephony interfaces

Speaker independent alpha numeric speech recognition

Speaker dependent speech recognition

Playback of System prompts

Storage and playback of speech prompts

Storage and playback of customer recorded messages

MF tone detection

MF tone generation 10 pps pulse recognition multiple applications per installation

OVERVIEW OF ARCHITECTURE

The main components needed for developing and running services on platforms are listed below and then expanded separately:

Speech and Signal Processing capability

Network Signalling interface

Application Controller

Fileserver

Archiver

Management interface

Interconnect Backbone

Application Generation Toolset

Speech Processing Capability

This capability is provided by Digital Signal Processors (DSPs) on Speech and Signal Processor cards. Any incoming channel can be connected to any DSP which has its control software downloaded via the interconnect backbone. This method means that channels can be switched To DSPs and/or the DSP software can be altered to suit the application. This mechanism builds flexibility into services using the SAP. The facilities offered by the Speech and Signal Processor cards include detection of MF in-band signalling tones detection of 10 pps signalling speech recognition speech output message recording The network signalling interface controls the interworking between the SAP and the network.

Each SAP installation will normally require an application processor. The number of application processors per installation depends on the service(s) being run. Application manager software is available for running multiple applications on an installation. Application processors are normally interconnected to the speech and signal processor cards via the VME backplane on each shelf The fileserver provides the mass storage for the services running on the SAP. The fileserver holds all the data necessary to provide the service(s). This comprises such things as system software (including SAP system software), application software, error logs, system prompts, channel related information, customer profiles, and customer messages as required by the application.

The archiver provides the method of capturing data and events relating to the services running on the SAP. Data captured in this way can be archived for purposes such as subsequent off line analysis or audit trails.

The management interface provides the method of controlling the SAP. All external accesses to the SAP are controlled via the management processor including control of the local terminal(s) provided for maintenance and support.

Figure 5:
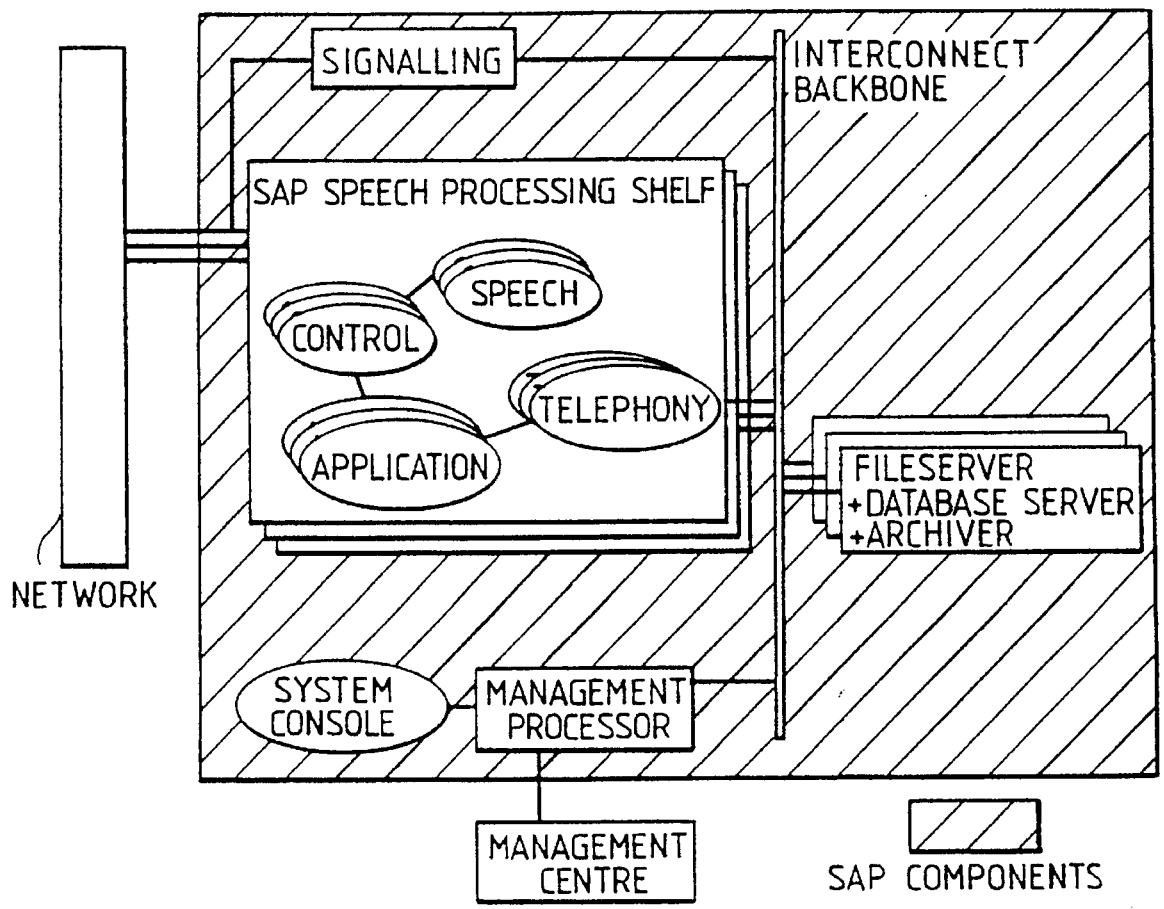
FIG. 5 is a schematic diagram illustrating the interconnection of functional entities in a speech platform according to the present invention.

The interconnect backbone provides the method of communication between the different functional blocks of the SAP. The preferred options available are Ethernet and FDDI, the option of choice is determined by the application(s) requirements for speed and throughput. FIG. 5 shows all the major blocks interconnected by the Interconnect Backbone. The speech and signal processing component is shown in the most likely configuration of complete shelves which include the telephony processor and application(s) processor.

NETWORK SIGNALLING

The connection to the public network are preferably via 2 Mbit/s links conforming to G703 & G704 with the signalling information carried in channel 16. The signalling options used on speech platforms must match their network connections. The signalling options supported on SAP are:

No signalling

Common Channel Signalling CCITT No 7 (C7)

Digital Private Network Signalling System (DPNSS)

Digital Access Signalling System (DASS2)

Channel Associated Signalling (A1/B1)

No Signalling

SAP provides a general purpose speech and digital signal processing facility. Some applications will only need access to the speech path and the network signalling for these circuits can be ignored by the application. For such applications no network signalling interface need be supplied.

Common Channel Signalling CCITT No 7

This signalling system is the predominant signalling system used in the main telecomms networks today and is generally referred to as C7. C7 is a layered stack protocol used for the transfer of signalling information between two signalling points. Two options are shown for this signalling system, the first uses a 'bought in' Front End Processor (FEP), while the second is the preferred option.

Figure 6:
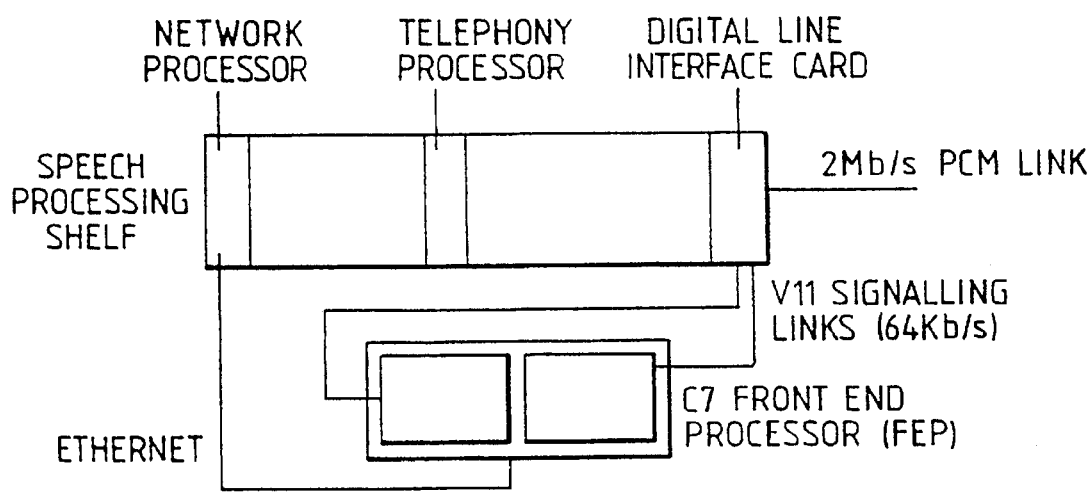
FIG. 6 illustrates schematically a C7 call control hardware organisation suitable for use in a speech platform according to the present invention.
Figure 7:
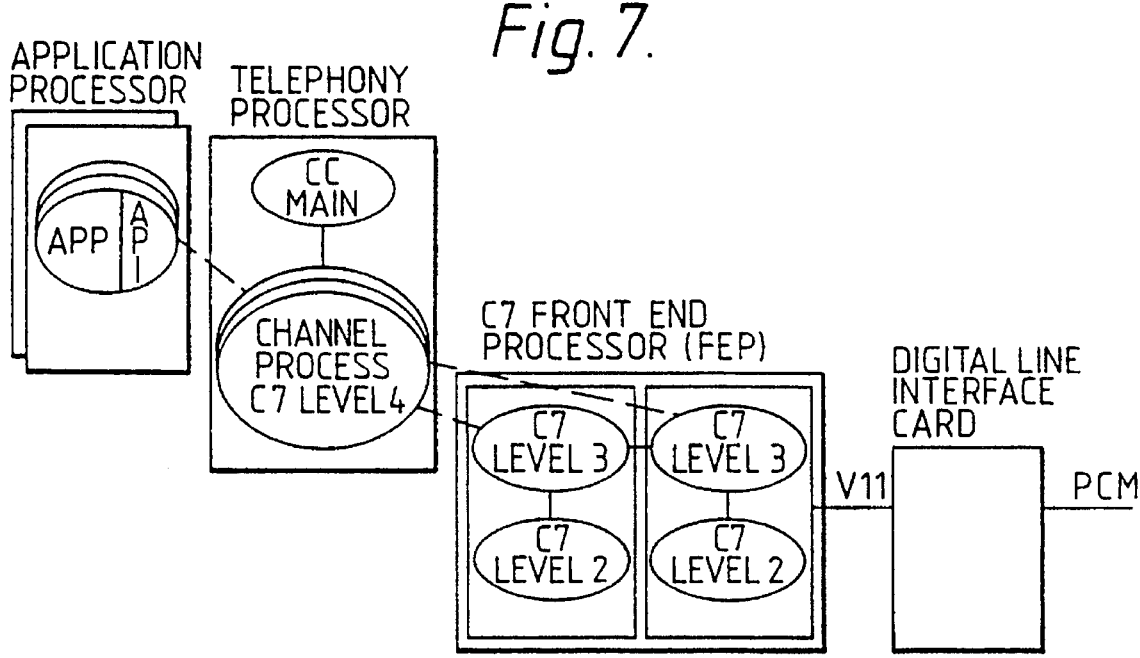
FIG. 7 illustrates schematically the software organisation of a C7 call control system suitable for use in a speech platform according to the present invention.

FIGS. 6 & 7 show the implementation using the bought in C7 Front End Processor (FEP). The 2 Mbit/s PCM link is terminated on a digital line card which extracts channel 16 (the C7 signalling) and presents it on a duplicated V11 link at 64 Kbit/s to the C7 Front End Processor (FEP). The FEP is mirrored to provide resilience and processes the message transfer part of the protocol (level 2 and level 3) and transfers the user part of the message to the speech platform on an Ethernet connection. The ethernet terminates on the telephony processor on the speech processing shelf. The telephony processor interprets the level 4 part of the message to determine such data as originating Line Identifier, etc. Communication between the telephony processor and the application processor is via the VME backplane and the telephony processor interfaces to the application through the Application Programmers Interface (API).

Figure 8:
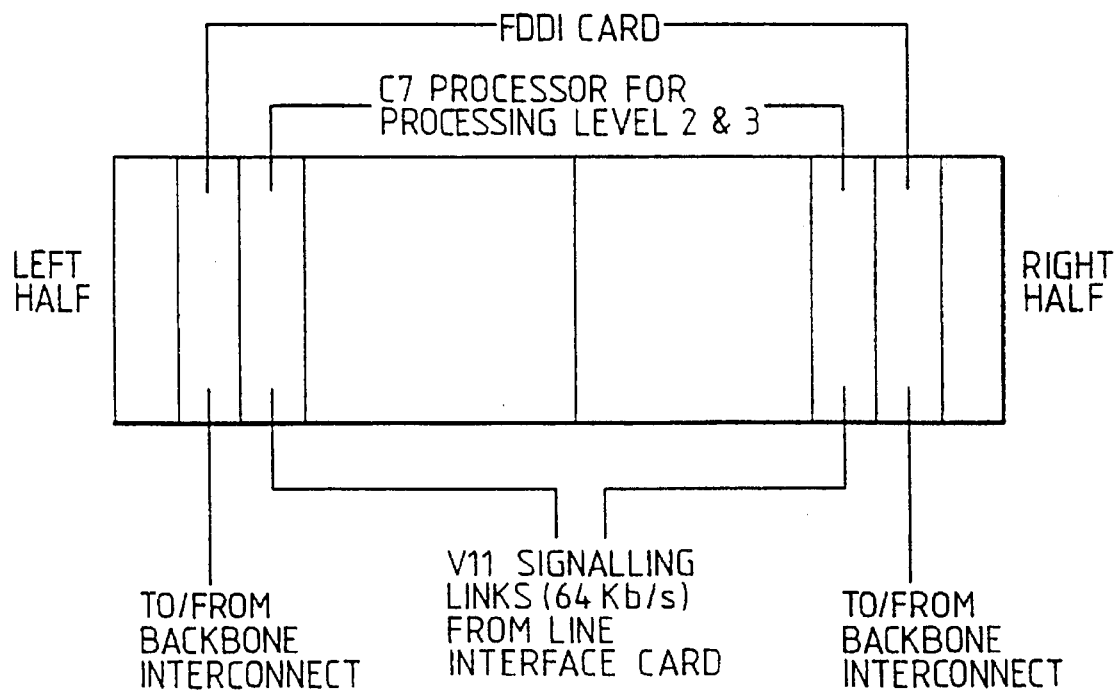
FIG. 8 shows schematically details of a VME implementation of a C7 signalling system for use in the speech platform according to the present invention.

The implementation shown in FIG. 8 is the VME based implementation. The two halves are identical and are provided for resilience. Each half contains an interface to the SAP backbone and a separate processor to handle the C7 protocol levels 2 & 2. Level 4 will be handled by the Telephony Processor on the speech processing shelf.

If FDDI is used for the interconnect backbone, then a FDDI card will be recurred for the interface but the management of the shelf backplane will be provided by the C7 processor. If Ethernet is used for the backbone the FDDI will not be used but the processor card will need an Ethernet interface. The protocol handling processor will contain a daughter card with 68302 multi protocol processor for handling the level 2 protocols of the C7 stack. The protocol handling processor will have 3 V11 front panel connections for interfacing to the channel 16 signalling access of the Digital Line Card.

Figure 9:
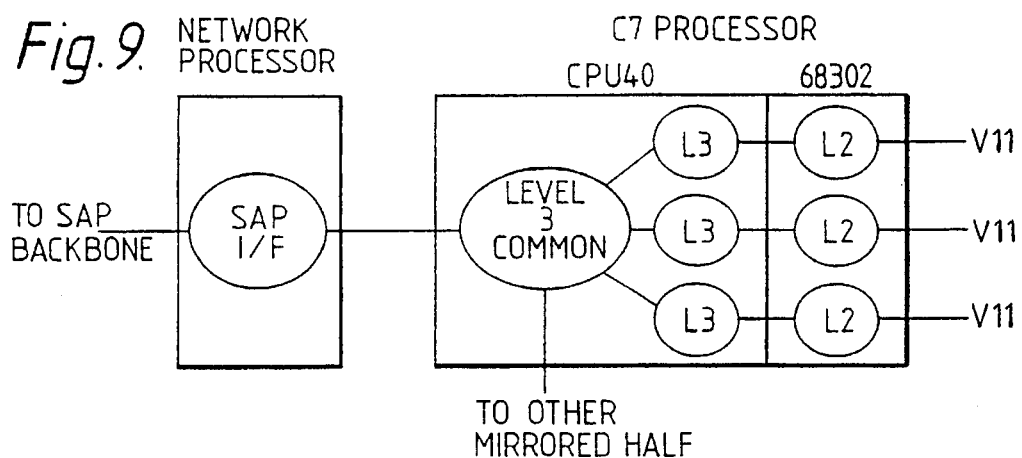
FIG. 9 shows schematically where the different processes run on the C7 processor.

FIG. 9 shows where the different processes are running on the C7 processor. The signalling interface shelf handles the Message Transfer Park (MTP) levels 2 and 3 of the protocol stack. Level 1 is handled by the Digital Line Interface Card and the level 4 is handled by the Telephony Processor.

Figure 10:
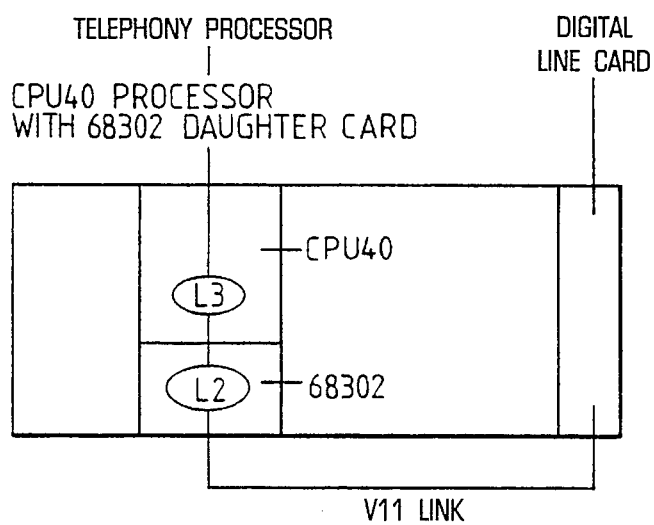
FIG. 10 shows schematically a digital access signalling configuration.

The Digital Private Network Signalling System (DPNSS) is the signalling system used for PBX to PBX communications. Because the channel 16 signalling channel is only associated with the 2 Mbit/s PCM pipe which delivers it there is no need to provide the duplicated C7 front end processor. This signalling system implementation is shown in FIG. 10.

The signalling interface is completely on the shelf to which its 2 Mbit/s bearer is attached. The signalling is connected from the Digital Line Card to the Telephony Processor via a front pluggable VII connection. The 68302 daughter card handles the level 2 and level 3 is handled by the CPU40 part of the Telephony Processor.

The Digital Access Signalling System No 2. (DASS2) is the signalling system used, at least in the UK, between PBXs (ISDN multiplexers) and the Digital Local Exchange (DLE). It is very similar to the DPNSS described above with a few additional messages in the message set and will be handled by the SAP in the same manner as DPNSS which is shown in FIG. 10.

An older type of signalling system is Channel Associated Signalling commonly referred to as A1/B1 signalling. With this system the signalling data is stored in the line card and read by the Telephony Processor (in the i/c direction) when required. In the reverse direction the Telephony Processor would write to registers in the line card which would insert the data into the relevant channel 16 timeslot.

The physical layout of equipment would be identical to the previous case (DPNSS signalling). The critical differences are that the Telephony Processor would communicate with the Digital Line Card over the VME bus, and there is no concept of a stack in the A1/B1 signalling system.

Figure 11:
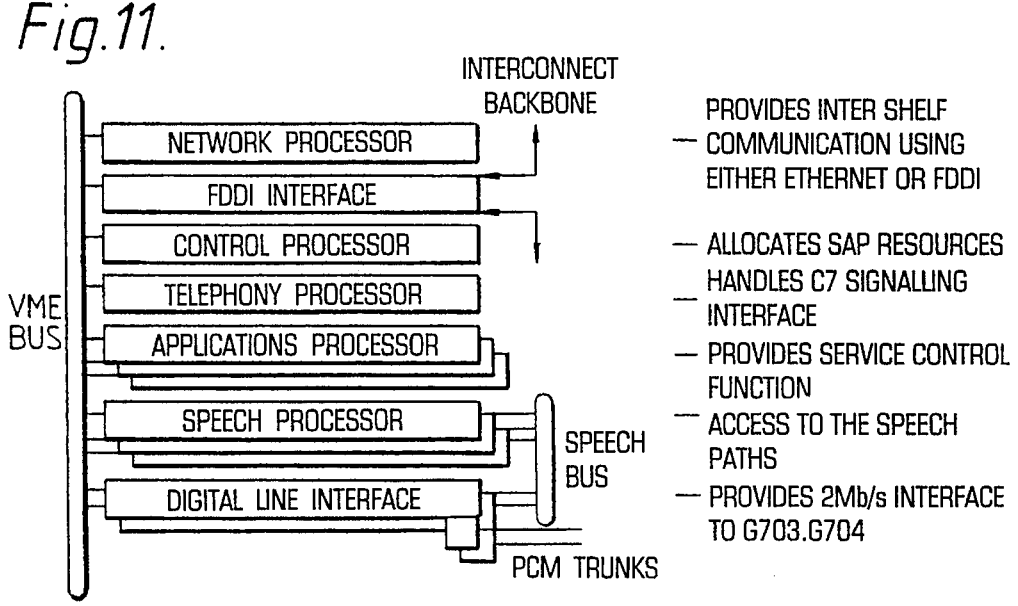
FIG. 11 shows schematically the hardware organisation of a speech and signalling processing shelf for use in a speech platform according to the present invention.

The speech and signalling processing shelf is the basic building block for all speech applications. The shelf has a VME backplane and cards can be plugged into the shelf as required by the application. FIG. 11 shows a possible shelf configuration. There is one of each type of unit which could be used in a Speech and Signalling Processing shelf shown. Several Speech and Signalling Processing processor cards and line cards are shown to demonstrate the systems scalability. Whether all the units are required is dependent on the application.

Figure 12:
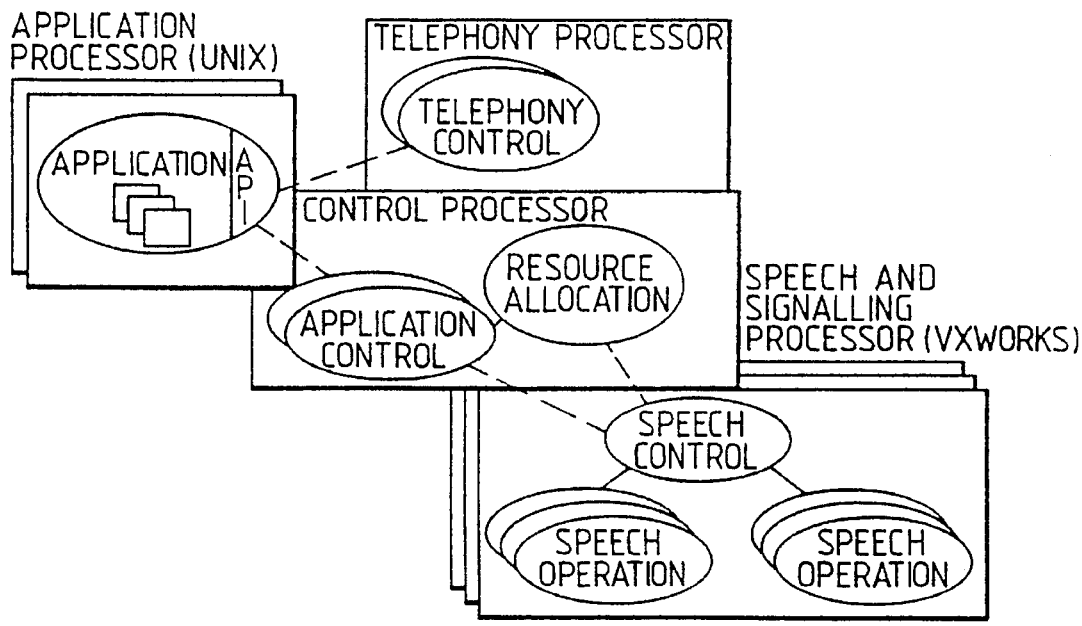
FIG. 12 shows schematically the software organisation of a speech and signalling processing shelf for use in a speech platform according to the present invention.

FIG. 12 shows schematic details of the software organisation of the SAP Speech and Signalling Processor Shelf.

The speech processing shelf comprises a VME backplane into which different functional entities can be inserted as required. The number of speech processing shelves and the number of application processors, speech processing cards and line interface cards per shelf will be determined by the required application.

The function of each component shown in the FIG. 11 is:

Network Processor—this controls the VME shelf backplane. It performs the arbitration function for the shelf and is the driver for all data transfers to and from the Speech and Signalling Processor cards. It also controls the access between the SAP backbone and the speech processing shelf. If the backbone is Ethernet the Network processor must have an Ethernet connector and if the backbone is FDDI there must be a FDDI card on the shelf but the Network processor still performs the data transfer between the shelf backplane and the FDDI card.

The Backbone Interconnect Network—is preferably either Ethernet or FDDI, dependent on the application. The Network Processor will always have an Ethernet port but if FDDI is necessary then an FDDI card will be placed in the shelf but it will be controlled from the Network Processor. The Interconnect Network will be used for communication between shelves and accesses to the Fileserver.

The Control Processor—is responsible for the initial loading of all the Speech Processors and controls the switching function associated with the speech bus. When running, it forms the focal point of application requests from the SAP Network (via the Network Processor).

The Telephony Processor—handles all telephony functions associated with the shelf.

The Applications Processor—runs the Unix operating system and the applications. The Application Processor may also include an Application Manager which enables more than one application to be run on a SAP installation.

The Speech and Signal Processor card—is a custom board which contains 4 DSPs which can be programmed to perform a number of speech processing and other signal processing tasks. This is detailed further below.

The Digital Line Card—is the interface between the SAP and the 2 Mbit/s PCM network links. This is a custom card for the SAP which is again described in greater detail below.

The Speech Bus—this is the mechanism for connecting any one of the incoming speech channels on the PCM link to any one of the DSPs on the Speech Processor cards.

Figure 13:
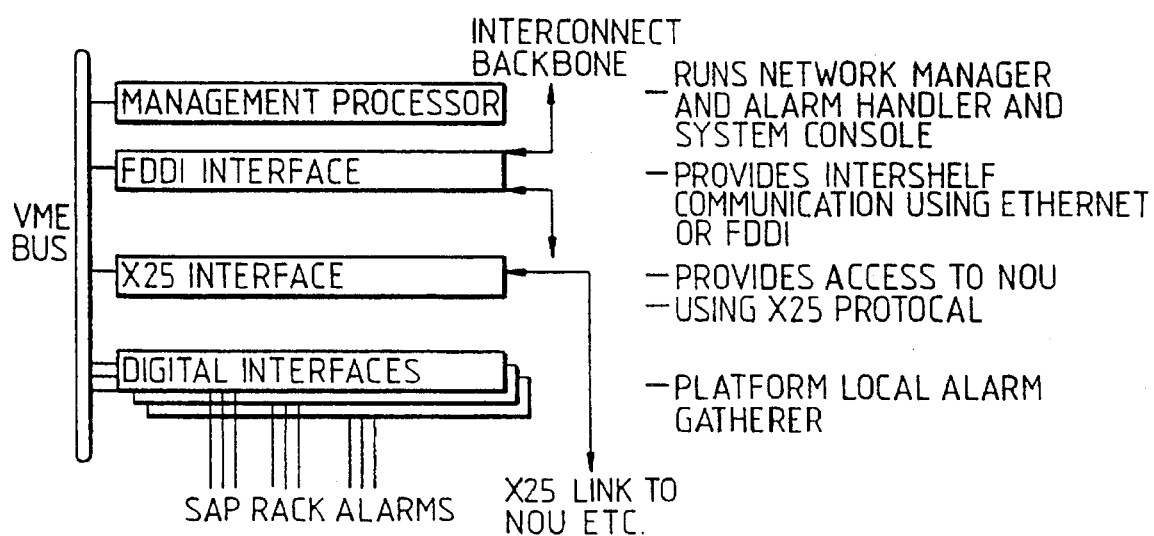
FIG. 13 shows schematically the hardware organisation of a management shelf for use in a speech platform according to the present invention.
Figure 14:
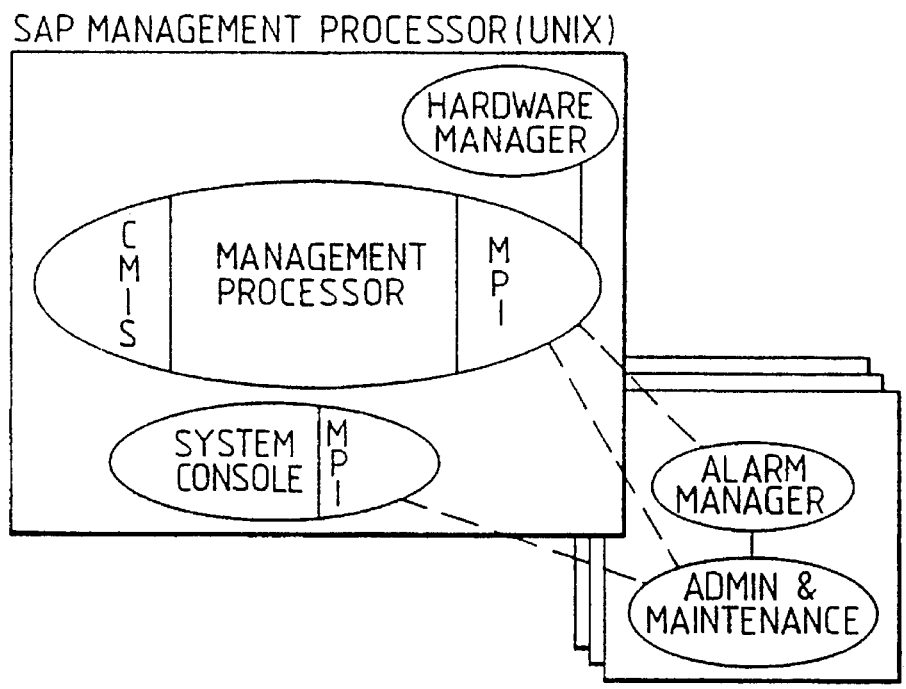
FIG. 14 shows schematically the software organisation of a management shelf for use in a speech platform according to the present invention.

The SAP management shelf provides the methods of access to all external control interfaces. FIGS. 13 & 14 show the organisation of the SAP Management shelf which is normally housed in a separate shelf in the miscellaneous equipment rack. Communications with the remainder of the SAP is via the interconnect backbone. The management shelf will contain digital interfaces which are used for gathering SAP hardware alarm conditions from the SAP. The management processor will also control the X25 interface to the ADPN. This is the connection which will be used for the transmission of data to the NOU. This link will also be used for remote management, service provision, etc.

The functionality of the shelf is:

Equipment Management—installation, removal, & status control of all hardware and software;

Configuration Management—logical installation and removal of equipment; configuration of software;

SAP Error Handling & logging—managing alarms/errors and taking remedial actions as appropriate;

SAP health checking—providing an active system monitoring facility to prevent dormant faults;

System boot up—re-loading equipment with the correct configuration at start up

System Statistics Provision—on-line statistics provision and statistics history logging. Also generates logs of system accesses and controls transfer of information to the OMC;

Software and data back up—Management of automatic and manual back up;

Service management—Depends on the application but could include such tasks as creating, modifying and deleting customer profiles, importing and exporting customer profiles to/from administration node;

Terminal Access Control—All access from both local and remote terminals will be controlled via the system management processes.

The Fileserver will provide the main storage for the SAP. The required capacity of a fileserver will be application dependent. A fileserver consists of a controller with connection to the interconnect backbone, a mass storage medium which can be dimensioned and supplied as required, and a controller to access the different components of the mass storage. A fileserver will control several filestores and several fileservers may be required for some applications. One of the main factors in dimensioning a fileserver will be whether the application is an information capture system or an information provider system.

The fileserver holds all the data necessary to provide the service. This comprises such things as system software (including SAP system software), application software, error logs, system prompts, channel related information, customer profiles, and customer messages.

The main considerations for the fileserver are the access times, the security of the data, the capacity of the filestore for the initial application, and the growth characteristics of the selected design. Network File System (NFS) communication protocol will be used for file transfer between the Fileserver and its connecting elements i.e. Archiver, SAP processor, and Management Component. NFS as been chosen because it is an open protocol and the SAP system requires NFS protocol for its file access.

Figure 15:
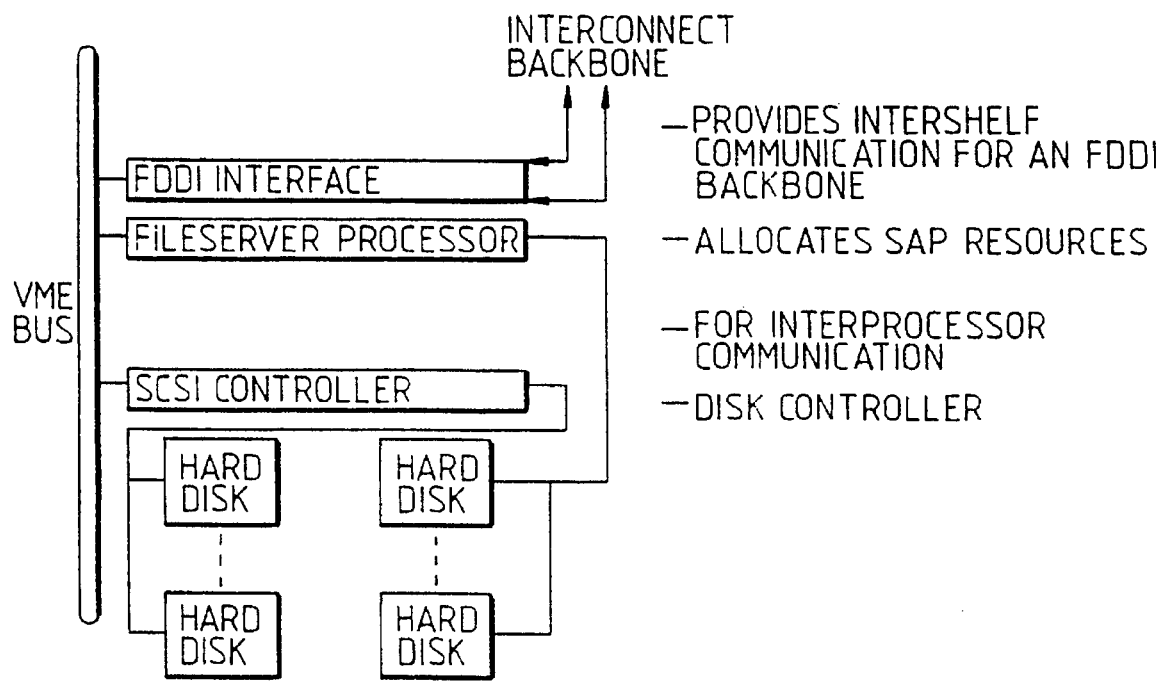
FIG. 15 shows schematically the physical architecture of a file server for use in a speech platform according to the present invention.

The fileserver will generally be mounted in its own VME shelf FIG. 15 shows a typical shelf layout for the fileserver.

If Ethernet is used for the backbone, the Fileserver processor will need to provide the networking function described in the overview section. If FDDI is used for the backbone, then the FDDI card will be required as shown.

The fileserver processor has a SCSI interface which may be used for interfacing to the filestores. This interface has a limited drive capability, so an additional SCSI board may be required for some applications. The filestores will be connected to give protection of data even when a filestore is faulty, this is normally achieved by the technique known as 'mirroring', which ensures that critical data is at least duplicated.

It must be possible to determine how services running on SAPs are perceived and used by the customers. This is accomplished by monitoring the system while running a service and extracting data that can be post processed to determine the service usage.

The Archiver is a tool for collecting the data which is primarily required for off line processing. Any data required for on line processing (generation of statistics etc.) is not the responsibility of the archiver.

Data generated by speech platforms can be considered in three main categories. The first category is data that is required to run the service. The second category is data generated to give an indication of service performance, but not essential to the running of the service. The third category is data that is required for both the service and for call reconstruction. The first data category will always be stored on the platform fileserver which is secure storage. The second category will be stored on the archiver hard disk. The third category will be stored on the fileserver because it is required by the application and a duplicate copy will be put on the archiver hard disk when the load on the interconnect backbone is low. The archiver hard disk will store temporarily all the data required for archiving.

It is possible to software configure the system to determine the amount and type of data to be archived. The functions of the archiver are:

1. accept the data that has to be archived
2. store the data until it is required for down loading
3. down load the data to the required destination when either polled for the information or when archive space is becoming full.

The down loading process can be either to removable media or electronic links to the data processing site.

Figure 16:
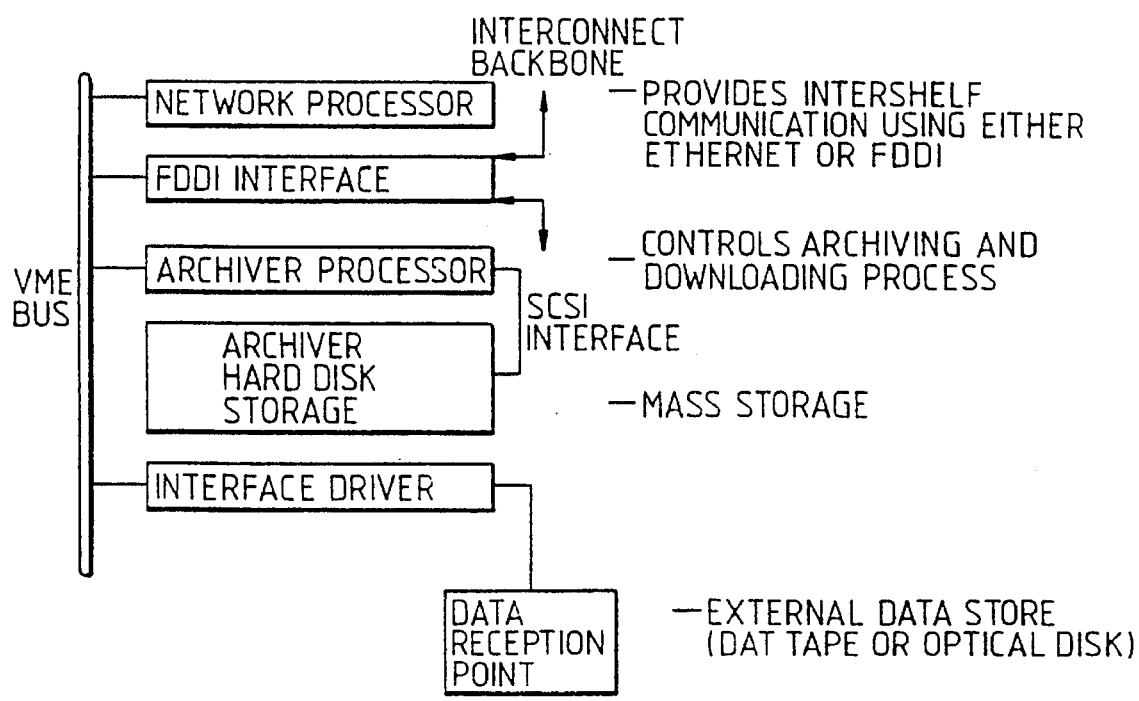
FIG. 16 shows schematically the hardware organisation of an archiver for use in a speech platform according to the present invention.

FIG. 16 shows an external data store as the destination point for the data. This point can be either local as shown with the DAT tape or optical disk as the storage medium or remote with data transmitted over a high capacity data link (e.g. ISDN, FBS, etc.) using FTAM protocol.

In general, speech services use pre-recorded prompts to interact with a caller, and the caller can reply either verbally or by using MF4 signalling tones. The replies made by the caller are interpreted to determine which oath is taken through a dialogue.

It is necessary to estimate the required configuration of a SAP which is dedicated to a particular service. Using statistical methods to obtain this information becomes very detailed and complex, especially when specific situations like inadequate resources, different allocation strategies and different dialogues are taken into account. Given the behaviour of the SAP and the caller, the operation of the SAP can be simulated.

The SAP is designed to use general purpose, multi sourced processor boards. There are two main type of processor boards used in the SAP, the first type are based on the Motorola 68030 or 68040 processor running VxWorks and the second based on the SPARC architecture running Sun compatible Unix. The first type can be used for the Network processor, Control processor and Telephony processor. The second type is for the Application processor, general communications and management processor.

Requirements for Type 1
1. The boards are typically based on Motorola processors (either 68030 or 68040) running at 25 MHz or faster
2. The boards may be based on low cost derivatives of the Motorola 68OxO providing they are supported correctly by the operating system
3. The boards will have at least 4 Mbytes of RAM although more RAM may be necessary dependent on the application
4. The boards will have a serial terminal port available on the front panel Operating System for Type 1
5. The boards will have a supported VxWorks Board support package available. The SAP currently uses VxWorks version 5.0.2.
6. The boards will have at least 256 bytes of non volatile memory for storage of configuration parameters
Shelf Networking Requirements for Type 1
7. The boards will be able to access a 512 Mbyte region of VMEbus Extended memory space. If page access only is available, the page will be selectable, and the board will at least be able to access the Extended memory region 40000000H to 5fffffffH
8. The boards will offer D32,D16,DO8(EO) data access modes to the above space
9. The boards will offer Read-Modify-Write capability to the VMEbus
Specific Additions for Network Processor
10. The Network Processor board will be able to share all its local memory with the VMEbus
11. The Network Processor board will offer VMEbus Interrupt handler capability on all interrupt levels
12. The Network Processor board will be capable of providing VMEbus slot I system controller functions
13. The Network Processor board will have an Ethernet interface available on the front panel
Specific Additions for Control Processor
14. The Control Processor will have an interrupt handler
Specific Additions for Telephony Processor
15. The Telephony Processor will have an auxiliary timer available
16. The Telephony Processor will have an interrupt handler
Requirements for Type 2 (Application Processor)
17. The boards will be based on the SPARC processor architecture
18. The boards will run SunOS 4.1x or an equivalent operating system.
19. The boards will have at least 16 Mbytes of memory
20. The boards will have an Ethernet interface available on the front panel
21. The boards will have a serial terminal port available on the front panel
Recommended Processor Boards

|  | Force CPU 30ZBE/4 | Force CPU 40/01 | Force CPU 40/00 | Force Radstone PME68/42 | Force SPARC 2CE | Force SPARC 1E |
|---|---|---|---|---|---|---|
| Network Processor | Y | Y | N | Y |  |  |
| Control Processor | Y | Y | Y | Y |  |  |
| Telephony Processor | Y | Y | Y | Y |  |  |
| Application Processor |  |  | N |  | Y | Y |
| Management Processor |  |  | N |  | Y | Y |
| Fileserver Processor |  |  | N |  | Y | Y |
| Archiver Processor |  |  | N |  | Y | Y |

Ethernet is used to boot the application processors as well as inter-shelf communication. The two preferred interfaces used for the interconnect backbone for SAP are Ethernet and FDDI. The choice between Ethernet or FDDI for the backbone is determined by the data transfer requirements of the offered services. The Ethernet interface is provided by utilising processor cards which include Ethernet interfaces. The advantages of using FDDI over Ethernet are:
1. Throughput—FDDI can operate up to 100 Mbit/s
2. Resilience—FDDI utilises two rings and will continue working without data loss as long as faults do not occur on both rings simultaneously.
General Requirements
1. The board must occupy no more than a single VME slot
2. The board must offer dual attached fibre capability
3. The board must be able to control an Optical Bypass Relay
4. The board must have a supported VxWorks 5.0.2 driver available
5. The driver must be able to be linked into the Network Processor in such a way as to support transparent network accesses from the rest of the shelf network (i.e. the Network Processor must be capable of routing traffic to/from the FDDI interface in the same way as the Ethernet interface).

6. If possible the driver should support the use of the Motorola 68040 data cache on the Network Processor.

The recommended boards are:

Interphase V/4211

CMC 1156

The Speech Processor card performs all the speech processing associated with the Speech Applications Platform. It must support a wide range of current and future speech algorithms under the control of a Real Time Operating System.

Figure 17:
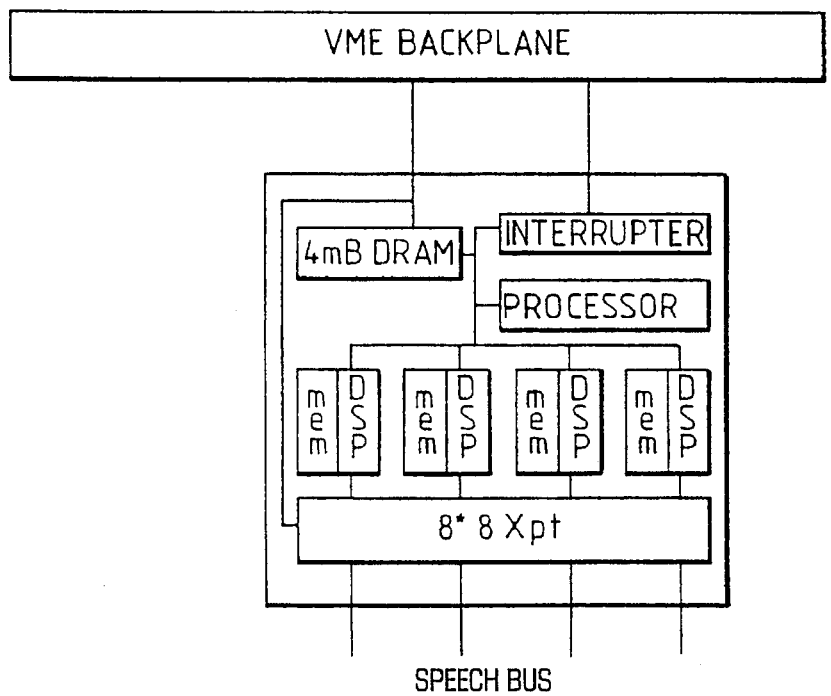
FIG. 17 shows schematically the functional blocks of a speech processing card suitable for use in a speech platform according to the present invention.

FIG. 17 shows the main functional components of a speech card. The card will support a VME slave interface and the central processor will be a Motorola 68020 or 68030 with 4 Mbytes of memory which is accessible from both the processor and the VME bus. An EPROM (256 KBytes) is included to enable the operating system to be loaded after reset and a 512 byte non volatile memory to hold configuration parameters. The VME interrupts may be used for communication between the shelf network processor or shelf control processor and the speech card processors, but the DRAM is the sole method of data transfer between the VME bus and the DSP's. The speech board processor cannot directly access the VME backplane. There is also a serial port per board mounted on the front panel available for diagnostics, etc. This port is controlled from the board processor.

There are 4 DSPs per processor card and any speech channel can be serviced by one or more DSP. Each DSP has 16k*24 bits wide program memory, 8k*24 X data memory and 8k*24 Y data memory for running programs. Additionally there is 16k*8 of X memory and 16k*8 of Y memory available for general purpose storage. P memory is used for program memory and the X and Y memory is used for data memory. All DSP memory is operated with zero wait states. Each DSP's memory is not accessible from the other DSPs or the main processor. Programs for the DSPs are downloaded from the board main processor and loaded into the DSP program memory using the port B (host port) of the DSPs. The DSP are connected together in pairs using the SCI port for inter DSP communication.

Each speech processor card has a 8*8 crosspoint switch which is controlled by the control processor board over the VME backplane. This crosspoint switch can connect any one of 128 channels on the speech bus to any DSP on the card.

Each line interface card can support two 2.048 MBit/s PCM line systems. The functions of the card are to receive the 2 Mb/s line signal, extract the line clock, realign the data and detect any alarm conditions. On each board there is an 8*8 time space non blocking switch which interconnects any incoming channel to 4 Mitel ST busses commonly referred to as the speech bus. The speech bus is the mechanism for interconnecting the line cards and the speech processor cards and there are 128 timeslots available on the speech bus. The configuration of the crosspoint switch is controlled by the control processor card over the VME backplane bus. Also provided on a per card basis is a Vii output to provide a 64 Kb/s synchronous serial link for the timeslot 16 C7 signalling. Not all the PCM systems will have C7 signalling in timeslot 16, but this will be determined dependant on the SAP installation.

The line card is a 6U VME size card and a barrier board is connected to the card by plugging it onto the line card connectors on the rear of the Speech Bus. The function of the barrier board is to provide line isolation.

The speech bus is a passive board which provides the interconnection method between all the line interface cards and speech and signalling processor cards on a shelf.

Figure 18:
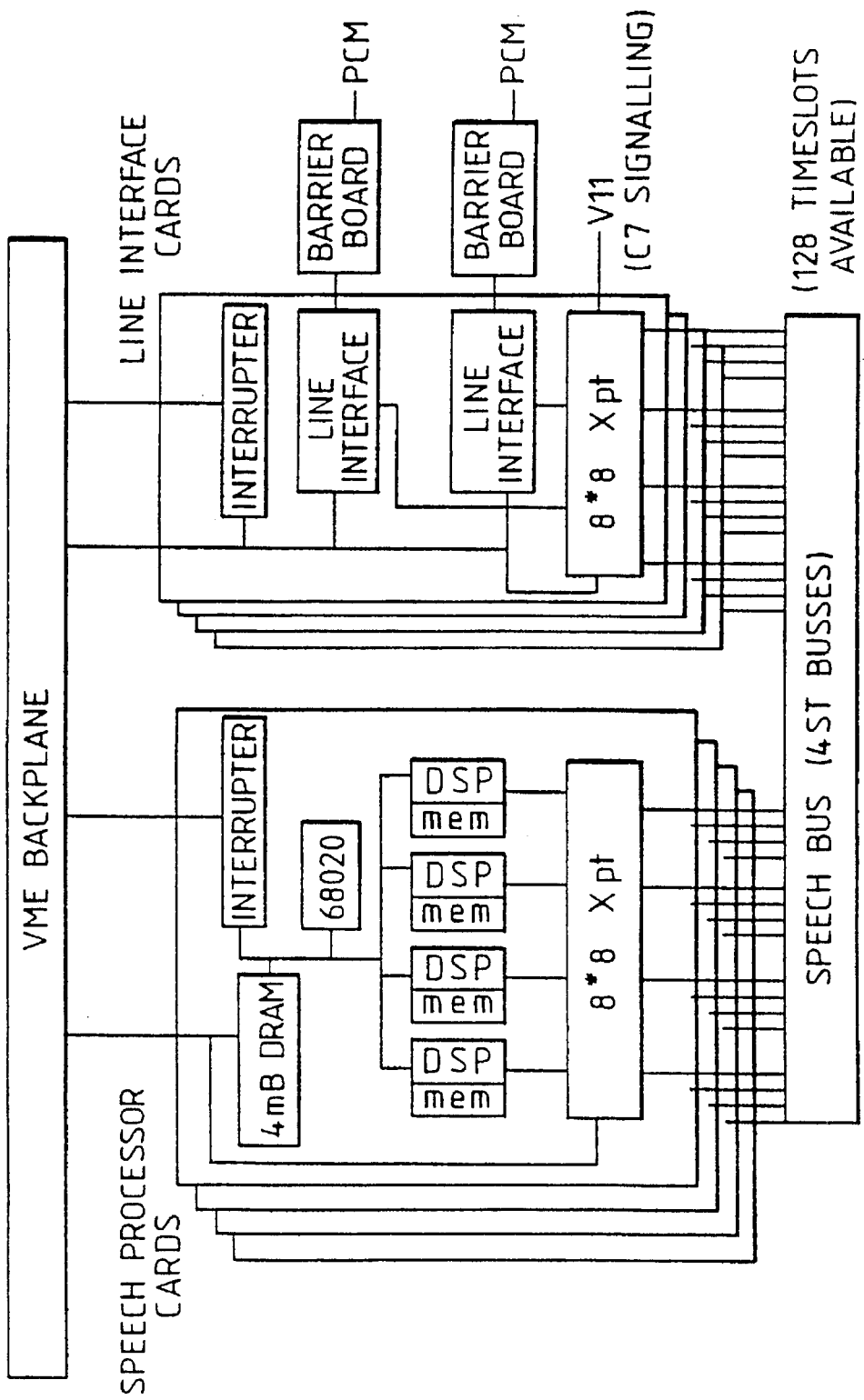
FIG. 18 shows schematically the logical interconnections of the speech bus between speech cards and line interface cards in a speech platform according to the present invention.

FIG. 18 shows the logical positioning of the speech bus. The speech bus caters for 128 timeslots on four serial highways. Any one of the timeslots can be used for connecting any incoming PCM channel to any DSP on that shelf.

Figure 19:
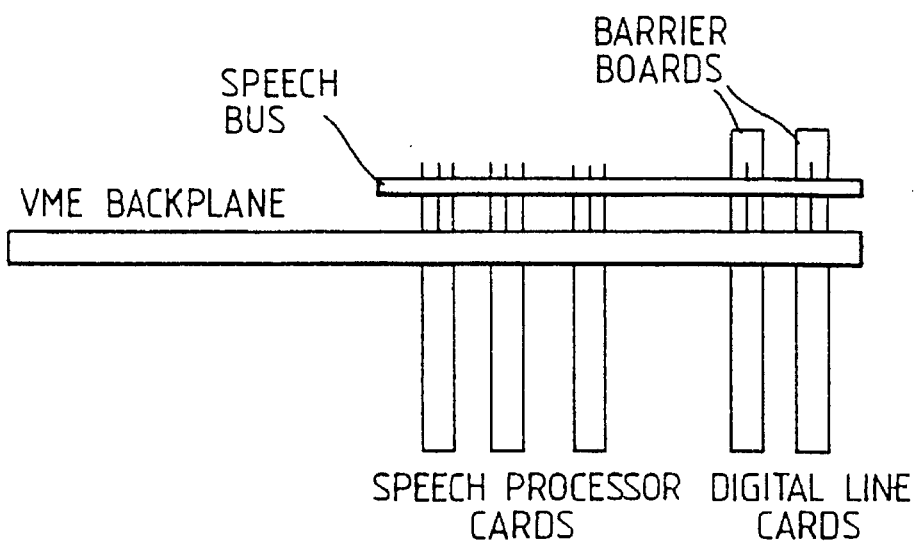
FIG. 19 shows schematically the physical positioning of the speech bus.

FIG. 19 shows how the speech bus is positioned on the rear of the VME backplane. The connection is made to those pins on the J1 backplane connector which are not allocated for VME bus transactions. The barrier boards plug onto the speech bus for the 2 Mbit/s connection and provide the line isolation function.

The fileserver for SAP applications is mirrored for security of data and provided in modular form so that filestores can be added as required by the application or for the incremental expansion of the fileserver as the service expands. The application processor on each fileserver shelf has a SCSI port but this port bas a limited fan out to disks. Another SCSI port is required to enable a significant number of disks per fileserver to be accessed. Added advantages are that disks can be accessed concurrently, which depending on fan out and partitioning, can write to a disk and its mirrored component together. Another advantage is that the data throughput on the fileserver is improved.

The card requirements are that it is a 6U height card with a VME bus interface and provides a SCSI connection to the filestores it serves. It must also run under UNIX to make at similar to the application processor running the NFS software. The fileserver software running on the application processor will communicate with the SCSI card over the VME backplane and treat the SCSI card as an additional port for access to the filestores. The recommended card is Ciprico Rimfire RF3563

The SCSI card is used in the Fileserver racks for SAP applications.

All the processor cards used on the platform have their own memory areas, but this memory is normally only visible to the CPU on the card. Shared memory can be used to provide a processor communication path across the backplane if required.

Figure 20:
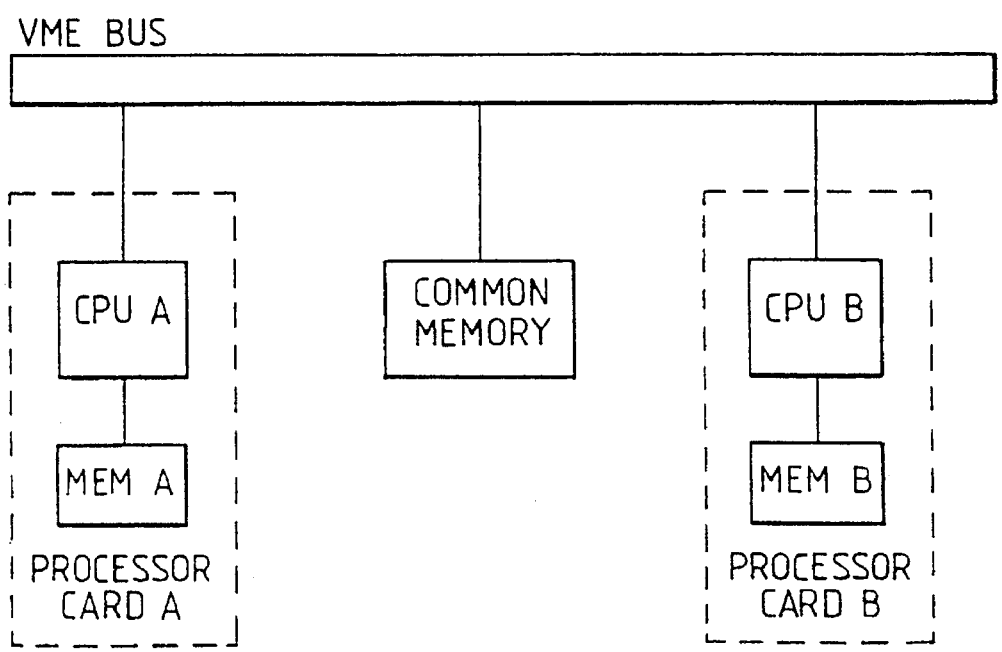
FIG. 20 shows schematically the logical positioning of memory cards.

In FIG. 20 CPU A can always access Mem A and CPU B can always access Mem B. But if CPU A needed to access data in Mem B then either CPU B would have to be inhibited for the duration of the transfer from Mem B to CPU A and the action would have to be controlled by CPU A or CPU B would have to access the data on behalf of A and present it onto the VME bus. In either case CPU B has stopped its normal processing and the transfer is a complicated mechanism. The alternative is to supply an extra memory module which can be used as shared data and connect it to the VME bus. Either CPU can now access the data whenever it requires it. Lock out mechanisms may be required whenever a CPU is writing to this shared area of memory.

The memory card used is a standard 6U height VME compatible memory card with 2 Mbytes of memory. Access times should be compatible with those used on the processor cards so that wait states are not required.

The C7 Front End Processing functionality is provided by an M68040 processor card which will run layers 2 & 3 of the c7 protocol. The signalling information is derived from the Digital Line Interface card via a V11 link. The FEP must interface to the backbone for the installation so an FDDI card may be required for the transmission of the C7 message set to the telephony processor on the Speech and Signalling Processing shelves.

Redundancy in this unit is provided by duplication of the processor and FDDI cards across a split backplane.

Each application may require different I/O requirements. These requirements will be provided by Intelligent I/O cards of which there are two categories. These are:

i. Intelligent Parallel PO (IPIO) cards
Intelligent Serial I/O (ISIO) cards

These lines (i) of parallel PO can be supplied with a general purpose VME compatible board to which different modules can be added to provide up to 32 inputs and 32 outputs at TTL levels. The added modules can support different families of logic at the interfaces e.g. open collector (oc), TTL, CMOS, opto-isolators, etc.

In several SAP applications, alarms will be monitored for correct operation of the system. If an alarm is detected, then either reporting of the alarm or corrective action can be taken by the software. In most applications, any detected alarm will be notified to the NOMS. The method used is to have all alarms taken to a central unit (IPIO) and if the alarm goes active the condition is relayed to the controlling software. The IPIOs are normally placed on the Management shelf. In SAP applications the interface will normally be open collector with pull ups monitored by opto isolators on the input side and relay contacts on the output side.

The recommended card for this function is Rads tone PME PIO-1

Some applications will require serial interconnections to peripherals. These serial links will be supplied by intelligent Serial 1/0 (ISIO) cards. These boards have module daughter cards which provide for the transmission of data to standards such as RS232, RS422 etc.

The SAP racks require secured supplies of +5 v, +12 v and −12 v.

These requirements will be provided by DC-DC or AC-DC power supplies positioned in the base of each rack. The allowed Wide Voltage Limits (AWL) will be −44 v to −54 v input to the DC-DC converters. Each rack will have its own PSU and will be fed via different fuses and power feeds from the −50 v supply or 240 v AC. A complete PSU facility will comprise up to 4 modules (depending on load) configured as N+1 to provide for resilience and a high level of reliability. Each module can be replaced separately without taking any part of the rack out if service for maintenance and support purposes.

The DC input voltage to the SAP PSU assembly may be provided from an exchange Power Equipment Rack (PER) and Main End Panel (MEP). The PER guarantees the voltage input for network based operational equipment.

The thermal management of the racks is controlled by each PSU having its own internal fan and supplying fan trays (each capable of holding six fans) below each of the shelves on the rack.

All the racks used in a SAP installation will be industry standard 19" racks configured as shown in the previous section (Power Arrangements) with a fan tray below each shelf for heat management. An extra rack for the PEM function will be required for network based applications.

Each of the shelves will be a VME standard 6U size fitted with a VME bus.

Up to four PSUs will be fitted per rack at the base of the rack to supply the +5 v, +12 v and −12 v supplies. The number will be determined by the service being run on the platform.

23. NBCAS SERVICE

23.1 Service Description

NBCAS is a network based call answering and storage service.

When a customer of the service is using their telephone (or has not answered it after a given period) then the NBCAS will answer the call, tell the caller that the phone is busy (or un-answered) and offer to take a message via a simple dialogue.

A variety of methods can be used for alerting a customer that there are messages waiting. These potentially can be:

i) sending a message directly to an intelligent display phone ii) altering the cadence of the dial-tone iii) Sending a message to a paging device iv) by the customer contacting the service directly If the message was left on the system because the phone was in use then, the system will attempt to call back, when the phone becomes free.

When the customer calls the service (usually via a level I number) they will enter a message retrieval phase (or dialogue), or optionally, be able to change certain parameters pursuant to their answering service.

If message retrieval is selected the customer can then listen to their messages and save or delete them. Only a limited number of saved messages or a given total time for all messages can be held and the customer will be alerted about the unused time and/or number of messages used.

Otherwise, the customer can change the parameters on their service. These parameters include:

Number of ring cadences before the service will answer on ring tone no reply.

The message given to callers by the service.

If a new telephone call comes in during message retrieval the caller will be connected to the NBCAS system and asked to leave a message.

In addition, if the customer rings their own number and enters their PIN during the welcome dialogue they can retrieve any messages left on the system. If a PIN is not entered then the customer has the opportunity to leave a message on their own system.

Some of the features of the service will need to be made optional so that different classes of service can be offered to different customers. Features which can be varied according to service include number of messages and total stored message time, whether outgoing messages can be customised and the methods of notification of stored messages.

In order to provide and maintain the NBCAS Pilot service, the equipment and service must be managed and customer provision and cessation supported. This administration will be provided by both remote administration terminals dedicated to the NBCA. S Pilot service located in the Operational Maintenance Centre and Customer Service site, and local administration terminals co-located with the rest of the NBCAS Pilot platform.

To Callers all dialogue interaction must appear seamless. This implies that data access times must be fast enough for callers not to perceive any delays while messages are being collected from data stores and/or when switching application software to provide callers with different services within a call.

Figure 21:
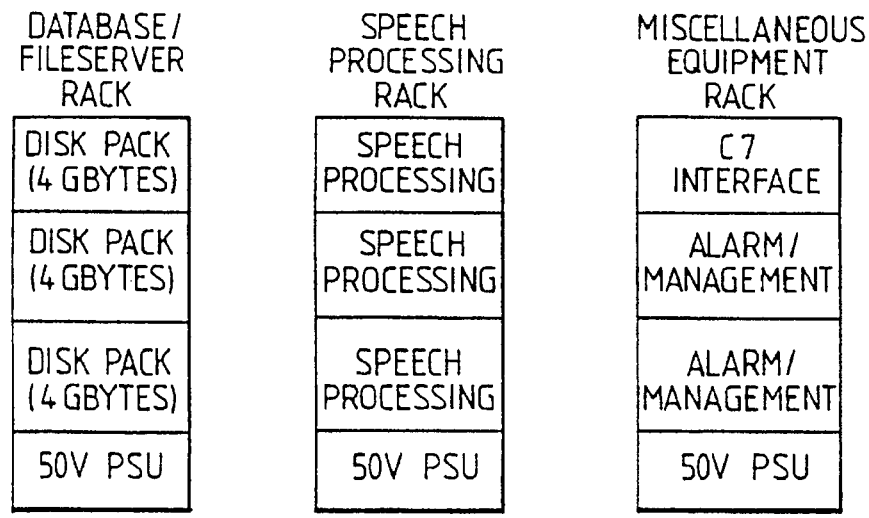
FIG. 21 shows schematically a rack configuration suitable for use in a speech platform according to the present invention for the provision of a network based call answering service.

NBCAS can be laid out on three racks which comprise the main functional core of the system, see FIG. 21. There will be an additional rack which is to supply a guaranteed power source for the service.

Figure 22:
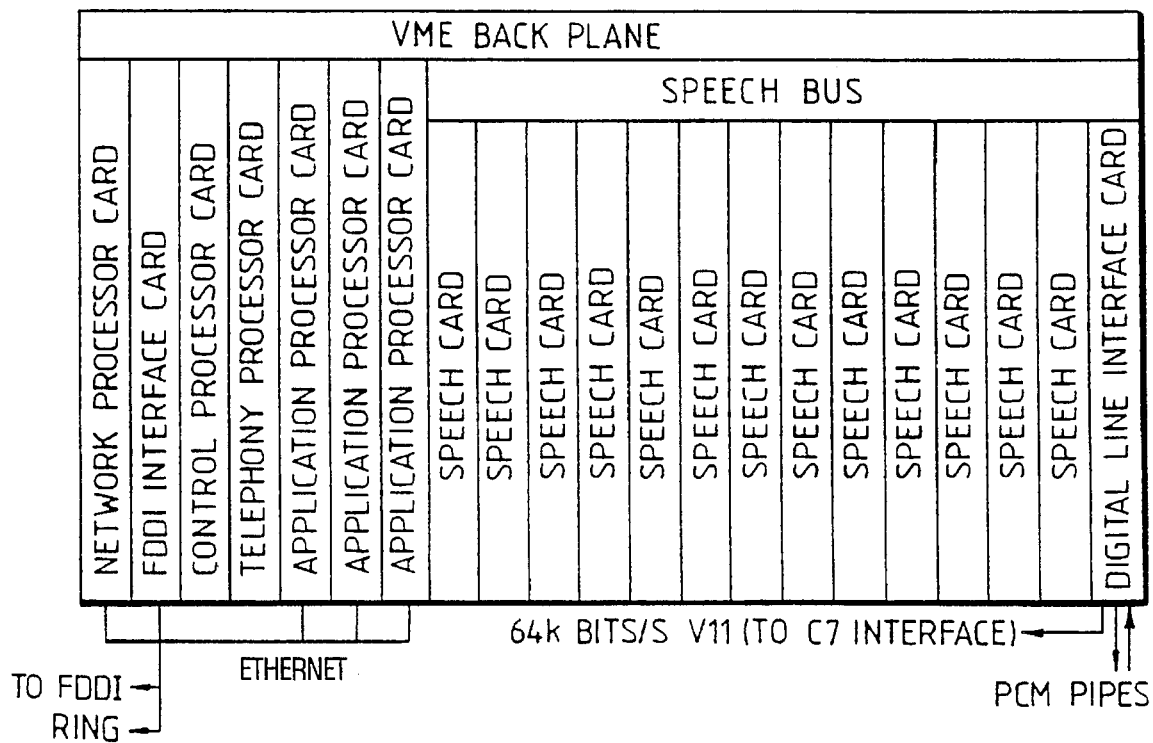
FIG. 22 shows schematically the layout of a speech processing shelf suitable for use in the rack configuration shown in FIG. 21.

The component requirements for a SAP speech processing shelf to supply an NBCAS service are:
1 VME Backplane
1 speech Backplane (length to support 14 cards)
1 control processor card (Force CPU40)
1 network processor card (Force CPU40)
I FDDI Interface card
I telephony processor card (Force CPU40)
3 application processor cards (SPARC 2s)
1 line interface card
13 speech processing cards and they are configured as shown in FIG. 22.

Figure 23:
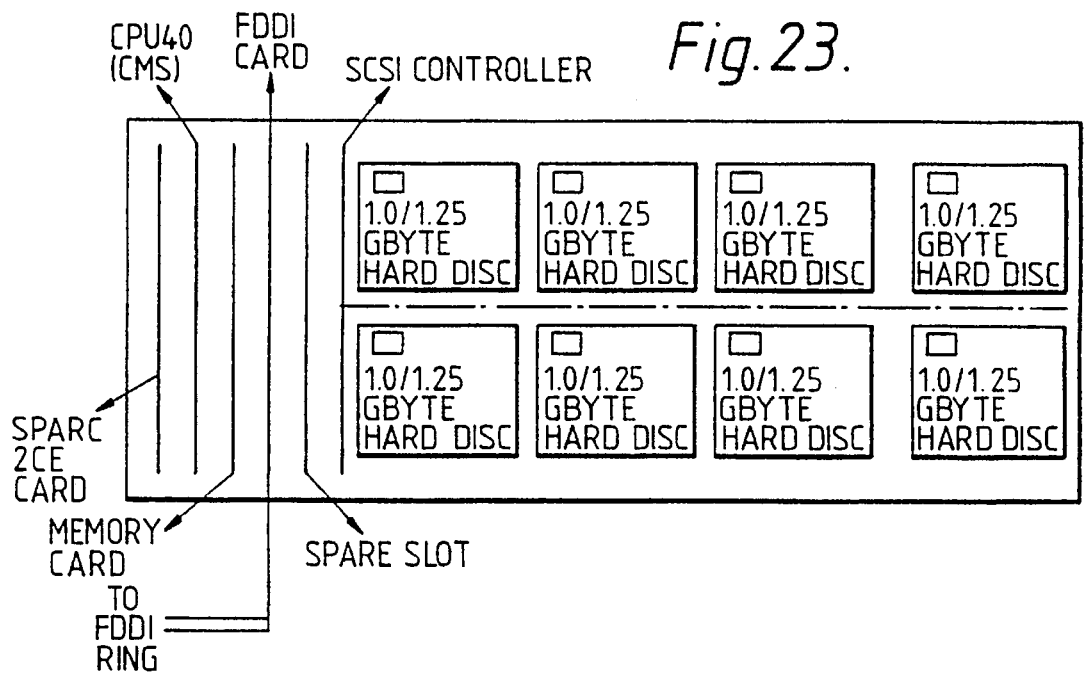
FIG. 23 shows schematically the layout of a file server shelf suitable for use in the rack arrangement shown in FIG. 21.

The component requirements for a SAP Fileserver shelf to supply an NBCAS service are:

1 VME Back Plane (6U high)
1 (SPARC 2CE) For running an Oracle Database and acting as a NFS Fileserver. 1 (Force CPU 40) For running a Customer Management System (CMS) 1 Memory card (1 mbyte) used for communication buffering 1 FDDI card for communication between racks and fileserver sub systems At least 3.2 GBytes of mirrored hard disc for data storage A Spare VME slot for additional processing capacity (if required).
and are situated on the shelf as shown in FIG. 23.

Figure 24:
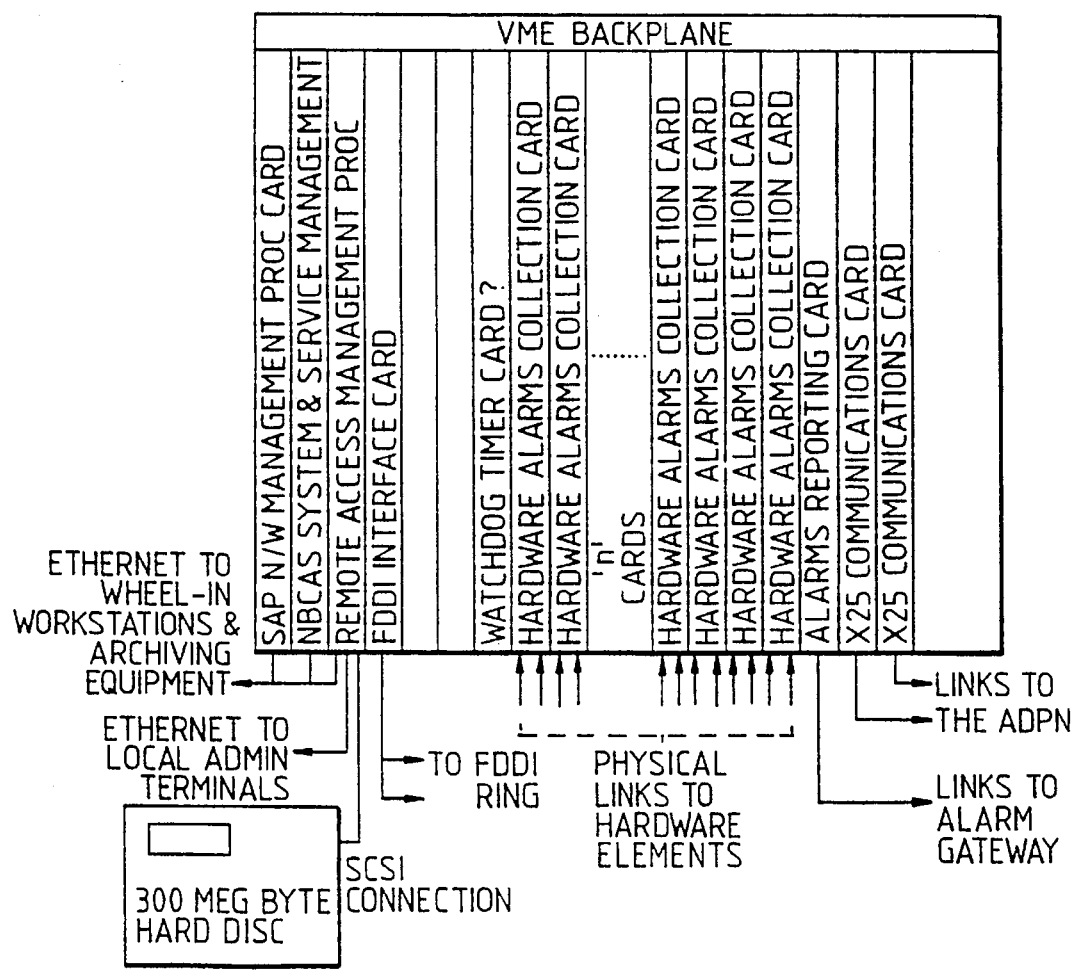
FIG. 24 shows schematically the layout of a management shelf suitable for use in the rack arrangement shown in FIG. 21.

The component requirements for a SAP miscellaneous shelf to supply an NBCAS service are as shown in FIG. 24.

Figure 25:
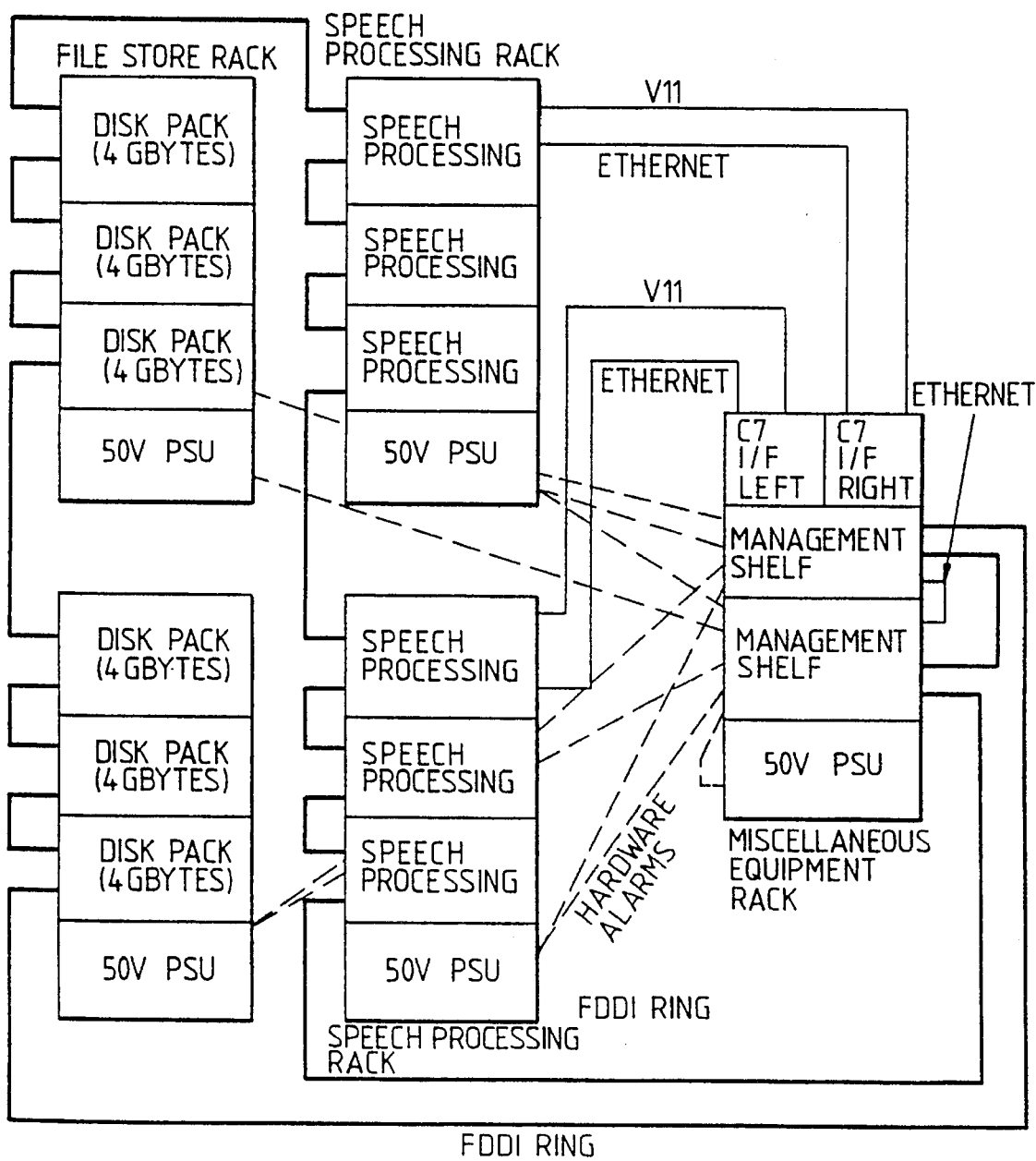
FIG. 25 shows schematically the physical links between shelves and racks suitable for use with the rack arrangement shown in FIG. 21.
Figure 27:
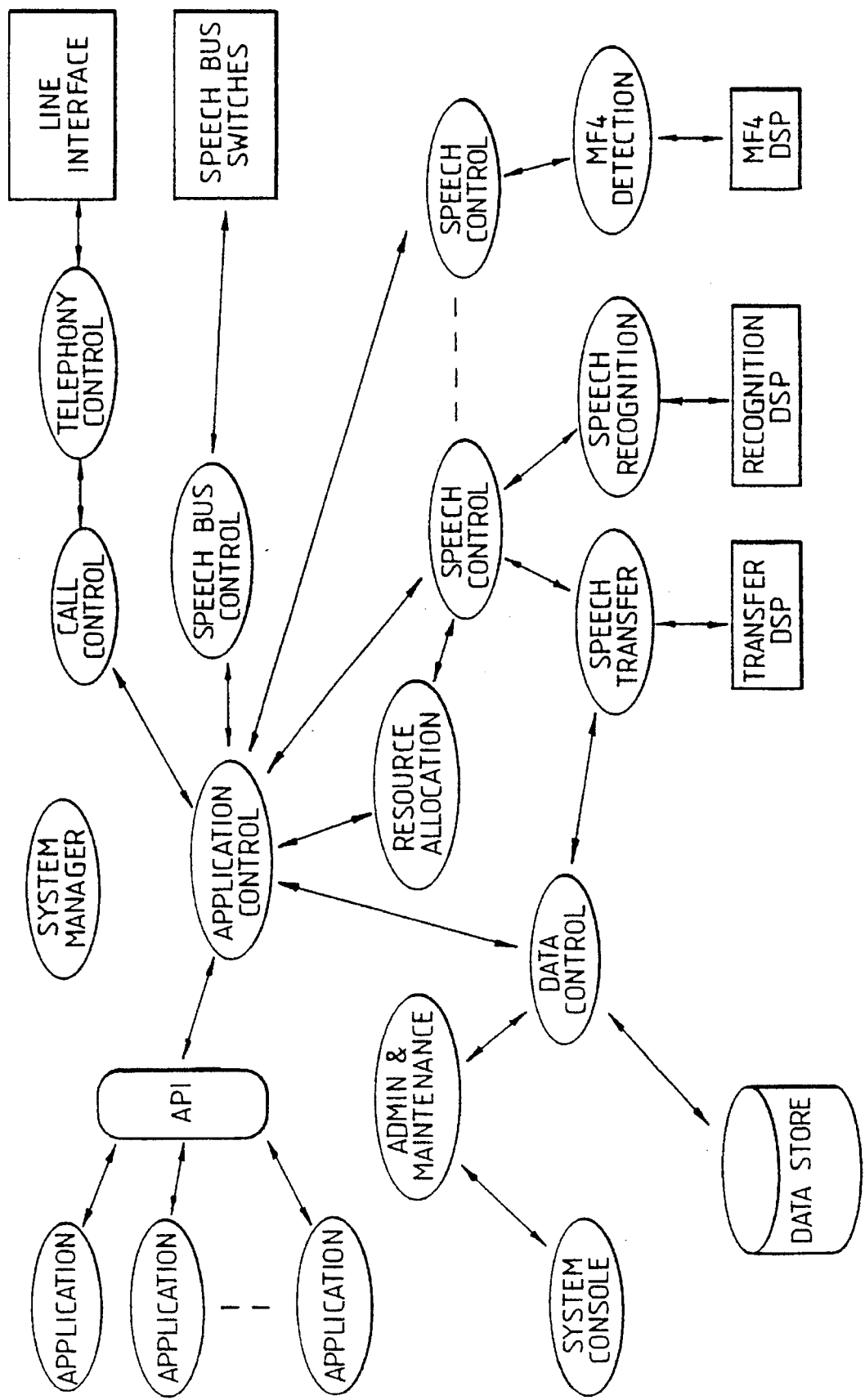
FIG. 27 shows schematically a software overview of a speech platform according to the present invention, giving a run time perspective.
Figure 28:
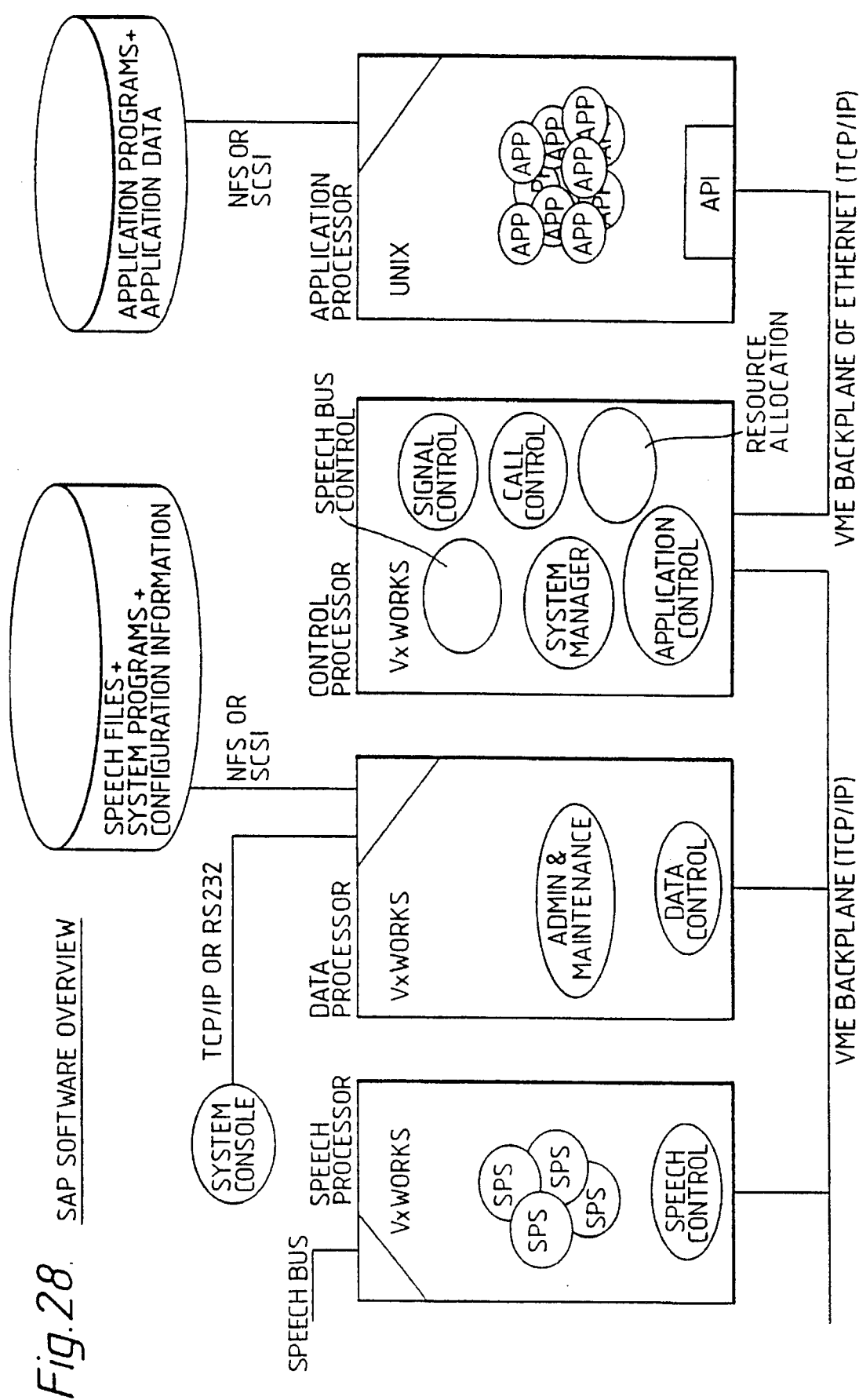
FIG. 28 gives a software overview of a speech platform according to the present invention.
Figure 29:
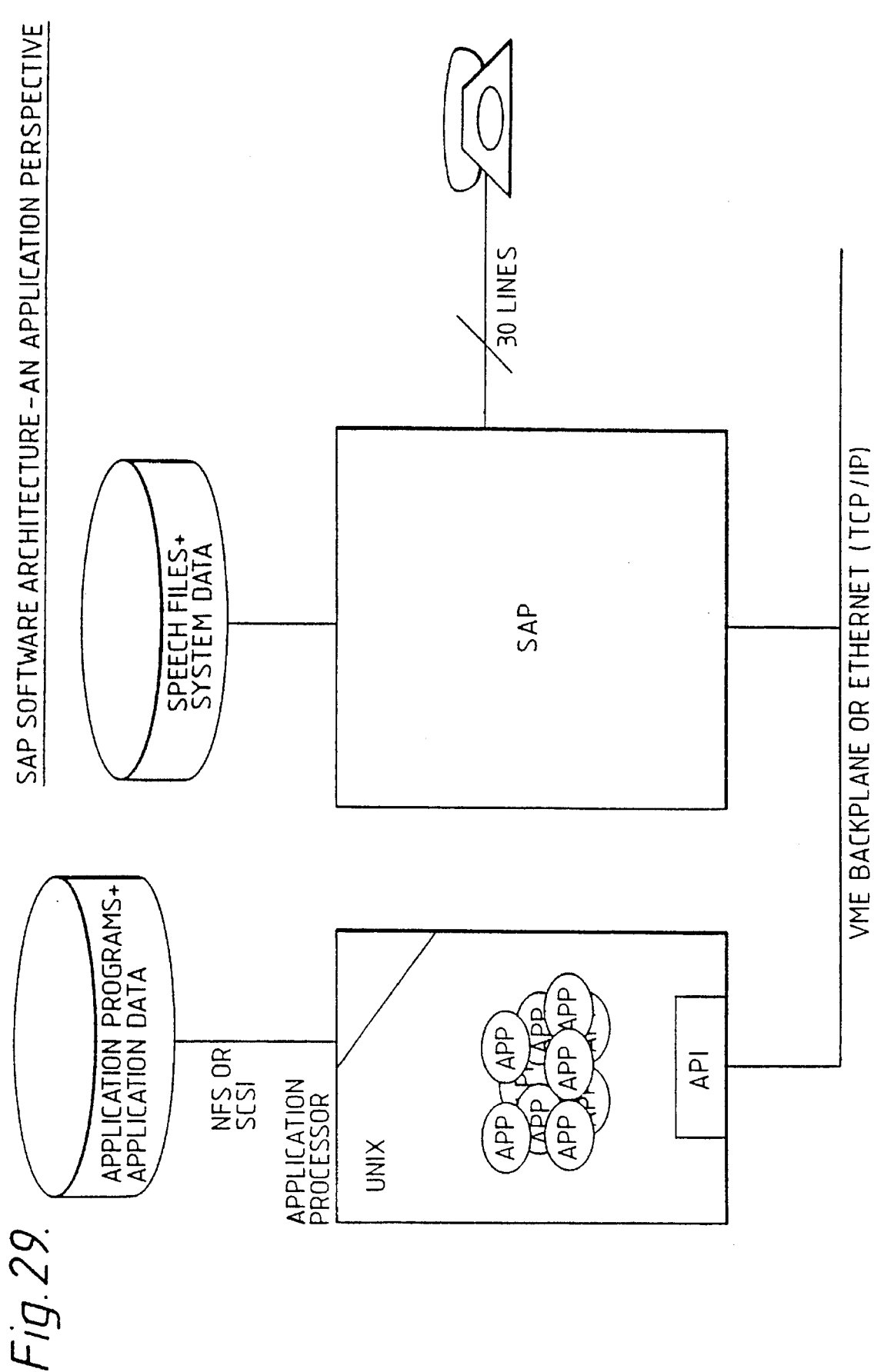
FIG. 29 is a schematic diagram illustrating the software architecture of a speech platform according to the present invention, from an application perspective.
Figure 30:
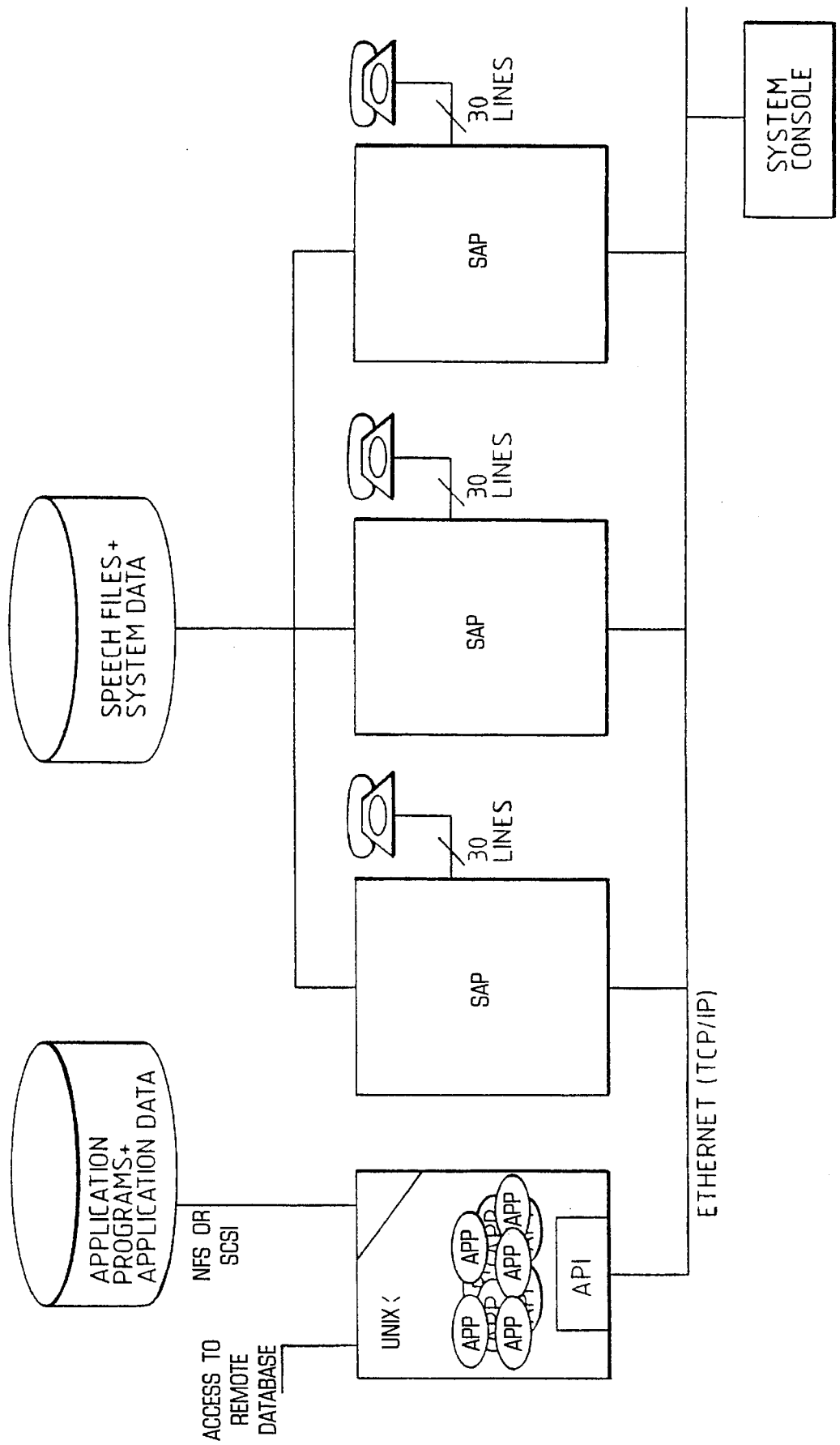
FIG. 30 shows schematically a software architecture for a speech platform according to the present invention, in this case an exemplary application configuration.
Figure 31:
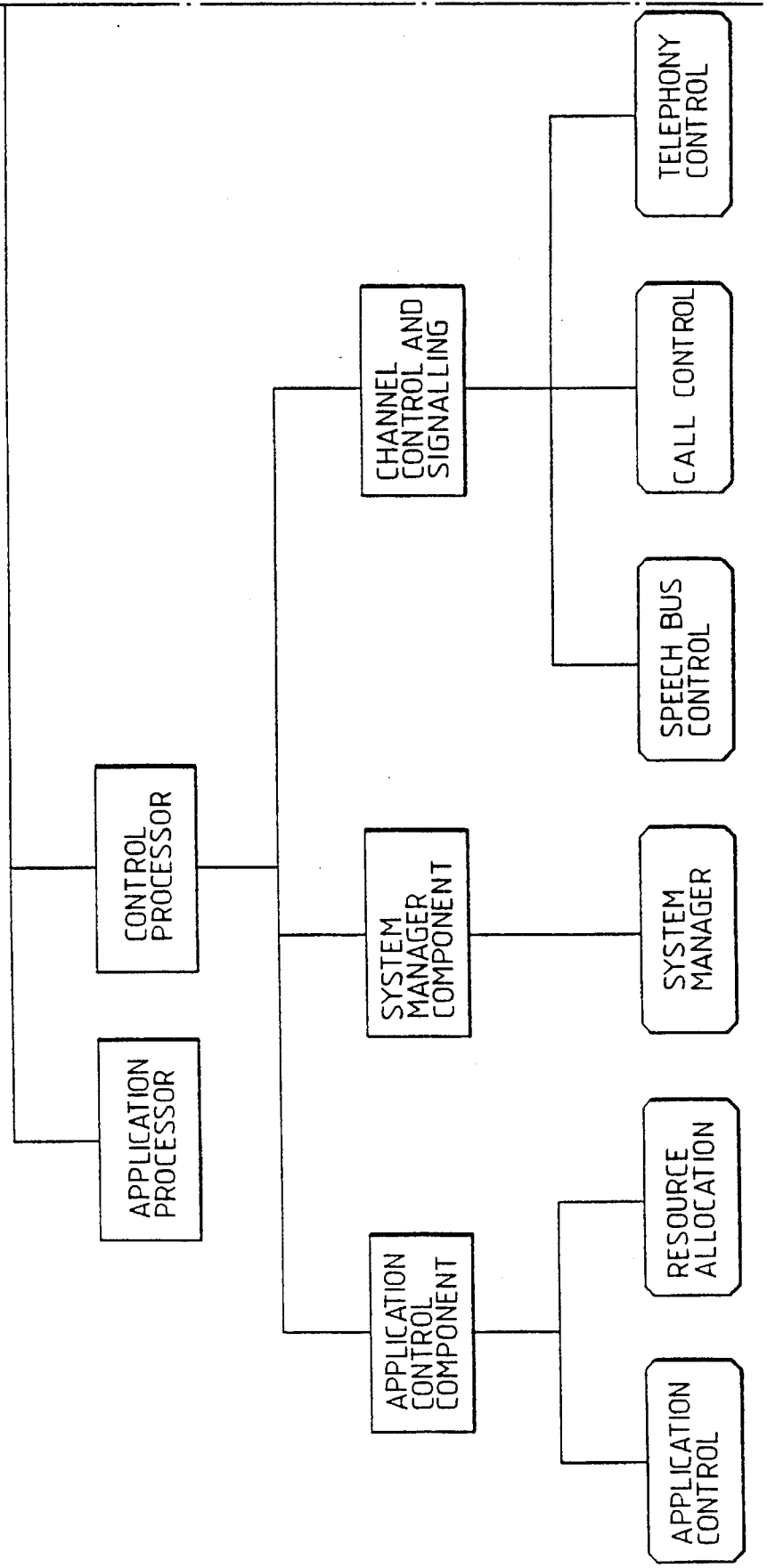
FIG. 31 as a block diagram showing the relationship between functional blocks of a speech platform according to the present invention.
Figure 31:
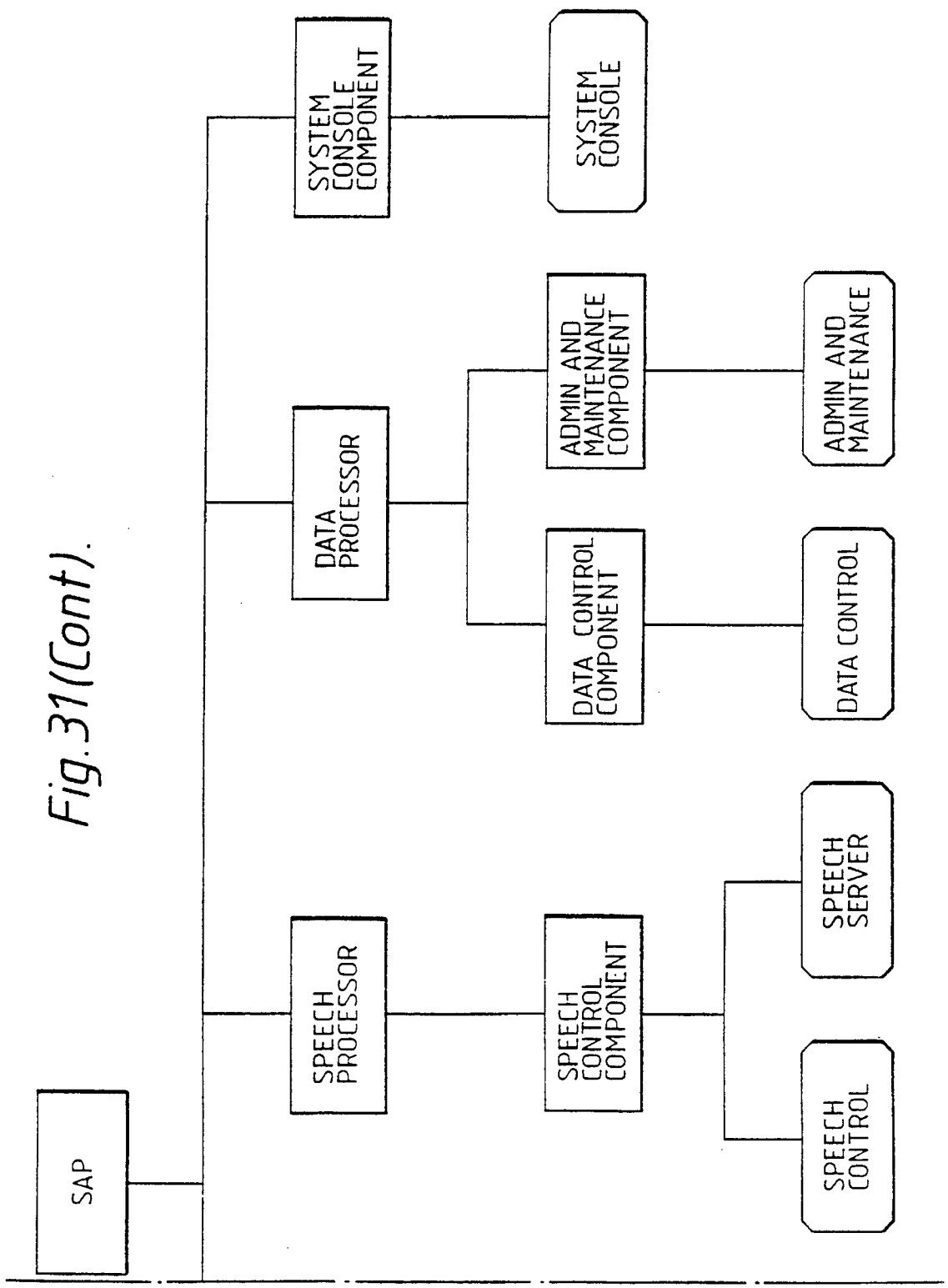
Figure 32:
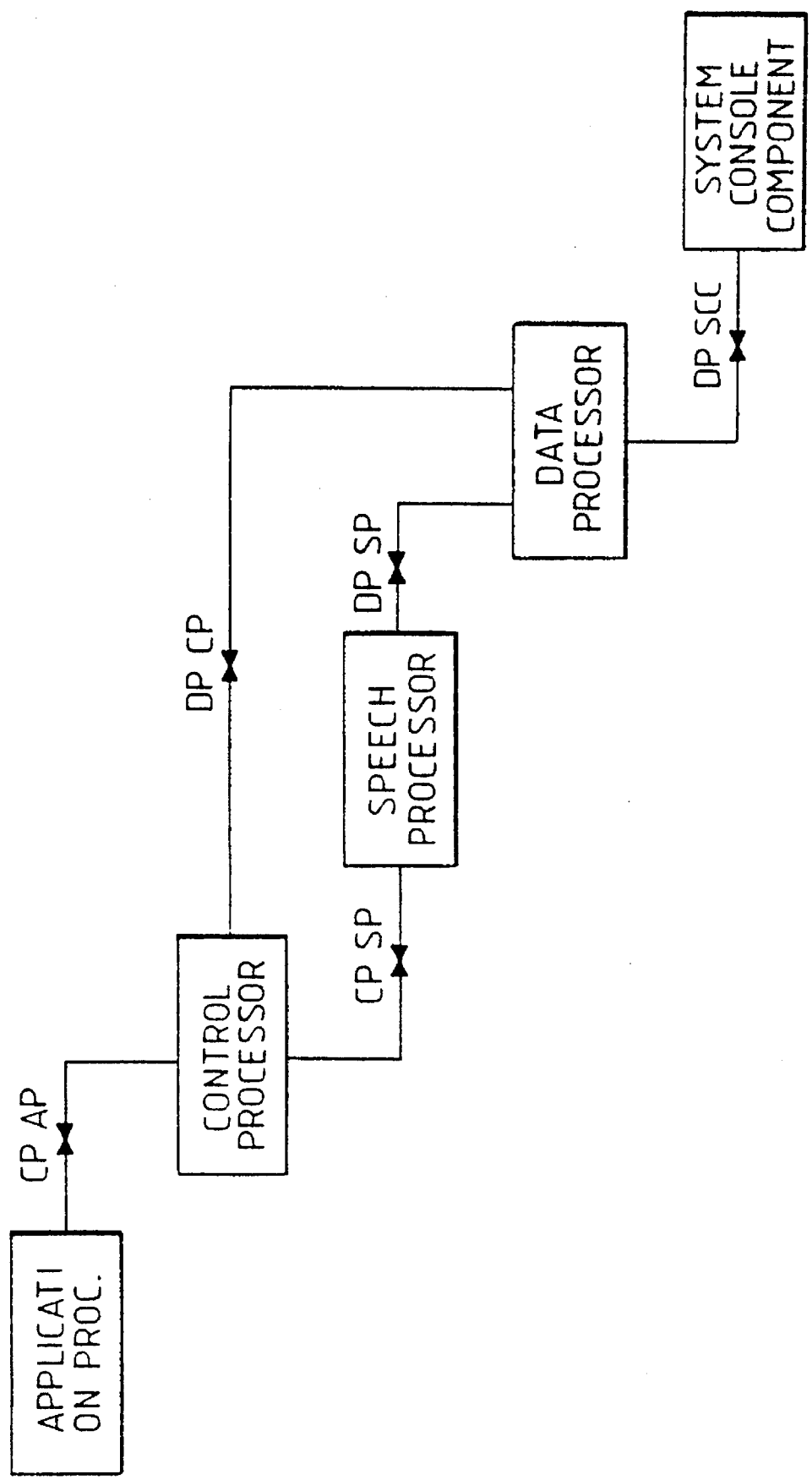
FIG. 32 is a block diagram illustrating message paths linking main processors in a speech platform according to the present invention.
Figure 33:
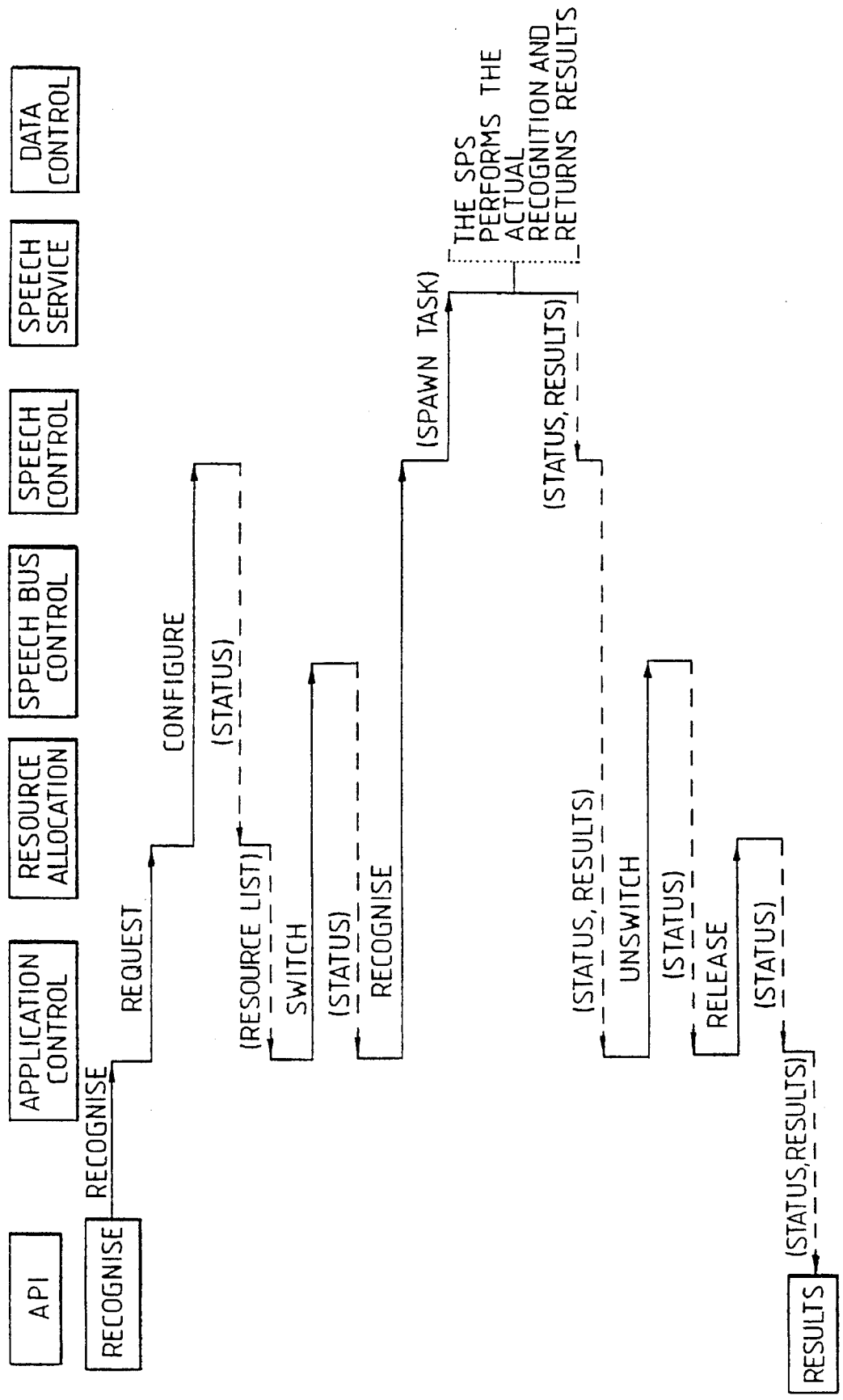
FIG. 33 is a speech recognition message chart for a speech platform according to the present invention.

The LAN interconnect diagram FIG. 25 shows how the racks are interconnected with an FDDI network to provide inter shelf and inter rack communication.

The operation of the speech resource allocator will now be described with reference to FIG. 5 much of the flexibility of the SAP is the result of the resource switching architecture. In many speech platforms, a call is processed by a single speech processing unit which is capable of performing all the speech processing required for a given application. However, the disadvantage of such an approach is that the speech processing unit often cannot utilise more complex speech algorithms without extensive upgrading. In platforms where each speech processing unit is dedicated to a single call channel, the platform is less cost effective for large installations because speech processing hardware that can handle the most complex speech algorithm must be provided for every channel—even if such processing is only required for a small percentage of the call.

The SAP addresses these aspects by maintaining a float of speech resources and by switching calls to a free speech resource as dictated by the application software. (Speech resources perform some speech or data processing function such as speech synthesis or speech recognition. They may be single or multi-channel depending on the algorithm currently configured and may source or sink data.) This allows the system to be sized exactly to the statistical application requirements, and allows full use of the installed hardware. Data may also be switched between the speech resources to allow complex algorithms to be implemented. Further flexibility is provided by allowing the system control software to reconfigure dynamically the speech resources at any time to take account of peak statistical requirements.

The SAP provides such features through the use of a speech bus (14) to transfer data and by number of intercommunicating control software components. The speech bus may be considered as a distributed switched datapath. Terminating points of the speech bus are either line resources or speech resources. Line resources are normally telephone channels (either single analogue channels or a channel on a digital TDM system) there may be other audio or data interfaces such as loudspeaker monitor points or synchronous data modems.

The line cards and speech cards each interface to the speech bus through time/switches (40). The speech bus consists of plural bus streams bused to every speech bus interface card. Conveniently, the speech bus can be based on the Mitel ST-Bus specification, in which case it can take the form of four separate ST-Bus streams. Each ST-Bus stream is a 2.048 Mbit/s serial bit stream organised as thirty two timeslots of 64 Kbit/s per second, 64 Kbit/s per second being chosen as 64 Kbit/s per second or 8 Kbit/s per second is the data rate of a standard PCM telephony channel. Clock and frame signals are carried separately and are generated by one card in the system normally, an ST Bus stream consists of an "input" stream and an "output" stream. In the SAP architecture, flexibility would be compromised if the system had dedicated inputs and outputs. Therefore, the speech bus streams are implemented as single buses with the stream inputs and outputs of each card being connected together on the backplane. The mechanism relies on the speech bus interface hardware being capable of tri-stating the output drivers of each stream on a timeslot-by-timeslot basis, and the control software ensuring that no more than one card is driving a particular timeslot at any time. The advantage of this approach is that all the cards have exactly the same interface hardware, and that any number of cards may be installed in the system without any hardware changes being required. In summary, the speech bus may be considered as a matrix for 4×32 unidirectional timeslots. Each timeslot must only be driven by one card, but may be received by any other card connected to the same speech bus. This allows complex speech processing to be performed since incoming speech on a single channel may be routed to any number of speech resources in parallel, and the output of a speech resource may be routed to the input of a different speech resource. Of course, the capacity of the speech bus, in this example 128 timeslots, imposes an upper limit on the data handling capacity. However, the speech bus is only required if data is transferred between cards since the speech bus interface is capable of handling all intra-card transfers without using speech bus capacity. The speech bus may also be split within a single system to provide more capacity, although direct connections between split speech buses is not possible. Connections between separate speech bus areas may be made by using 30 channel PCM systems. This applies whether the separate speech bus areas are within the same shelf system of not.

The speech bus interface circuitry is common to all SAP cards capable of interfacing to the speech bus backplane. It provides a layer of abstraction between the speech bus and the speech or line resources available. It is controlled by the speech bus control software component. The interface circuitry uses a ST-Bus compatible time/space switch device. Each device can handle 8 streams, and can switch any timeslot on any input stream to any timeslot on any outward stream. The outputs of the device are only enabled when a particular timeslot is required to be driven—they remain tri-stated at all other times. By convention, streams 4–7 are used to connect to the main Speech Bus Backplane. The inputs and outputs of these streams are connected together on the Speech Bus backplane, and the Speech Bus Control software ensures that only one device on the backplane is driving a particular timeslot.

The remaining 4 streams (termed Resource streams) are used to provide access to Speech or Line Resources. Each of the 4 streams has an input channel and an output channel. Each Speech or Line Resource may be capable of handling single timeslots or multiple timeslots. Data may be transferred between any of the Resource Streams on a card without using any Speech Bus capacity.

A hardware slot code is associated with each Speech Bus slot. This is used by each Speech Bus Interface card to set up its access address from the system controller.

The Speech Bus architecture allows a flexible mix of Speech Bus Interface cards. This allows particular systems to be optimised for given applications by the number and type of Speech Bus Interface cards installed. FIG. 26 illustrates the relationship between the Speech Bus and two types of Speech Bus Interface Cards.

The Digital Line Interface Card (DLIC) terminates two 30 channel PCM multiplex systems and provides clock and frame synchronisation capability. Each PCM system framer is connected to a single stream on the time/space switch. Signalling information from the PCM systems is available in timeslot 16. This may be switched to the V.11 interface for transfer to an external signalling system. Each V.11 interface is capable of 64 kbit/s bidirectional synchronous data transfer and each is interfaced to timeslot 0 of a stream on the time/space switch. The remaining 4 streams are used to connect to the Speech Bus.

This arrangement allows switching of signalling information between the framers and the V.11 interface without using Speech Bus capacity. More importantly for certain applications, this arrangement allows the direct connection of telephony channels between the 2 PCM systems (known as "tromboning") without using Speech Bus capacity.

The Speech Processing Card (SP) provides 4 Speech Resources for use by the system. Each Speech Resource is a Digital Signal Processor (DSP) which can interface to all the timeslots on a single stream. The remaining 4 streams are used to connect to the Speech Bus.

Each DSP may be loaded with a range of speech processing programs. Simple programs can process a number of timeslots in parallel (Multi-channel operation), some programs can process only one times lot (Single channel operation). Each timeslot on the Speech Bus may be routed to the input of more than one DSP for parallel processing. DSPs may be reconfigured at any time.

Data may be transferred between DSPs on the same SP without using Speech Bus capacity.

The Speech Bus control software complements the Speech Bus hardware and allows a great deal of flexibility in system operation. A basic description of the software operation follows.

The system monitors incoming telephone channels; when an incoming call in detected, the speech application process associated with the channel is informed and the call answered. The speech application process issues requests for action to the system as the call progresses. These requests are for speech processing such as "Play Message" or "Recognise Spoken Digit" to be applied to the telephony channel. The speech processing requests are translated to requests for resources, and the telephony channel is switched around the appropriate Speech Resources until the call is terminated.

The system may operate in one of two modes on a per channel basis: 1/Resources are requested as and when they are required. This is the most flexible mode and allows the SAP to handle the maximum number of channels its Speech Resources allow. The drawback is that delays in accessing resources may occur during peak loads and result in a lower quality of service. 2/A number of resources are requested to be locked before the call is answered. This should be the peak number of resources required by the application at any one time. Dynamic resource allocation is still used, but this guarantees that there will be sufficient resources available for the duration of the call. If the requested number of resources is not available, the call may be diverted or not answered.

The software operation relevant to the Speech Bus will be outlined in 4 areas—initialisation, speech bus control, call control and resource allocation.

The initialisation process performs a number of tasks:
Identify which Speech Bus cards are available in the system. This utilises the Speech Bus slot codes to probe for the presence of cards. The information is stored and used by higher levels of the software.
Identify the primary Line Interface (according to the system configuration parameters) and enable clock synchronisation. If no active systems are found, the Speech Bus clocks are allowed to free-run.
Initialise all Speech Bus interfaces by clearing and then enabling all the time/space switches on the Speech Bus Interface cards present.

The speech Bus Control process (SBC) maintains a map of the Speech Bus timeslots. It is aware of the configuration of any Line or Speech resources in the system, using specific drivers to perform logical to physical translations. It is requested by higher levels of the system software to provide or release a connection between channels on any of the available Resources in the system. One channel is defined as the source and any number of destinations are allowed. SBC is capable of making connections between Resources Streams on the same card without using Speech Bus capacity.

The Call Control process (CC) uses the card map provided by the initialisation process to create and maintain a map of the available Line Resources in the system. It specifically deals with telephony channels and provides a logical to physical mapping between the logical channel used by higher levels of the system software and the physical card and channel identity that is needed to access the particular channel.

The physical identity is used in a request to SBC to make a Speech Bus connection to the channel.

The Speech Resource Allocation process (SRA) is an Expert System which uses the card map provided by the initialisation process to create and maintain a Speech Resource Map, and which allocates resources to higher software levels on request according to a set of rules. The Speech Resource Map is also used to calculate the optimum initial configuration of Speech Resources.

If a particular resource is unavailable for any reason, SRA may choose to reconfigure an idle resource. SRA provides the identity of the channel on a Speech Resource through which the requested speech function can be accessed. This identity is used to request from SBC that a particular Speech Bus connection be made to the resource.

SRA can handle simple operations requiring one resource channel or complex operations requiring multiple interconnected resources.

The SAP architecture has been designed to be flexible and future-proof. It will support a wide range of speech applications and can easily be configured to offer complex speech processing functions. Much of this flexibility derives from the architecture of the Speech Bus and the associated Speech Resource Allocation (SRA) software. Any mix of Speech Bus Interface cards may be installed according to the speech application requirements. The exact system configuration is analyzed by the system software during initialisation. SRA uses this information to build and maintain resource maps.

The Speech Bus may be considered as 128 unidirectional data paths, each with a capacity of 64 kbit/s. Each data path is allowed a single source, but more than one destination may be specified. This is implemented by time/space switch devices. Thus an incoming telephony channel may be switched to as many Speech Resources as are required to perform the speech processing required to complete a call. The outputs of intermediate speech processing may be routed to other Speech Resources allowing complex speech processing functions to be implemented. If a particular speech processing function is not available when requested, an idle Speech Resource may be dynamically reconfigured to provide the requested function.

If required, the system may operate in a mode where resources are only requested when needed, thus providing the maximum possible utilisation of the installed hardware. Where quality of service must be guaranteed under peak load, the system may operate in a mode where the number of resources needed to complete a call can be locked in advance. The SRA has been designed as a single-threaded process which maintains a large table representing the current state and configuration of all speech resource slots on the system. While a multi-thread system could be used in the component this would require much more table housekeeping and inter processor communication and would probably become far too complex to be worthwhile. The SRA also starts up with a large amount of fixed information describing the attributes of each known speech operation and speech resource programme, plus information describing the best way to initialise all the speech resources given the number of speech cards in the system. These tables and or data are all described below in the data section.

SPEECH RESOURCE CONFIGURATION FILE

This file contains the initial configuration of speech resources on the system. It is read by the SRA during system boot-up and forces it to configure particular speech operations on specified speech processor cards.

SPEECH RECOGNITION PARAMETER FILES

During the initial configuration of speech resources the SRA may require extra information concerning specified recognition vocabularies being loaded. This information is obtained by reading the parameter file of the particular vocabulary using a standard library function.

SPEECH OPERATION INFORMATION

This is an internal table containing all information about each type of supported speech operation (e.g. a particular recognition algorithm, the number of speech resources required, required speech resource programmes and other data for decision making algorithms) known at compile-time and is not changed during run-time operation.

SPEECH RESOURCE PROGRAMME INFORMATION

This is an internal table containing all information known about each type of supported speech resource programme (e.g. recognition front end processor, number of timeslots available, coexistence and reconfiguration relationships with other programme types, whether it is a sender (puts data on the speech bus) or a receiver (gets data from the speech bus), other data required for decision making algorithms) known at compile-time and is not changed during run-time operation.

SPEECH RESOURCE LOCK INFORMATION

This data keeps track of the total amount ((available, not disabled) timeslots) or resources in the speech resource table and total amount of resources locked by applications. It is continually updated as requests for disabling, releasing, requesting, locking and unlocking resources are processed by the SPA.

SPEECH RESOURCE TABLE

This internal table contains information about the current status and configuration of each speech resource and its available timeslots on the system. It is continually updated as requests for releasing and requesting resource timeslots are processed. Within the table there is one record for each speech card. Each record contains status and other information (the SAP ID of the cards; the CPU type and RAM available on the card; the current status of the card (enabled or disabled), the number of speech resources available on the card; the type of speech resource on the card) about the card and also 2 sub-tables; the sub-table for the available resources on the speech card (including its current allocated configuration) and a sub-table for the speech operations configured on the speech card. The resource sub-table contains a record for each DSP resource on the card. Each record contains status and other information about the DSP plus some information about each usable timeslot on the resource. The operations sub-table contains a record for each speech operation process configured on the card. Each record contains status and other information about the associated SPS process plus pointers to the resource timeslots which it uses. For each available timeslot on a resource the following information is stored:

its current status (e.g. unconfigured, configured, active etc);

the associated speech operation ID;

the associated speech operation type;

a mechanism for ordering slots in a multi-resourced speech operation.

SPEECH RESOURCE STATISTICS TABLE

This internal table contains the current totals of all statistics gathered by the SRA component.

[Instead of using a speech card configuration file one couls use an arrangement which consists of two tables:

One table defining a number of different configurations for speech cards, specifying what programme each resource on the card should be configured with when the system boots up. The other table would declare the configuration to use for each SAP speech card, given the number of available speech cards on the system. This information is known at compile time and is not changed during run-time operation].

PROCESS INITIALISATION

When the SRA process is created it will perform the following sequence of actions:

1. initialise global data, tables and communication mechanisms. On failure display an appropriate error message and then suspend the task—no alarms can be generated if the communication mechanism has not been initialised successfully.
2. Send an M-IM-ALIVE request [component=COMPONENT—SRA] to the administration and maintenance component and wait for an M-IM-ALIVE response. On failure or timeout retry for a set number of times. On final failure raise FATAL alarm and suspend the task.
3. Wait for M-SRAADMIN request [operation=SRAADMIN-SP-CONFIG] from the administration and maintenance component containing speech processor configuration information. Store this information in the speech resource table and return a successful M-SRAADMIN response.
4. Use the speech resource configuration file to initialise the speech resource table and speech table lock information. If the speech resource configuration file does not exist/ cannot be opened, resources will be left unconfigured.
5. Send an M-SRAADMIN [status=success] response to the administration and maintenance component.
6. Enter new state ready to receive requests.

ADMINISTRATION REQUESTS

All administration request will originate from the administration and maintenance component. On receiving an M-SRAADMIN request [operation=SRAADMIN-DISABLE] from the administration and maintenance component the SRA will perform the following sequence of actions:

1. Search the speech resource table and locate the record for the card. If not found or the card is already disabled return an M-SRAADMIN [status=error] response to the administration and maintenance component and quit the operation.
2. Mark the speech card disabled in the speech resource table (thus preventing further use of any of its resources after they are released).
3. Update the speech resource lock information to reduce the total availability of resources.
4. If the total locked resources is more than a set percentage of the new total available resources raise a WARNING ALARM.

5. If successful return and M-SRAADMIN [status=success] response to the administration and maintenance component.

RESOURCE OPERATION REQUESTS

All requests concerning speech resource allocation originate from the application control component (APC). On receiving an M-SRAOP request [operation=SRAOP-LOCK] from APC the SRA will perform the following sequence of actions: If the total locked resources plus the requested amount are greater than the total available then:
1. Update the speech resource statistics table.
2. Return an M-SRAOP [status=all locked] response to the APC.

Otherwise if the total locked resources plus the requested amount are less than are equal the total available then:
1. Increment the total locked resources by the requested amount.
2. Update the speech resource statistics table.
3. Return an M-SRAOP [status=success] response to the APC.

On receiving an M-SRAOP request [operation=SRAOP-UNLOCK] from the APC the SRA will perform the following sequence of actions:

If the total locked resources minus the requested amount is less then 0 then:
1. Raise an ERROR alarm.
2. Return an M-SRAOP [status=none locked] response to the APC.

Otherwise, if the total locked resources minus the requested amount are greater than or equal to 0 then:
1. Decrement the total locked resources by the requested amount.
2. Return an M-SRAOP [status=success] response to the APC.

On receiving an M-SRAOP request [operation=SRAO-PREQUEST] from the APC the SRA will perform the following sequence of action:
1. Use the speech operation information to convert operation into resource programme requirements.
2. Search the operation sub-tables in the speech resource table for an unused operation matching the requirements (including matching arguments if necessary).
3. If free operation is not found and the request allows reconfiguration:
   a. Search entire speech resource table and use speech resource programme information to determine the best free speech resource(s) to reconfigure.
   b. If found, send an M-SPCCNTL [operation=SPCCNTL CONFIGURE] request to the appropriate SPC. Wait for the M-SPCCNTL response. On failure or timeout, raise an ERROR ALARM and disable the resource from any further use.
4. If failed to find or reconfigure appropriate speech operation, return an M-SKAOP [status=error] response to the APC and quit the operation.
5. Send an M-SBCOP [operation=SBCOP-SWITCH] request to the speech bus control component (SBC) to switch the selected operation to the APC's channel (in a multiple-source situation only the front resource is switched) wait for the M-SBCOP response. On failure or timeout, raise an EKROR alarm, return an M-SRAOP [status=error] response to the APC and quit the operation.
6. Update the speech resource table marking the speech operation in-use.
7. Return an M-SRAOP [status=success] response to the APC containing details of the speech operation to use. On receiving an M-SRAOP request [operation=SRAOP-RELEASE] from the APC the SRA will perform the following sequence of actions:

1. Search through the speech resource table and find the required speech operations details. If it is already marked as inactive return an M-SRAOP [status=already-released] response to the APC.
2. Send an M-SBCOP [operation=SBCOP-UNSWITCH] request to the SBC to unswitch the released operation from the APCs panel (in a multi-resource situation only the front resource is unswitched). Wait for the M-SBCOP response. On failure or timeout raise an ERROR ALARM and return an M-SRAOP [status=error] response to the APC.
3. Mark the speech operation as inactive in the speech resource table.
4. If the request has a disabled flag set, disable the speech card which the speech operation is running on.
5. Return an M-SRAOP [status=success] response to the APC.

On receiving an M-SRAOP request [operation=SRAOP-SWITCH] from the APC the SRA will perform the following sequence of actions:
1. Use the speech resource table to find the resources used by the specified speech operations.
2. Send and M-SBCOP [operation=SBCOP-SWITCH] request to the SBC to connect the speech resources via the speech bus. Wait for the M-SBCOP response. On failure or timeout send an M-SRAOP [status=error] response to the APC.
3. Return an M-SRAOP [status=success] response the APC.

On receiving an M-SRAOP request [operation=SRAOP UNSWITCH] from the APC the SRA will perform the following sequence of actions.
1. Use the speech resource table to find the resources used by the specified speech operations.
2. Send an M-SBCOP [operation=SBCOP UNSWITCH] request to the SBC to disconnect the speech resources. Wait for the M-SBCOP response on failure or timeouts send an M-SRAOP [status=error] response to the APC.
3. Return an M-SRAOP [status=success] response to the APC.

STATISTICS REQUESTS

All statistics requests originate from the administration and maintenance component.

On receiving an M-STATISTIC request [operation=STAT-GET] from the administration maintenance component the SRA will perform the following sequence of actions:
1. Check that the statistic type is valid for the SRA. If not, return an M-STATISTICS [status=invalid-statistic] response to the administration and maintenance component and quit the operation.
2. Retrieve the required statistics from the speech resource statistics table.
3. Return an M-STATISTICS [status=success] response to the administration and maintenance component containing the statistics required.

On receiving an M-STATISTIC request [operation-STAT-RESET] from the administration and maintenance component the SRA will perform the following sequence of actions:
1. Check that the statistic type is valid for the SRA if not, return an M-STATISTICS [status=invalid-statistic] response to the administration and maintenance component and quit the operation.
2. Reset required statistics in speech resource statistics table.
3. Return an M-STATISTICS [status=success] response to the administration and maintenance component.

It will be understood from the foregoing that there is a procedure to handle each different kind of request (not message) type received by the SRA. Each procedure is responsible for accepting the request data as a whole structure and returning the status for the operation plus any response data. The three procedures SRA admin error, SRA op error and star error handle any cases where the operation is invalid.

At the risk of repetition the operation of the requests and procedures aspect of the SRA will be described in more detail here.

ADMINISTRATION

After the SRA has performed some initial operations and hand shaked with the administration and maintenance (AM) component using the M-IM-ALIVE facility it waits for its first request which should be (anything else is discarded) an M-SRA ADMIN message containing information about all known speech cards in the system. This information is slotted into the correct records in the resource table using speech card ID as the key (SRA CardSetInfo procedure). As each speech card's data is processed, its resources are configured (SRA Cardinit procedure). At the end of this operation the resource table is complete and all speech resources are configured and ready for requests.

At any time a speech card may be disabled. This merely results in the card's record being marked disabled preventing any further allocation of any of its resources (SRA CardSetDisabled procedure). Current operations running on the card are undisturbed. Disabling a speech card reduces the total available resources on the system (SPA AvailableTotal) and can conflict with the current requested number of resources resulting in some warning al arms being generated.

LOCKING RESOURCES

The resources are locked by specifying the total number of speech resources required at any one time (this may be fractional due to multi-channel speech resource programs). A global variable (SPA LockTotal) holds the total number of resources required to be locked at any one time; each lock request increases this total (SPA OpLock procedure). The lock total can never exceed the total available resources on the system (SRA AvailableTotal); any lock request attempting to cause this will fail. Obviously unlock requests reduces the lock total.

REQUESTING RESOURCES—THE "ALLOCATION ALGORITHM"

On receiving a request for a speech resource process to run a particular type of speech operation, the SRA will run though the following algorithm (SPA OpFind procedure) to try to find one as quickly as possible; 1 search the resource table (SRA SlotFind and SRA CardSlotFind procedures) for a speech process either:

a) Already configured with the required operation and currently free.

b) Unconfigured.

The first one found is configured if necessary (SRAConfigure procedure), set to active in the table (SRAOpSetActive procedure) and returned. A global variable (SRASearchStart) is continuously incremented to ensure an even use of resources over all cards.

2. If (1) is unsuccessful, search the resource table for the best speech resource that can be reconfigured into the required type (SRASlotMake and SRA CardSlotMake procedures). During the search, two scores are generated for each existing unused speech resource as follows:

a. A recommendation for reconfiguring the resources current programme into the required programme (SRA-ConfigRules).

b. A recommendation for mixing the required programme with the existing programmes on the same card (SRA-CoexistRules).

If both scores are OK (i.e. it may be the case that the current programme cannot be reconfigured or the required programme cannot coexist on the same card with another existing programme) then the scores combine. The resource with best total score is set to active in the table (SRI-OpSetActive procedure) and returned.

3. If (2) is unsuccessful then an appropriate error is returned to indicate there are currently no suitable resources available.

STATISTICS

The SPA statistics held in a global data structure (SRAStatistics) are continually updated as requested for locking and unlocking are processed. The structure matches the one required by the response to the STATISTIC-GET request so it can easily be copied (SRAStatSet procedure). The STATISTIC-RESET request merely sets all fields in the statistics structure to zero (SRAStatReset procedure).

As can be seen each resource request from the application control process (APC) results in a large number of queries i.e. on the data stored in the resource table of the SPA to form the decision on which speech resource (DSP) to use. Ideally this information should be stored in a quick response database allowing full queries to be made on all available resources. The present design has gone someway towards this by employing an array of records, with one record for each speech processor that the SAP system can cope with. Each of these records contains a sub-array containing records from the DSPs available to the speech processor. This was preferred to having one large record for each DSP because:

information relevant to the whole speech processor (with its plural DSPs and associated memory etc) is kept in one place and has not had to be duplicated for each of its resources (DSPs and DSP parts); information queries and modification are more efficient and hence faster. Each speech processor record contains the following information.

| FIELD NAME | DESCRIPTION |
| --- | --- |
| ID | This is the ID of the speech processor |
| Status | This is the current status of the speech processor |
| VME-Start | The start address of the speech processor on the VME backplane. |
| VME-End | The end address of the speech processor on the VME backplane. |
| CPU- Type | The type of the speech processor. |
| Ram-size | The quantity of RAM available to the speech processor (in MBYTES) |
| Number - DSPs | The number of speech resources controlled by the speech processor. |
| DSP - Info | An array containing a record for each speech resource. |

Each speech resource (in DSP-info) contains the following information:

| Field Name | Description |
| --- | --- |
| DSP-Type | The type of speech resource. |
| DSP-Status | The current status of the speech resource. |
| DSP-Programme-Type | The current configuration of the speech resource. |

The number of records in the resource table is taken directly as the maximum number of speech processors the system can incorporate the number of records in each DSP-Info may vary and is equal to the number of speech resources controlled by the speech processor (i.e. NUM-DSPs).

The speech buses of the separate shelves in a system like the VME buses, are not interconnected. There is thus 1 SRA process per shelf of speech processors.

Having multiple SRA processes, each looking after the details of, say, one speech processor may allow some operations to be performed in parallel but the most important and frequent request—the request to allocate a resource—requires knowledge of all speech resources on the system. With multiple SRA processes, dealing with this request would become a lot more complex and would be slower as a result.

In an alternative approach to that described above, one could use the following process:

RESOURCE TABLE INITIALISATION

This configures every DSP on the SAP system and is done as soon as the resource table is created and before any resource allocations can take place. It attempts to get good spread of different programmes on each speech processor, and for most applications it should always ensure that at least one speech recognition programme exists on each processor since this by far the largest 2 manipulate while the system is running. The same principle should be applied where, for other applications where speech recognition is not required or where only a very simple recognition algorithm is required together with a much larger algorithm which is commonly used in providing the service then the large commonly used programme should exist on each processor at initialisation in order to avoid having to load the large programme during run time.

The following is particularly useful in this alternative approach especially:

RESOURCE ALLOCATION ALGORITHM

This algorithm works by considering each available (currently enabled and not used) DSP on the system and scoring it for the required programme type which may be one of the following:

Speech output;

Speech recording;

Speech recognition;

MF4 detection.

(N.B. One might typically have many different recognition programs and other program types, but this simplified description may aid understanding.)

The DSP that scores the highest gets allocated the job. Full criteria have been identified that have been used to form a score for a DSP given the required programme type. These are:

The current programmed configuration of the DSP. It is clearly preferable to select a DSP that is already configured the same as the required programme type; the number of DSPs on the speech processor that are already programmed to the same configuration as the required programme type; the speech processor type (an indication of speed and memory size); the DSP type. The required programme type determines the relative importance of these criteria and the relative importance of different values associated with each criteria. A null score to a DSP if, for any reason, it cannot be used for the required programme type. The rest of this section summarises the decisions made by the algorithm. Criteria are listed in order or priority and specific values for criteria are listed in order or preference.

SPEECH OUTPUT (OUTPUT) PREFERENCES
1. Current programme: output, input or MF4, rec.
2. Speech processor type: 68020, 68030
3. DSP type: 56K, 96K
4. Number of output already of card: 0, 1, 2, 3, other SPEECH RECORDING (INPUT) PREFERENCES
1. Current programme: input, output or MF4, rec
2. Speech processor type: 68020, 68030
3. DSP type: 56K, 96K
4. Number of input already on card: 0, 1, 2, 3, other SPEECH RECOGNITION (REC) PREFERENCES
1. Current Programme: rec, other
2. Number of rec already on card: 0, 1, 2
3. Speech Processor Type: 68030, 68020
4. DSP Type: 56K, 96K MF4 DETECTION (MF4) PREFERENCES
1. Current programme: MF4, input or output, rec
2. Speech processor type: 68020, 68030
3. DSP Type: 56K, 96K
4. Number of MF4 already on card: 0, 1, 2, 3, other NOTES ON PREFERENCEs The recognition programme (rec) is a much bigger programme than any of the others, hence the SRA does not want to replace it unless absolutely necessary; for this reason (rec) is always the last choice of current configuration for any request other than for speech recognition. A maximum limit of two (rec) programmes on any speech processor at any one time has been set due their bigger demand on resources. Again, in practice there may be several recognition algorithms, of different sizes, and other programs which are very large, and this needs to be taken into account in applying this algorithm in practice.

This section of the application details the specification of a Motorola DSP56001 based Speech Processor card suitable for use in a speech platform according to the present invention.

The speech processor card is a 6U VMEbus card containing a 25 MHz MC63ECO30 micro-processor with 4M bytes of DRAM, up to 512K bytes of EPROM and some non volatile memory in the form of EEPROM. A VMEbus slave interface will allow accesses to the DRAM over the VMEbus. The option of using a 68881 or 68882 floating-point co-processor is provided. Four 27 MHz OSP56001 digital signal processors, each with 128K bytes of fast SRAM, is interfaced to the micro-processor. A four stream ST-BUS is interfaced to the DSPs through a Mitel MT8980D crosspoint switch. The board contain two serial ports accessible from the front panel.

The following sections give details of the environment around the 68ECO30 micro-processor.

A Motorola MC68ECO30 micro-processor clocked at 25 MHz can be used as the central processor. This processor is functionally identical to a 68030 except that it does not include the memory management unit. However, the processor can be mounted in a PGA socket and the board designed in such a way as to be compatible with a 68030.

The 6BECO30 includes an on chip data and instruction cache. However, operation of the caches for accesses to the peripheral area of the memory map should be disabled. The 68ECO30 device will hereafter be referred to as the micro-processor.

A site for an MC68881 or MC68882 Floating-Point Co-processor in a PLCC package is included to provide the option of floating-point support. The co-processor will be clocked synchronously to the micro-processor at 25 MHz. Logic should be included so that if no co-processor is present, floating point instructions will be trapped allowing emulation of the co-processor in software.

The value generated by the ID PAL when read over the VMEbus will depend on whether or not the co-processor is present, allowing the system that boots the board to determine the board's capabilities. [See Section entitled Board Identity PAC]. In addition, the micro-processor will be able to determine the presence of a co-processor by reading input bit IP4 on the 68681 DUART.

The arrangement of the peripheral registers of the DSPS, LED, Geographical Address, ASIC and DUART echo over the whole top 2G bytes of the memory map, enabling short immediate addressing to be used; this results in slightly shorter and faster micro-processor code.

All accesses will be terminated with a DSACKO since all peripherals are 8 bits wide. No bus error signals will ever be generated to an access in this area, even if an access to a non-existent DSP is performed.

4M bytes of DRAM are included on the board. This memory should be dual-ported between the micro-processor and the VMEbus-Support for using page mode DRAMs, allowing micro-processor burst cache fills, will be provided. The memory will be arranged as 1M by 32 bits but will be byte addressable by the micro-processor.

The option of supporting fast page mode access will be provided so that accesses within a 4K byte page will only take 3 cycles. The disadvantage of this mode is that when a page miss occurs the access takes 7 clock cycles. If page mode is disabled all accesses will take 5 cycles. Enabling and disabling of page mode support will be controlled by the OP2 output of the DUART allowing the micro-processor to select a suitable mode for the type of software being executed.

A socket for a 128K, 256K or 512K byte EPROM in a 32 pin 600 mil package will be provided. A link can be used to distinguish between the use of a 128K or 256K device, or a 512K device. The EPROM will reside at location OXOO800000 to OXOOBFFFFF, but can also be enabled to appear at the start of the memory map for two accesses after a reset whereupon it will be disabled and DRAM will reappear. This will allow the reset vector and stack pointer to be read by the micro-processor out of the EPROM so that it can boot correctly. Appearance of the EPROM in this way after a reset can be enabled or disabled by a bit in the VMEbus Status Register. However, the EPROM contents are not accessible over the VMEbus. When the board receives a VMEbus SYSKESET the EPROM will be enabled to supply the reset vector.

A bank of 2K bytes of EEPROM is socketed on the board which will only be accessible by the micro-processor. The micro-processor will be able to write to this memory to update its contents. The EEPROM will be used to store infrequently updated set-up information since the write times are long (typically 500 uS) and can only be performed a limited number of times (at least 10,000 times). The EEPROM will echo itself in the memory map. Data retention within the EEPROM will be at least 10 years.

The most significant 8 bits of the 32 bit VMEbus base address will be readable by the micro-processor. This will allow the micro-processor to determine its own VMEbus address. The 8 bits consist of 5 geographic location bits, configured by the position on the VMEbus rack, and 3 links selectable bits.

A 68681 DUART will be accessible by the micro-processor and used to provide the following functions.

Two full duplex RS232 serial ports will be implemented. These will be brought out to two 9-way female 'D' connectors on the front bracket of the card. Buffers will be used to provide the correct RS232 signal levels of ±12 V.

The pinout is similar to that used on the FORCE CPLJ.30 card and IBM PC compatibles. Pin 9 is not connected since this would normally be a 'Ringer Indicate' input.

The DUART has a 16 bit counter which can be configured as a timer. This timer will be externally clocked at 2 MHz. An interrupt can be generated to the micro-processor whenever the timer has counted down to zero twice. This gives the impression that the counter is in fact clocked at 1 MHz The parallel output pins OP4 to OP7 of the 68681 will be used to control the reset an the four DSP56001 s. This will allow each OSP to be reset from the micro-processor either individually or together. The reset signals will be active low. The DSPs will also be reset when the rest of the board receives a reset. i.e. on a VMEbus SYSRESET, when the reset bit in the VMEbus Control Register is set, or when the micro-processor executes a reset instruction.

The micro-processor will be able to detect the presence of the floating-point co-processor by reading the state of the IP4 pin of the 68681 DUART. If a co-processor is present this pin will be low, otherwise it will be high.

An ASIC will be used on the board to control both interrupts to the micro-processor and interrupts across the VMEbus. The ASIC will contain several registers which will be accessible only by the micro-processor.

The board will be capable of generating interrupts on all 7 VMEbus interrupt levels. Any bits set in a byte written to the VMEINT register of the ASIC will cause interrupts to be generated. However, writing a zero to a bit in the VMEINT register will not clear a pending interrupt. These interrupts will stay pending until acknowledged by the VMEbus. The micro-processor can determine which interrupts are pending by the bits which are set in the VMEPEND register, and should not try to initiate another interrupt on a level until the level is clear. The process of generating an interrupt will therefore be as follows:

1) Read the VMEPEND and ensure that the appropriate interrupt level bit is clear. Wait for it to be clear if not. This wait could be interrupt driven.
2) Write a byte to the VMEINT register with the appropriate interrupt level bit set.

The option of using a fair interrupting scheme will be provided on each level. This scheme will operate by ensuring that no interrupt is generated by the card onto the VMEbus until it detects that no other card on the bus is generating an interrupt on that level. This fair interrupting scheme will be enabled by setting the appropriate bits in the FAIRENABLE register.

In the three above mentioned registers, bits 1 to 7 will correspond to VMEbus interrupt levels 1 to 7 respectively. Bit 0 of the registers will not be used. When VMEbus interrupts are being acknowledged, the card will generate an 8 bit vector taken out of DRAM. The vectors will therefore be able to be set up both over the VMEbus and by the micro-processor.

When a VMEbus interrupt acknowledge cycle occurs, an interrupt will be generated to the micro-processor.

There will be several sources of interrupt to the microprocessor controlled by the ASIC. The interrupt sources will generate interrupts on different priority levels and have unique interrupt vectors. These are listed in the table below:

| Interrupt Level | Vector (hex) | Interrupt source |
|---|---|---|
| 7 (NMI) | — | (Unused) |
| 6 | 0 × 46 | 68681 Timer |
| 5 | 0 × 45 | ASIC Timer |
| 4 | 0 × 44 | DSP No. 0 |
| 4 | 0 × 4C | DSP No. 1 |
| 4 | 0 × 54 | DSP No. 2 |
| 4 | 0 × 5C | DSP No. 3 |
| 3 | 0 × 43 | VMEbus IACK |
| 2 | 0 × 42 | Mailbox No. 0 |
| 2 | 0 × 4A | Mailbox No. 1 |
| 2 | 0 × 52 | Mailbox No. 2 |
| 2 | 0 × 5A | Mailbox No. 3 |
| 1 | 0 × 41 | 68681 DUART |

The interrupt vector numbers given in the above table refer to the default values. The most significant three bits of this 8 bit vector can be user defined by writing to the top three bits of the VECTBASE register. The vectors will therefore be able to be moved to any of eight different locations.

The different interrupt sources are described in the following sections.

The timer within the 58681 DUART will be able to generate interrupts to the micro-processor on level 6. Interrupts will be generated by a negative edge on the DUART OP3 pin. This pin changes from 0 to I or from I to 0 at the end of every timer countdown. Interrupts will therefore be generated at the end of alternate countdowns. The timer will be clocked externally by a 2 MHz clock on the DUARTs IP2 input pin resulting in a period resolution to 1 uS.

The ASIC will have an internal timer which will generate interrupts to the micro-processor on level 5. This timer will have a 16 bit resolution and will be clocked at 50 kHz. The two 8 bit registers, TIMERHI and TIMERLO, will 50 kHz. The two 8 bit registers, TIMERHI and TIMERLO, will be used to configure the period of the timer in increments of 20 uS. The timer will therefore have a maximum period of 1.3107 seconds. The timer will auto-load itself when it times out. Bit 0 of the INTENABLE register will be used to enable or disable the interrupts from this timer. Setting this bit will enable interrupts. The bit will default to being clear after a reset. The interrupts should be disabled while updating the timer registers.

The four DSP56001 s will be able to generate interrupts to the micro-processor on level 4. Each DSP, however, will generate a unique vector. 'Round Robin' arbitration will be employed to contend with concurrent interrupts. Each DSP will have two methods of generation, interrupts, either by writing to their own program memory between P:$SOOO and P:$BFFF or by generating a host port interrupt in the normal way. The interrupt vector registers in the DSP host ports will not be used to generate a vector. This is instead supplied by the ASIC.

When a VME bus interrupt generated by the card is acknowledged, the micro-processor will be interrupted on level 3. This will inform the micro-processor that the VMEbus interrupt level is now clear and can be used for subsequent VMEbus interrupts.

There will be 4 mailbox interrupts to the micro-processor. These interrupts will all be an level 2 but will have unique vectors. The mailbox interrupts will be generated by writing to the DRAM over the VMEbus. Address lines A2 and A3 will be used to determine which of the four mailbox interrupts are to be generated. Hence, four consecutive longwords in memory can be used as mailbox registers. A 'Flound Robin' arbitration scheme will be employed to deal with multiple pending mailbox interrupts.

The 68681 DUART will cause interrupts to the microprocessor an level 1. These interrupts will indicate events such as serial port FIFO full or empty, break characters, or when the counter/timer reaches terminal count. The interrupt vector register within the DUART will not be used to generate a vector when the interrupt is acknowledged. The vector will instead be generated by the ASIC.

The ASIC will be designed to respond to the level triggered output from the DUART, thereby overcoming the problems that occurred on V1.Ox boards with multiple interrupts from the DUART.

The board will have a VMEbus slave interface which will conform to the VMEbus specification revision GI. The interface will only respond to A32, D32 supervisory data cycles for reads and writes To the DRAM. However, A32, D08(0) and A32, D16 aligned supervisory data cycles will be supported for accesses to the crosspoint switch, ID PAL, and Control Register, but only the bottom 8 bits will be driven in both cases.

VME bus address lines AO to A23 will be used to access locations on the card whereas address lines A24 to A31 will be used to select the card. The base address of the card is configured by both the VMEbus slot number and three links as follows

| Address line | Configured by | |
|---|---|---|
| A24 | J2 connector pin 5C | (Grounded = 1) |
| A25 | J2 connector pin 4C | " |
| A26 | J2 connector pin 3C | " |
| A27 | J2 connector pin 2C | " |
| A28 | J2 connector pin 1 C | " |
| A29 | Link-selectable | |
| A30 | Link-selectable | |
| A31 | Link-selectable | |

The geographical address signals on the J2 connector will have 1 OK pull-up resistors on the card, The 8 bit geographical address will also be readable by the micro-processor.

The board will only respond to supervisory data accesses.

The DRAM on the board will be accessible over the VMEbus at offsets OYOOOOOO to Ox3FFFFC from the base address of the board. The DRAM will only be accessible as longwords (32 bits) and the address will therefore need to be on a 4 byte boundary. The DRAM will be accessible independently of whether the micro-processor is held under reset or the state of the EPROM control.

The whole of the DRAM will also be accessible at offsets OX400000 to Ox7FFFFC, However, accesses to this echo will cause one of four different mailbox interrupts to the micro-processor depending on the address accessed.

The registers within the crosspoint switch will be accessible over the VMEbus at offsets OX800000 to OX80007F. Both A32, D08(0) and A32, D16 aligned type accesses to the crosspoint switch will be supported, but only the bottom 8 bits will ever be driven. The crosspoint switch registers will echo 32768 times to fill the area 0x8OOOOO to OXBFFFFF.

Board Identity PAL

A PAL containing an 8 bit binary code will be readable over the VMEbus, and will uniquely identify the type and revision of the board. Both A32, D08(0) and A32, D16 aligned type read cycles to the ID PAL will be supported but only the bottom 8 bits will ever be driven. The ID PAL contents will be readable at any of its echoes at offsets OXCO0000 to OXFFFFFF. However D08(0) accesses must be to odd addresses and D16 accesses to even ones. The value generated by this PAL will depend on whether or not a floating-point co-processor is installed on the board. The values generated are outlined below:

| Co-processor present ? | Board Type | Board Rev. | ID PAL Value |
|---|---|---|---|
| No. | 2 | 2 | 0 × 12 |
| Yes. | 2 | 3 | 0 × 13 |

A 4 bit Control Register will be accessible over the VMEbus at address offsets OXCO0000 to OXFFFFFF. This register will respond to both D08(0) and D16 aligned type supervisory data write accesses but only bits 0 to 3 have any effect. These are as follows:

| Bit | State | Effw |
|---|---|---|
| 0 | 0 (Default) | Micro-processor allowed to execute code |
|  | 1 | Micro-processor held under reset |
| 1 | 0 (Default) | EPROM enabled after reset for 2 accesses |
|  | 1 | EPROM disabled |
| 2 | 0 (Default) | VMEbus and micro-processor can access DRAM |
|  | 1 | Only VMEbus can access DRAM |
| 3 | 0 (Default) | Crosspoint switch outputs disabled |
|  |  | Crosspoint outputs enabled |

Bit 0 of the Control Register will control the state of the reset line to the micro-processor, DUART, DSPS, and interrupt ASIC. These devices will also receive a reset when a VMEbus SYSRESET pulse occurs. The purpose of this bit is to allow each board to be reset individually under the control of a VMEbus master. After a SYSKESET, the bit will default to a zero which will allow the micro-processor to boot from EPROM. This bit must be asserted for longer than 21 uS by a VMEbus master to reset the micro-processor reliably.

Bit 1 of the Control Register is used to enable and disable appearance of EPROM at the start of the micro-processor's memory map after a reset. When this bit is set the EPROM is disabled, and the micro-processor will see DRAM at the start of its memory map. When this bit is clear, the EPROM will be enabled at the beginning of the memory map for two micro-processor accesses. This will be the default after a SYSRESET, causing the micro-processor to boot from the EPROM. The VMEbus master can reset the board and either cause the EPROM or the DRAM reset vectors to be used.

Bit 2 of the Control Register will be used to request use of the DRAM exclusively by the VMEbus. Setting this bit will essentially perform a permanent bus request to the micro-processor, The VMEbus master does not have to wait for a bus grant. Subsequent accesses to the DRAM over the VMEbus will not need to perform individual bus requests and will therefore be carried out more quickly, By setting this bit the VM Ebus mater can peeorm 'read-modify-write' type accesses since the micro-processor will not be able to modify the DRAM contents until it regains control of the bus. After a SYSRESET this bit will be cleared, allowing the micro-processor to boot.

Bit 3 of the Control Register will control the ODE input of the crosspoint switch. After a SYSRESET this bit will be cleared, disabling all outputs from the crosspoint switch. This will prevent data contention by allowing the crosspoint switch registers to be configured before the outputs are enabled.

There will be two forms of interrupt associated with the VMEbus. These are described in the following two sections.

When a read or a write command to the echo of the DRAM over the VMEbus is performed, a mailbox interrupt is generated. Only A32, D32 type accesses are supported, so the address must be on a quad byte boundary, i.e. address lines AO and A1 must be zero. Address lines A2 and A3 will determine which of four mailbox interrupts are to be generated to the micro-processor. Any four consecutive longwords in DRAM can therefore be used as mailbox registers. The mailboxes can be accessed over the VMEbus without generating interrupts to the micro-processor by accessing the non-echo address of the DRAM.

The micro-processor will be able to generate interrupts over the VMEbus on any of the 7 interrupt levels. This will be performed by writing to registers within the ASIC. The board will generate 8 bit vectors in response to interrupt acknowledge cycles over the VMEbus-The vector values will be taken from DRAM. [See Section 2.7.1

There will be 4 identical digital signal processors on the board, each with its own memory. The following sections apply to each of these.

The DSP to be used is the Motorola DSP56001. All the DSP56001s will be synchronously clocked at 27 MHz. Each DSP will be individually resettable by the micro-processor and will also be reset when a board reset occurs. The host ports of the DSPs will be accessible by the micro-processor as memory mapped peripherals. The DSP modules may be omitted without any side effects. The micro-processor will be able to detect presence of the DSPs by checking for the host ports in its memory map. No bus error will be generated if an access to a non-existent DSP occurs.

Each DSP will have its own external zero wait state SRAM.

The X and Y data ROMS may be disabled, in which case the external 24 bit wide RAM will be a contiguous extension of the internal data RAM. The external memory for each DSP will be constructed from four 32K by 8 SRAMS. 30 ns or faster memories will be required for zero wait state access. The memory map will be decoded using a PAL.

Data bus D8 To D23 of the 8 bit wide X and Y data areas will always be read as zero. Any data written to these bits will be ignored.

Each DSP will be able to generate interrupts to the micro-processor, either by writing to the area of memory between P:$SOOO and P:$BFFF or by generating a host port interrupt in the usual way. All the DSPs will interrupt the micro-processor an the same level using a 'Round Robin' arbiter to cope with simultaneous interrupts. Attention will be taken to ensure that if a DSP is omitted, no spurious interrupts will be generated.

The SCI ports of the DSP56001s will be connected together in a ring network as follows

| From | TO |
|---|---|
| DSP #0 Tx | DSP #1 Rx |
| DSP #1 Tx | DSP #2 Rx |
| DSP #2 Tx | DSP #3 Rx |
| DSP #3 Tx | DSP #0 Rx |

The option of inserting zero ohm resistors will be provided to allow the ring to be completed in the event of one of the DSPs being omitted. The data clock will be externally driven at 2 MHz.

The four DSP SSI ports will interface to the Mitel digital time-space crosspoint switch streams 0 to 3. These will appear to the DSPs as 32 time-slot streams. A word-length frame sync signal will be generated from the ST-BUS FS signal and fed to the SC2 inputs on all the DSPS. The SSI port SCK input will be driven by the 2048 kHz clock from the ST-BUS. The SC0 and SC1 pins of the SSI ports will be unused and will be brought out to test points with 3K3 pull-up resistors.

The speech bus will consist of four bidirectional 2M bit/s Mitel ST-BUS streams. The ST-BUS streams will enter the card on the VMEbus J2 connector using the following pins

| Signal | Pin | Comments |
|--------|-----|----------|
| STI0   | 1A  | ST-BUS Stream 0 Input |
| ST00   | 2A  | ST-BUS Stream 0 Output |
| ST11   | 4A  | ST-BUS Stream 1 Input |
| ST01   | 5A  | ST-BUS Stream 1 Output |
| ST12   | 7A  | ST-BUS Stream 2 Input |
| ST02   | 8A  | ST-BUS Stream 2 Output |
| ST13   | 10A | ST-BUS Stream 3 input |
| ST03   | 11A | ST-BUS Stream 3 Output |
| C4i*   | 14A | ST-BUS 4096 kHz clock |
| FS*    | 16A | ST-BUS Frame Sync |
| C2i    | 18A | ST-BUS 2048 kHz clock |

The ST-BUS streams on the VMEbus J2 connector will connect to streams 4 to 7 of a Mitel MT89800P digital time-space crosspoint switch. Streams 0 to 3 of this device will interface to the four DSP56001 SSI ports.

The 8 bit micro-processor control port of the crosspoint switch will be mapped into the VMEbus address space, and will only be accessible over the VMEbus. The ODE pin (Output Drive Enable pin) of the crosspoint switch will be controlled by bit 2 of the VMEbus Control Register. This bit will default to a low after a VMEbus system reset, thus disabling all the ST-BUS output drivers. Once all the crosspoint registers have been configured correctly, the outputs can be enabled by writing a 1 to the Control Register bit. This technique will prevent data contention on the ST-BUS.

The design will meet all the physical and electrical constraints imposed by the VMEbus specification revision C.1. It will be a double height, single width board of dimensions 233.35 mm by 1 60 min. A multi-layer PCB will be used, with two of the layers dedicated as supply and ground planes.

The board will possess a front bracket with card ejector handles to ease the task of removing the board from a rack.

The following sections outline the considerations to be taken into account in the design and layout of the board, The micro-processor will be packaged in a plastic PGA and will be socketed to allow the use of an in circuit emulator if required. A PLCC socket for a floating-point co-processor will be also be provided. The DSP56001s that will be used are in QFP packages and will be surface mounted without the use of sockets.

Surface mount PLCC sockets will initially be used for devices such as the DRAM controller, DUART, and interrupt ASIC. Use of such sockets aid development as well as giving the option of omitting them on production cards with the PLCC devices soldered directly onto the PCB.

The DRAMs will be housed in 20 pin ZIP packages since this will give the best board space utilisation. The EPROM will] be mounted in a 32 pin 600 mil socket to allow the EPROM to be changed as well as to allow components to be placed under the device if necessary. The EEPROM will also be socketed.

Surface mount ceramic chip. capacitors will be distributed across the back of the board for supply decoupling. In addition, surface mount tantalums will be used as reservoir capacitors since these devices are more sturdy than through hole equivalents, Tall components such as crystals will be placed on their side with a fixing strap to improve resilience to mechanical shock.

On final production boards, the only socketed devices will be the micro-processor, the floating-point co-processor, the EPROM, and the EEPROM. All other components will be soldered down.

It is suggested that the majority of the board is tested under software. The test software could reside within an EPROM and booted when the board is powered up. The software could then progressively test various parts of the design and report results back via a terminal connected to a serial port. The board would, however, need inserting into a rack with software executing on a VMEbus master card in order to perform a complete test. This type of test is ideal for performing both 'go no-go' and soak tests. However, the problem with this self testability scheme is that if the core micro-processor is not functioning correctly many of the tests cannot be performed, leading to difficulties in tracing any faults.

In order to maintain compatibility with automatic test equipment, it is necessary to take into account several design rules. Some of these are outlined below:

1) Pads must be placed on the underside of the board so that test nails can access them.
2) Unused 'preset', 'clear' and 'output enable' signals should use pull-up resistors with a test pad, allowing the ATE equipment to control them.
3) All vias must be filled with solder to allow ATE equipment to hold boards down with a vacuum.
4) It should be possible to electrically isolate functional areas of the design, enabling the ATE to perform its tests.
5) Tooling holes should be placed at the corners of the board for locating.
6) A clearance must be left around the board edge and tooling holes. No components or pads should be placed in this area.

The board will be designed in accordance with suggestions laid down in BT standard No. 2 'Thermal Design'. The board will be cooled by forced air from the bottom to the top of the board. As far as is possible, packages will be orientated so as not to impede the draught. This means that components will be placed vertically in the direction of air flow. This is especially important for tall components such as the ZIP packaged DRAMS. Placement of components should take into account possible shadowing of other components causing a restriction of the air flow across them. The parts that will give off the most heat requiring particular thermal attention will be the PALS, the micro-processor and the DSPS,

DATA—EXAMPLES

This section assumes the use of speech processor cards of the type detailed above. Clearly different arrangements, in particular different memory and processor sizes/speeds will influence the choices made here.

| SRA Data | Description |
| --- | --- |
| sraLockTotal | Contains current total of all resources locked. Must be always (= sraAvailable Total. |
| sraAvailable Total | Contains current total of all resources available on the system (whether currently active or free). Reduced when cards are disabled. |
| sraStatistics | Contains current statistics totals. |
| sraNumCards | Contains number of cards an the system. |
| sraResourceTable | Contains status information about all cards and resources on system. |
| sraSpOpinfo | Contains information about (and indexed by) each known Speech Operation. See Table A. |
| sraSpProginfo | Contains information about (and indexed by) each known Speech Program. See Table B. |
| sraCoexistRules | Contains rules for programs coexisting with each other. See Table C. |
| sraConfigRules | Contains rules for configuring one program into another. See Table D. |
| sraSpinitinfo | Contains a selection of nice initial configurations for cards. See Table E. |
| sraSysinitinfo | Contains initial speech card configurations indexed by total number of cards. References sraSpinitinfo for each card. See Table E. |
| sraSearchStart | Contains card ID to start searching from in allocation algorithm. This is incremented each time to ensure even spread of resource use. |

TABLE A

SPEECH OPERATION INFORMATION

| Speech Operation | Num Program | Program1 | Program2 |
| --- | --- | --- | --- |
| SPOP SP OUTPUT 64 | 1 | PROG XFER OUT 64 | — |
| SPOP SP INPUT 64 | 1 | PROG XFER IN 64 | — |
| SPOP SP OUTPUT 8 | 1 | PROG DECODE 8 | — |
| SPOP SP INPUT 8 | 1 | PROG ENCODE 8 | — |
| SPOP CDHMM YESNO | 2 | PROG FEP | PROG CDHMM YESNO |
| SPOP CDHMM 13DIG | 2 | PROG FEP | PROG CDHMM 13DIG |
| SPOP CDHMM-15WORD | 2 | PROG FEP | PROG CDHMM 15WORD |
| SPOP MF4-DETECT | 1 | PROG MF4 DETECT | — |

CDHMM = Continuous density hidden Markov Models (REC)
FEP = Front end processor (here for CDHMM recognition)
13 DIG = 13 DIGITS
15 WORD = 15 WORDS Of course the use of continuous density hidden Markov models, or indeed any other Markov model based recognition system is not essential—any similarly well performing recognition algorithm could be used. CDHMM's are referred to here merely to give some impression of the program size.

TABLE B

SPEECH RESOURCE PROGRAM INFORMATION

| Speech Resource Program | Num Channels |
| --- | --- |
| PROG XFER OUT 64 | 10 |
| PROG XFER IN 64 | 10 |
| PROG DECODE 8 | 2 |
| PROG ENCODE 8 | 1 |
| PROG FEP | 3 |
| PROG CDHMM YESNO | 1 |
| PROG CDHMM 13D1G | 1 |

TABLE B-continued

SPEECH RESOURCE PROGRAM INFORMATION

| Speech Resource Program | Num Channels |
| --- | --- |
| PROG CDHMM 15WORD | 1 |
| PROG MF4 DETECT | 10 |

TABLE C

SPEECH RESOURCE PROGRAM COEXIST RULES

| y \ x | XIN | XOUT | DEC8 | ENC8 | MFD | FEP | CD YN | CD DIG | CD 15 | SILD |
|---|---|---|---|---|---|---|---|---|---|---|
| X IN    | 0 | 0 | 1 | 1 | 2 | 0    | 0 | 0 | 0 | 2 |
| X OUT   | 0 | 0 | 1 | 1 | 2 | 0    | 0 | 0 | 0 | 2 |
| DEC 8   | 4 | 4 | 2 | 2 | 3 | 1    | 1 | 1 | 1 | 3 |
| ENC 8   | 4 | 4 | 2 | 2 | 3 | 1    | 1 | 1 | 1 | 3 |
| MF D    | 4 | 4 | 3 | 3 | 2 | 1    | 1 | 1 | 1 | 2 |
| FEP     | 0 | 0 | 1 | 1 | 2 | 0    | 0 | 0 | 0 | 2 |
| CD YN   | 0 | 0 | 1 | 1 | 1 | (−1) | 2 | 2 | 2 | 1 |
| CD DIG  | 0 | 0 | 1 | 1 | 1 | (−1) | 2 | 2 | 2 | 1 |
| CD 15   | 0 | 0 | 1 | 1 | 1 | (−1) | 2 | 2 | 2 | 1 |
| SILD    | 4 | 4 | 2 | 2 | 3 | 1    | 1 | 1 | 1 | 3 |

0 = y cannot coexist with x on the same card
>0 = y can coexist with x on the same card (higher score = better)
(−1) = y must have x on the same card

TABLE D

SPEECH RESOURCE PROGRAM RECONFIGURATION RULES

| y \ x | XIN | XOUT | DEC8 | ENC8 | MFD | FEP | CD YN | CD DIG | CD 15 |
|---|---|---|---|---|---|---|---|---|---|
| X IN   | — | 1 | 3 | 3 | 3 | 3 | 0 | 0 | 0 | 3 |
| X OUT  | 1 | — | 2 | 2 | 2 | 3 | 0 | 0 | 0 | 2 |
| DEC 8  | 4 | 4 | — | 5 | 5 | 2 | 3 | 3 | 3 | 5 |
| ENC 8  | 3 | 3 | 5 | — | 4 | 2 | 2 | 2 | 2 | 4 |
| MF D   | 2 | 2 | 4 | 4 | — | 1 | 1 | 1 | 1 | 6 |
| FEP    | 0 | 0 | 0 | 0 | 0 | — | 0 | 0 | 0 | 0 |
| CD YN  | 0 | 0 | 1 | 1 | 1 | 0 | — | 4 | 4 | 1 |
| CD DIG | 0 | 0 | 1 | 1 | 1 | 0 | 4 | — | 4 | 1 |
| CD 15  | 0 | 0 | 1 | 1 | 1 | 0 | 4 | 4 | — | 1 |
|        | 2 | 2 | 4 | 4 | 6 | 1 | 1 | 1 | 1 | 0 |

0 = y cannot be reconfigured into x
>0 = y can be reconfigured into x (higher score = better)

TABLE E

SPEECH CARD INITIALISATION INFORMATION
This first table defines a set of good initial configurations for speech cards
sraSpInitInfo

| Init Cofig No. | Program 0 | Program 1 | Program 2 | Program 3 |
|---|---|---|---|---|
| 0  | FEP   | CD YN  | CD DIG | CD 15 |
| 1  | FEP   | CD YN  | CD YN  | CD YN |
| 2  | FEP   | CD DIG | CD DIG | CD DIG |
| 3  | FEP   | CD 15  | CD 15  | CD 15 |
| 4  | FEP   | CD YN  | CD DIG | MF D  |
| 5  | FEP   | CD YN  | CD DIG | DEC 8 |
| 6  | FEP   | CD YN  | CD DIG | ENC 8 |
| 7  | X IN  | MF D   | DEC 8  | ENC 8 |
| 8  | X IN  | ENC 8  | DEC 8  | ENC 8 |
| 9  | X OUT | MF D   | DEC 8  | ENC 8 |
| 10 | X OUT | ENC 8  | DEC 8  | ENC 8 |
| 11 | DEC 8 | DEC 8  | ENC 8  | ENC 8 |
| 12 | DEC 8 | DF D   | ENC 8  | ENC 8 |

The multi-master SAP uses an interface to a 2048 kbit/s 30 channel line system as specified in G. 732. This type of line system provides 32 64 kbit/s channels, 30 of which are used to carry speech (or data) while timeslots 0 and 16 are used to carry frame alignment and signalling respectively. The term '2048 kbit/s line system' will be used throughout this section to refer to line systems of this type.

The Line Interface Card provides for the connection of Two 2048 kbit/s line systems to the SAP. In addition, the Digital Line Interface Card may be used to provide the interconnection between separate shelves within a multi-shelf SAP. The interfaces that provide inter-shelf connections are identical to those that terminate the external 2048 kbit/s line systems, indeed each inter-shelf connection may be thought of as a very short 2048 kbit/s line system. Thus a single Digital Line Interface Card may be used to terminate two external 2048 kbit/s line systems, or to provide two 2048 kbit/s inter-shelf connections, or to terminate one external 2048 kbit/s line system and provide one inter-shelf connection.

The Digital Line Interface Card (DLIC) preferably conforms to the VME bus double height form factor. It derives all its power requirements from the VME bus. A separate Barrier Board provides the necessary electrical isolation barrier between the public 2048 kbit/s line system and the SAP necessary for regulatory approval. The Barrier Board also carries the components that terminate the two 2048 kbit/s line systems with the correct matching impedance.

Figure 34:
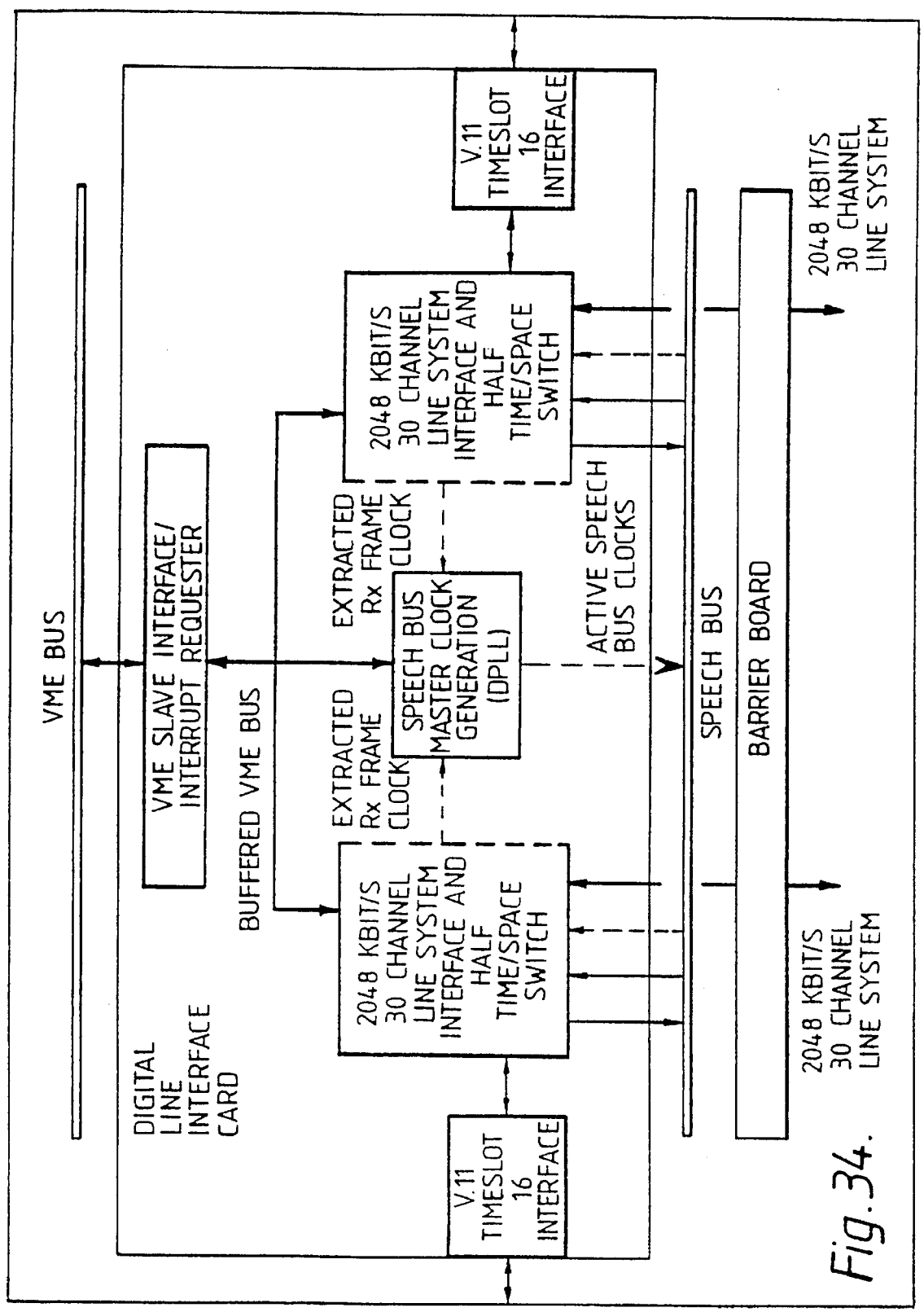
FIG. 34 is a schematic diagram of a line interface card and barrier board, suitable for use in a speech platform according to the present invention.

The top level hardware functionality of the DLIC is shown in FIG. 34. It supports the attachment of two 2048 kbit/s line systems to the SAP. Control of each 2048 kbit/s line system interface and its associated pores on the time/space switch is achieved via the VME bus slave interface. Likewise, accesses from the VME bus configure the mode in which the 'Speech Bus Master Clock Generation' block operates.

The DLIC appears on the VME bus as a bus slave with interrupt requester capabilities.

It is required that DLIC provides a byte wide identity register at the last byte location within its decoded address space. The value read from this location is preferably configured into a programmable logic device. The DLIC responds to memory accesses in the Supervisor Data Extended Address Space (VME bus address modifier ODH) only. The DLIC presents an 8 bit data port on the D7-DO portion to the VME data bus.

The interrupt requester function is capable of generating interrupts on any one of the seven VME bus interrupt levels. The active interrupt level software controlled by VME bus accesses to a control register on the DLIC. Following reset the DLIC is not capable of generating VME bus interrupts until this control register has been programmed with a valid interrupt level.

A single block comprises two identical 2048 kbit/s 30 Channel Line System Interfaces both having input and output access to a single Time/Space Switch. It is possible to operate the block as two halves, each containing a Line System Interface, with each half being capable of operating independently of the other. Each half of the block terminates a single 2048 kbit/s line system and routes its 30 voice/data channels to and from time slots on the 'Speech Bus'.

The outputs of the time/space switch driving the 'Speech Bus' must be capable of being 'tri-stated' during time slots that they are not assigned to drive. This requires software interlocks to ensure that only one time switch drives a given time slot (since there may be a number of switches accessing the Speech Bus across the system).

Each 2048 kbit/s line system interface conforms to the characteristics for primary PCM multiplex equipment operating 2048 kbit/s as defined in CCITT recommendation G.732. This recommendation further references recommendations G.704, which details the basic frame structure to be used over a 2048 kbit/s link, and G. 703 which details the physical and electrical characteristics of the link.

Voice channels passing through the 2048 kbit/s line system interface can be subject to digital attenuation and Alternate Digit Inversion (ADI). The digital attenuation levels, the application of ADI to all voice channels and the designation of channels as voice or data channels will be under software control via VME bus accessible control registers. ADI, if enabled, will be applied to all voice channels associated with a particular 2048 kbit/s line system. It should be possible to set different digital attenuation levels for each voice channel with different levels for the transmit and receive directions.

Data channels passing through the 2048 kbit/s line system interface are to be passed unaltered.

Several software controllable loopback modes are required:
1. Loopback of the entire incoming 2048 kbit/s link to the outgoing 2048 kbit/s link.
2. Loopback of the entire outgoing data stream from the 'Tx PCM/Data' line to the 'Rx PC/Data' line
3. Loopback of individual outgoing channels from the outgoing 2048 kbit/s link to the corresponding channel of the incoming 2048 kbit/s link. Note that, at most, only one outgoing channel per 2048 kbit/s line system will be looped back at any given time and that since this loopback from the outgoing 2048 kbit/s link to the incoming 2048 kbit/s tlink it can only function once frame synchronisation has been established.

Two software controllable modes for separating signalling should be supported:
1. Common Channel Signalling (CCS) present in time slot 16 of the 2048 kbit/s line system may be routed to and from a time slot on the Time/Space Switch. The Time/Space Switch will be controlled to determine whether the signalling timeslot is connected to the Speech Bus or on of the V. 11 ports provided by the DLIC.

2. CAS present in time slot 16 of the 2048 kbit/s line system may be debounced and routed to and from registers accessible from the VME bus.

The DLIC is preferably capable of reporting the following status or alarm conditions:
1. Loss of incoming frame synchronisation.
2. Loss of CAS Multi-frame synchronisation when operating in a debounced CAS mode.
3. Frame slip between the frame structure received on the incoming t2048 kbit/s link and the frame structure present on the 'Speech Bus'.
4. An 'all Is' Alarm indication Signal (AIS) received from the far end (see G. 732).
5. An 'all Is' Alarm Indication Signal (AIS) received in time slot 16 (see G. 732)
6. Frame alignment errors indicating the presense of errors in the frame alignment pattern.
7. Detection of CRC multi-framing (see G. 704).
8. A count of received CRC errors if CRC multi-framing is detected.

The 2048 kbit/s line systems should be terminated at the Barrier Board and will enter the DLIC via the VME bus P2 connector.

The DLIC will be provided with two electrically balanced, serial communications interfaces, one associated with each half of the Line System Interface and Time/Space Switch block. The chief purpose of these interfaces is to allow timeslot 16 signalling for CCS to be presented to/exported from the DLIC over separtate links.

The specification for the serial interfaces should be as outlined in the CCITT recommendation V. 11

The DLIC should be capable of generating the master clocking for the 'Speech Bus'. In order to avoid frame slips the 'Speech Bus' master clocks must be capable of being synchronised to the network. Synchronised master clocks may be derived from either of the incoming 2048 kbit/s links attached to the DLIC or from another source e.g. another DLIC in the same system. In the absence of a network connection, or following the failure of the network connection and prior to the assignment of a new clock source for the 'Speech Bus' the DLIC should be capable of supplying free running master clocks for the 'Speech Bus' operating at their nominal frequency ±50 ppm.

The 'Speech Bus Master Clock Generation' block should therefore be capable of operating in one of four software controlled modes:
1. Disabled—Master clocks are being supplied from another source.
2. Enabled, supplying master clocks synchronised to the first 2048 kbit/s line system.
3. Enabled, supplying master clocks synchronised to the second 2048 kbit/s line system.
4. Enabled, supplying free-running master clocks operating at their nominal frequency ±50 ppm.

It is desirable that the Master Clock Generation logic be capable of automatically detecting the failure of an active clock source and effecting an automatic changeover to the second clock source on the same DLIC (provided that the second clock source has not previously been subject to an uncleared failure).

The 'Speech Bus' comprises four bidirectional Mitel ST busses and associated clocks (FO, C2 and C4 and/or their complements). The 'Speech Bus' will occupy previously unassigned connections on the VME bus P2 connector. Following reset the DLIC will be disabled from driving the 'Speech Bus' data and clock signals until explicitly enabled to do so under software control.

The Barrier Board is preferably be mounted at the rear of the SAP cabinet and will be attached to the rear of the 'Speech Bus' ie. to the rear of the VME bus P2 connector. The Barrier Board performs three functions:
1. To provide the physical termination for the two 2048 kbit/s line systems. The current requirement is for the termination of two ohm co-axial line systems.
2. To provide the electrical termination of the two 2048 kbit/s line systems through the appropriate matching impedance.
3. To provide the safety electrical isolation barrier, necessary to meet regulatory approval, between the 2048 kbit/s line systems and the SAP.

The shield associated with the outgoing 2048 kbit/s link should be grounded at the SAP. The facility to ground the shield associated with the incoming 2048 kbit/s link should be provided, but should be left open circuit at the SAP by default (see G. 703 for further information).

Where the platform is used to handle or offer multiple services simultaneously, the telepone number called can be used by the platform to distinguish between call types before the call is in fact answered.

The platform can conveniently be used to front-end conventional directory enquiries or other operator services. Alternatively, the platform can be used to provide "automatic" directory enquiries. The platform can of course be used to "answer" all customers calls to a single service or held number, the calls being routed to the particular human operator in accordance with voiced information given by the caller and acted on by the platform.

We claim:

1. An interactive voice platform for the provision of automated speech based services over a telephone network, the platform comprising:

a plurality of speech processors, each with an associated memory, to provide at least one of the following functions: speech recognition, speaker recognition, speaker verification, speech synthesis;

line interface means for terminating a plurality of telephony channels of the network;

a speech bus to carry speech signals between the line interface means and said speech processors;

a control processor, distinct from the speech processors, to control the routing of speech signals over the speech bus;

a control bus connecting the control means with the speech processors and the line interface means;

a memory distinct from the associated memory of said speech processors and holding one or more of the following: a program including a speech recognition algorithm, a program including a speech synthesis algorithm, a program including a speaker recognition or verification algorithm, templates to be used in conjunction with the respectively corresponding programs; and a data link connecting said memory with said speech processors and operable to effect the transfer of one or more of the programs or templates held in said memory to said speech processors for use in provision of the appropriate function;

wherein any incoming telephony channel connected to the line interface means can be routed to any one of the speech processors over the speech bus under the control of the control processor; and wherein each of the speech processors and the line interface means includes a time/space switch which is controlled by the control processor via the control bus.

2. A method of providing a telephony service over a teleconummications network, the method comprising the steps of:

connecting an interactive voice platform to the network using apparatus as in claim 1, loading an applications program which defines the service onto the platform, and running the applications program on the platform where it operates through an applications processor, which is distinct from any of the processors of the speech processors, to cause, in response to a telephone call received over the network, the control processor to initiate an allocation of the resources of the speech processors to provide some speech processing function with which the caller interacts.

3. A platform as in claim 1 including means providing an interactive voice service.

4. An interactive voice platform for the provision of automated speech based services over a telephone network, the platform comprising:

a plurality of speech processors, each with an associated memory, to provide at least one of the following functions: speech recognition, speaker recognition, speaker verification, speech synthesis;

line interface means for terminating a plurality of telephony channels of the network;

a speech bus to carry speech signals between the line interface means and said speech processors;

a control processor, distinct from the speech processors, to control the routing of speech signals over the speech bus;

a control bus connecting the control means with the speech processors and the line interface means;

a further memory distinct from the associated memory of said speech processors and holding one or more of the following: a program including a speech recognition algorithm, a program including a speech synthesis algorithm, a program including a speaker recognition or verification algorithm, templates to be used in conjunction with the respectively corresponding programs; and a data link connecting said further memory with said speech processors and operable to effect the transfer of one or more of the programs or templates held in said memory to said speech processors for use in provision of the appropriate function;

wherein any incoming telephony channel connected to the line interface means can be routed to any one of the speech processors over the speech bus under the control of the control processor; and wherein the platform is configured to handle multiple calls simultaneously, and, wherein while one call is being handled by a first one of the speech processors, the arrival of a further call of a known type causes a program loaded in a second one of said speech processors to be replaced by a different program from said further memory that is selected based upon the type of the further call.

5. An interactive voice platform for the provision of automated speech based services over a telephone network, the platform comprising:

a plurality of speech processors, each with an associated memory, to provide at least one of the following functions: speech recognition, speaker recognition, speaker verification, speech synthesis;

line interface means for terminating a plurality of telephony channels of the network;

a speech bus to carry speech signals between the line interface means and said speech processors;

a control processor, distinct from the speech processors, to control the routing of speech signals over the speech bus;

a control bus connecting the control means with the speech processors and the line interface means;

a memory distinct from the associated memory of said speech processors and holding one or more of the following: a program including a speech recognition algorithm, a program including a speech synthesis algorithm, a program including a speaker recognition or verification algorithm, templates to be used in conjunction with the respectively corresponding programs; and a data link connecting said memory with said speech processors and operable to effect the transfer of one or more of the programs or templates held in said memory to said speech processors for use in provision of the appropriate function;

wherein each of the speech processors includes a central processing unit together with a plurality of associated but distinct processors, each of the distinct processors having its own associated memory.

6. An interactive voice platform for the provision of automated speech based services over a telephone network, the platform comprising:

a plurality of speech processors, each with an associated memory, to provide at least one of the following functions: speech recognition, speaker recognition, speaker verification, speech synthesis;

line interface means for terminating a plurality of telephony channels of the network;

a speech bus to carry speech signals between the line interface means and said speech processors;

a control processor, distinct from the speech processors, to control the routing of speech signals over the speech bus;

a control bus connecting the control means with the speech processors and the line interface means;

a memory distinct from the associated memory of said speech processors and holding one or more of the following: a program including a speech recognition algorithm, a program including a speech synthesis algorithm, a program including a speaker recognition or verification algorithm, templates to be used in conjunction with the respectively corresponding programs; and a data link connecting said memory with said speech processors and operable to effect the transfer of a copy of one or more of the programs or templates held in said memory to said speech processors for use in provision of the appropriate function;

wherein a speech processor holds copies of plural programs, and wherein in response to an incoming call in which the use of a particular program of which there is currently no free copy is required, one of said held copies is replaced by a copy of the required program, the program which is replaced being selected on the basis of its load time and the number of copies of that program currently loaded in at least one of the speech processors, the choice of program to be replaced favoring those with the shortest load times of which there are plural loaded copies.

7. A platform as in claim 6, in which the assessment of which program to replace is made on the basis of a consideration of the program status of all said speech processors.

8. A platform as in claim 6, including means in which the assessment of which program to replace is made on the basis of a consideration of the program status of a subset of all said speech processors, which subset itself includes plural speech processors.

9. An interactive voice platform for the provision of automated speech based services over a telephone network, the platform comprising:

a plurality of speech processors, each with an associated memory, to provide at least one of the following functions: speech recognition, speaker recognition, speaker verification, speech synthesis;

line interface means for terminating a plurality of telephony channels of the network;

a speech bus to carry speech signals between the line interface means and said speech processors;

a control processor, distinct from the speech processors, to control the routing of speech signals over the speech bus;

a control bus connecting the control means with the speech processors and the line interface means;

a memory distinct from the associated memory of said speech processors and holding one or more of the following: a program including a speech recognition algorithm, a program including a speech synthesis algorithm, a program including a speaker recognition or verification algorithm, templates to be used in conjunction with the respectively corresponding programs; and a data link connecting said memory with said speech processors and operable to effect the transfer of one or more of the programs or templates held in said memory to said speech processors for use in provision of the appropriate function;

wherein there are means for effecting plural combinations of speech processors, line interface means and speech buses.

10. A platform as in claim 9 wherein each of the plural combinations is provided as a shelf in a rack system.

11. A platform as in claim 9 wherein the memory is arranged to serve the plural combinations.

12. A platform as in claim 9 wherein each of the plural combinations includes a control processor with an associated control bus.

13. An interactive voice platform for the provision of automated speech based services over a telephone network, the platform comprising:

a plurality of speech processors, each with an associated memory, to provide at least one of the following functions: speech recognition, speaker recognition, speaker verification, speech synthesis;

line interface means for terminating a plurality of telephony channels of the network;

a speech bus to carry speech signals between the line interface means and said speech processors;

a control processor, distinct from the speech processors, to control the routing of speech signals over the speech bus;

a control bus connecting the control means with the speech processors and the line interface means;

a memory distinct from the associated memory of said speech processors and holding one or more of the following: a program including a speech recognition algorithm, a program including a speech synthesis algorithm, a program including a speaker recognition or verification algorithm, templates to be used in conjunction with the respectively corresponding programs; and a data link connecting said memory with said speech processors and operable to effect the transfer of one or more of the programs or templates held in said memory to said speech processors for use in provision of the appropiate function;

wherein each of the speech processors, the line interface means and the control processor is provided as a separate card which is configured for use in a rack system, the control bus and the speech bus each being provided as elements of a rack system which houses the separate cards.

14. A service platform for the provision of automated speech based services over a telephone network, comprising:

a plurality of speech processors, each including associated memory, to provide at least one of speech recognition, speech coding, speaker recognition, speaker verification, speech synthesis, each speech processor comprising multiple processors each with an associated memory;

line interface means associated with each processor;

a speech bus to carry speech signals between the line interface means associated with each processor, a control processor distinct from the speech processors to control the routing of speech signals over the speech bus;

a control bus connecting the control means with the speech processor and the line interface means;

a separate memory holding speech processing software; and a data link connecting the memory with the speech processors and operable to load programs into a speech processor during run time in the event that the appropriate speech processing software either is not available on any of the speech processors; or is not available on the relevant speech processor.

* * * * *